(12) United States Patent
Go et al.

(10) Patent No.: US 12,092,870 B2
(45) Date of Patent: Sep. 17, 2024

(54) OPTICAL WAVEGUIDE

(71) Applicant: Nippon Telegraph and Telephone Corporation, Tokyo (JP)

(72) Inventors: Takashi Go, Musashino (JP); Kenya Suzuki, Musashino (JP); Keita Yamaguchi, Musashino (JP); Ai Yanagihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 232 days.

(21) Appl. No.: 17/782,799

(22) PCT Filed: Dec. 11, 2019

(86) PCT No.: PCT/JP2019/048480
§ 371 (c)(1),
(2) Date: Jun. 6, 2022

(87) PCT Pub. No.: WO2021/117161
PCT Pub. Date: Jun. 17, 2021

(65) Prior Publication Data
US 2023/0032684 A1  Feb. 2, 2023

(51) Int. Cl.
*G02B 6/122* (2006.01)
*G02B 6/12* (2006.01)
*G02B 6/125* (2006.01)

(52) U.S. Cl.
CPC .......... *G02B 6/125* (2013.01); *G02B 6/1228* (2013.01); *G02B 2006/12035* (2013.01); *G02B 2006/12147* (2013.01)

(58) Field of Classification Search
CPC .................. G02B 6/1228; G02B 6/125
See application file for complete search history.

(56) References Cited

U.S. PATENT DOCUMENTS

| | | | |
|---|---|---|---|
| 10,436,982 B1* | 10/2019 | Bian | G02B 6/13 |
| 2004/0071384 A1* | 4/2004 | Heim | G02B 6/125 |
| | | | 385/28 |
| 2016/0377807 A1* | 12/2016 | Ma | G02B 6/122 |
| | | | 385/11 |

FOREIGN PATENT DOCUMENTS

| | | | |
|---|---|---|---|
| CN | 204154932 U | 2/2015 | |
| JP | 3883118 B2 | 2/2007 | |

(Continued)

OTHER PUBLICATIONS

PCTJP2019048480 Written Opinion (Year: 2020).*

(Continued)

*Primary Examiner* — Charlie Y Peng
(74) *Attorney, Agent, or Firm* — Workman Nydegger

(57) ABSTRACT

In a waveguide having a given Δ, a low-loss waveguide bend is realized while the curvature radius is kept small. In an optical waveguide in which a first waveguide and a second waveguide are connected, a clothoid tapered waveguide bend is inserted between the first waveguide and the second waveguide. In the clothoid tapered waveguide bend, the waveguide width continuously changes from a first waveguide width at a connection point of the first waveguide to a second waveguide width at a connection point of the second waveguide, the curvature radius continuously changes from a first curvature radius at the connection point of the first waveguide to a second curvature radius at the connection point of the second waveguide, the first waveguide width and the second waveguide width are different from each other, and the first curvature radius and the second curvature radius are different from each other.

9 Claims, 28 Drawing Sheets

(56) References Cited

FOREIGN PATENT DOCUMENTS

JP         4202212 B2    12/2008
JP      2017-116862 A     6/2017

OTHER PUBLICATIONS

Nakai et al, *Geometric Loss Reduction in Tight Bent Waveguides for Silicon Photonics*, 2018 Conference on Lasers and Electoro-Optics (CLEO), May 13, 2018, JW2A. 70, pp. 1-2.
Akira Himeno, et al., *Silica-Based Planar Lightwave Circuits*, IEEE Journal of Selected Topics in Quantum Electronics, vol. 4, No. 6, pp. 913-924, Nov./Dec. 1998.
Takashi Goh, et al., *Low Loss and High Extinction Ratio Strictly Non-Blocking 16×16 Thermooptic Matrix Switch on 6-In Wafer Using Silica-Based Planar Lightwave Circuit Technology*, IEEE Journal of Lightwave Technology, vol. 19, No. 3, pp. 371-379, Mar. 2001.

* cited by examiner

OPTICAL WAVEGUIDE

TECHNICAL FIELD

The present invention relates to an optical waveguide, and more particularly to an optical waveguide that has low optical loss and an optical circuit thereof can be configured to be compact.

BACKGROUND ART

A guided wave optical type optical circuit using an optical waveguide formed on a substrate is characterized in that it is compact and is excellent in aggregation, and high in long-term stability/reliability, compared to a free-space optical type optical circuit that assembles bulk-type optical components such as lenses and prisms, and is widely used in practical systems such as optical communication devices. For example, in an optical circuit using a Silica-based waveguide, a wavelength multi/demultiplexer called an arrayed waveguide grating configured to include numerous waveguides that are arranged in an array, and an optical switch configured by a variable phase-shifter equipped Mach-Zehnder interferometer have been put into practical use (e.g., see Non-Patent Literatures 1 and 2). In optical circuits using waveguides made of dielectric materials such as lithium niobate or semiconductor materials such as indium phosphide or silicon, optical modulators and demodulation circuits and the like have been put into practical use.

Waveguide Bend

Although the performances of these optical circuits can be represented by various indices, the insertion loss characteristic is one of the most important indices. The breakdown of the optical circuit insertion loss can be classified into three of fiber connection loss, propagation loss, and circuit excess loss. The fiber connection loss is a loss caused by the difference between a field distribution of propagation light in an optical fiber and a field distribution in the waveguide of the optical circuit. The propagation loss is a loss due to optical scattering caused by optical absorption by a waveguide material itself, refraction fluctuation of the waveguide, or rough core surface. The circuit excess loss is a loss ascribable to circuit structure and includes radiation loss due to a waveguide bend (a bend radiation loss), a loss caused by a slight difference in field distribution at a connection part between a waveguide bend and a straight waveguide (a different-curvature waveguide connection loss) and the like.

In a large-scaled circuit such as a matrix optical switch using a Silica-based waveguide, the contribution of the fiber connection loss is relatively small. Further, the propagation loss of the Silica-based waveguide is as small as 1 dB/m or less, and therefore the circuit excess loss is a dominant loss factor. In a large-scaled optical switch, numerous optical switch elements each configured by a variable phase-shifter equipped Mach-Zehnder interferometer are integrated, and numerous waveguide bends are used. Accordingly, even if the bend radiation loss and the different-curvature waveguide connection loss in respective waveguides are little, the circuit excess loss in total is not ignorable in magnitude.

The bend radiation loss becomes larger as the curvature radius of a waveguide becomes smaller. Therefore, the allowable minimum curvature radius is roughly determined by a specific refractive index difference Δ between the core and the clad of a waveguide to be used. For example, in a waveguide whose Δ is approximately 2%, a waveguide bend having a curvature radius 1 mm is used.

In order to reduce the different-curvature waveguide connection loss, the offset connection in which the waveguide center position is offset at the connection point when connecting so as to correct the positional deviation of a field distribution, or the clothoid connection in which a straight waveguide and a waveguide bend are connected via a waveguide whose curvature gradually changes, is used (see Patent Literature 1).

Directional Coupler

There is a directional coupler as one of basic circuit elements configuring an optical circuit. The directional coupler is configured by two waveguides that are arranged in parallel and close to each other, and a total of four S-bend waveguides that are connected to the front or rear end of these two waveguides. In the portion where these two waveguides are closely arranged, field distributions of light propagating respective waveguides overlap each other and therefore optical coupling occurs. The light in one waveguide gradually shifts to the other waveguide as it propagates. Appropriately selecting the lengths (coupling lengths) of these two waveguides can obtain an arbitrary transition ratio (coupling ratio) in a range of 0 to 100%.

In order to obtain an desired coupling ratio with a short coupling length, it is preferable to narrow the gap between the two waveguides closely arranged, or reduce the widths of these two waveguides because the speed of transition according to the propagation is faster as the overlapping of the field distributions is larger. In order to thin down these two waveguides to be narrower in width than that of an ordinary waveguide, a method for gradually reducing the waveguide width at the above-mentioned S-bend portion is known (see Patent Literature 2).

As mentioned above, the insertion loss characteristic is an important characteristic. In particular, in large-scaled circuits such as matrix optical switches, the loss becomes larger due to accumulation of the circuit excess loss and therefore it is strongly required to suppress the circuit excess loss. Further, in large-scaled circuits, since the area of optical circuits becomes larger with expansion of integration scale, keeping the chip size smaller is another important issue. However, as mentioned above, there is a trade-off relationship between the bend radiation loss and the allowable minimum curvature radius. As problems, if it is intended to decrease the circuit area by reducing the curvature radius, it will result in an increase in the bend radiation loss, and if a sufficient curvature radius is secured to reduce the bend radiation loss, it will result in an increase in the circuit area. As is well known, using a waveguide having a larger specific refractive index difference Δ, the allowable curvature radius becomes smaller, but the fiber connection loss becomes larger because the difference in field distribution size between the waveguide and the optical fiber (Δ≈0.3%) becomes larger. Accordingly, excessively reducing Δ is unfeasible.

CITATION LIST

Non-Patent Literature

Non-Patent Literature 1: Akira Himeno, et al., "Silica-based planar lightwave circuits," IEEE Journal of Selected Topics in Quantum Electronics, vo. 4, no. 6, pp. 913-924, November/December 1998.

Non-Patent Literature 2: Takashi Goh, et al., "Low loss and high extinction ratio strictly non-blocking 16×16 thermooptic matrix switch on 6-in wafer using silica-based planar lightwave circuit technology," IEEE Journal of Lightwave Technology, vol. 19, no. 3, pp. 371-379, March 2001.

Patent Literature

Patent Literature 1: Japanese Patent No. 4202212
Patent Literature 2: Japanese Patent No. 3883118

SUMMARY OF THE INVENTION

An object of the present invention is to realize a low-loss waveguide bend while keeping the curvature radius small in a waveguide having a given Δ. As a result, an optical circuit in which the circuit excess loss is reduced while the circuit area is suppressed from increasing is provided. In addition, the present invention intends to provide a short waveguide configuration in which the waveguide connection loss is extremely reduced when connecting waveguides different in waveguide width and curvature.

In order to achieve such a goal, an optical waveguide according to one aspect of the present invention is an optical waveguide in which a first waveguide and a second waveguide are connected, characterized by comprising a clothoid tapered waveguide bend inserted between the first waveguide and the second waveguide, wherein a waveguide width continuously changes from a first waveguide width at a connection point of the first waveguide to a second waveguide width at a connection point of the second waveguide, a curvature radius continuously changes from a first curvature radius at the connection point of the first waveguide to a second curvature radius at the connection point of the second waveguide, the first waveguide width and the second waveguide width are different from each other, and the first curvature radius and the second curvature radius are different from each other.

According to the present invention, a clothoid tapered waveguide bend in which the waveguide width and the curvature are independently optimized is provided at a connection part of waveguides different in waveguide width and curvature. Therefore, it is possible to realize a low-loss waveguide bend, while keeping the curvature radius small. And, an optical circuit excellent in loss characteristics and compact in circuit area can be provided. In addition, it is possible to provide a short waveguide configuration in which the waveguide connection loss is extremely reduced when connecting the waveguides different in waveguide width and curvature.

DESCRIPTION OF EMBODIMENTS

Hereinafter, embodiments of the present invention will be described in detail below with reference to attached drawings. These embodiments illustrate exemplary Silica-based waveguides, but the optical waveguide configuration of the present invention does not specify materials in particular. In addition to Silica-based waveguides, other material-based waveguides such as silicon (Si) waveguides, indium phosphide (InP)-based waveguides, and polymer-based waveguides can be used. As is obvious, there are no restrictions on the waveguide manufacturing method. Further, as a concrete design example, a waveguide having a specific refractive index difference $\Delta$=approximately 2% and a core height=near 4 µm is explained. However, the present invention is not limited to these basis waveguide parameters, and similar way of thinking is applicable to other parameters.

Optimization of Waveguide Width

First, some relationships between the waveguide width and the bend radiation loss will be described. As is well known, the bend radiation loss in a waveguide bend is caused when the propagation velocity of an electromagnetic field in a clad outside the waveguide bend exceeds a propagation velocity determined by a refractive index of the clad.

Figure 1:
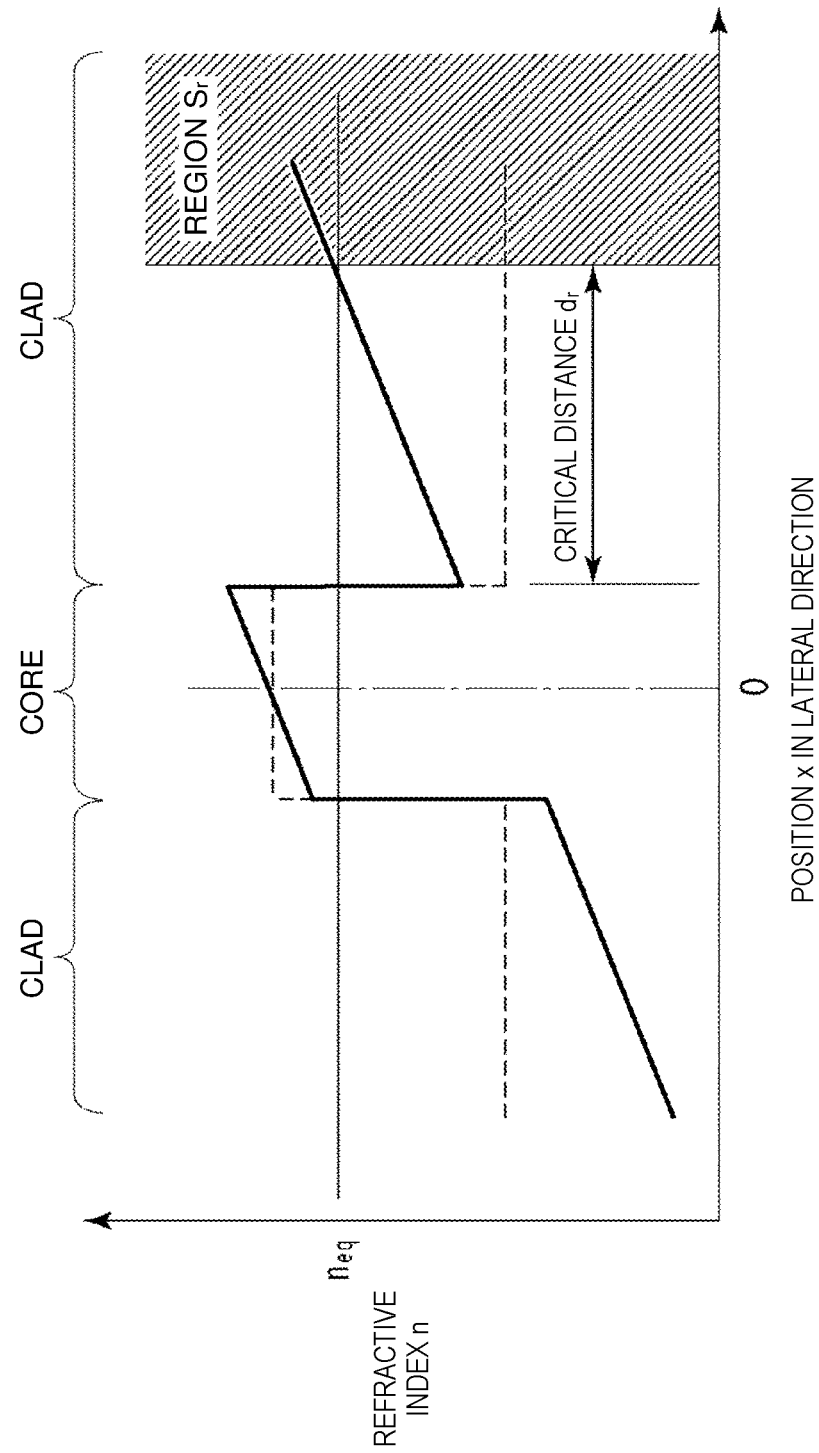
FIG. 1 is a diagram illustrating an equivalent refractive index distribution when a waveguide bend is regarded as a straight waveguide.

FIG. 1 illustrates an equivalent refractive index distribution when the waveguide bend is regarded as a straight waveguide. The solid line indicates an equivalent refractive index distribution in the waveguide bend, and a short dashes line indicates a refractive index distribution in an ordinary straight waveguide. When R represents the curvature radius of the waveguide bend, the equivalent refractive index distribution is a distribution obtained by multiplying a refractive index distribution n(x) in the ordinary straight waveguide by (1+x/R). Here, x is the position when the lateral center (optical axis) of the waveguide perpendicular to the waveguide direction is zero, the positive direction is the outside of the bending, and the negative direction is the inside of the bending. In the waveguide bend, the refractive index is inclined as a whole and its refractive index distribution is such that the refractive index increases toward the outside of the bending. Accordingly, in the case of the clad outside the waveguide bend, in a region $S_r$ outside a point separated from the waveguide core by a certain distance (critical distance $d_r$), the refractive index of the clad becomes larger than an equivalent refractive index ($n_{eq}$) felt by propagation light in the waveguide mode. When a field distribution of the light propagating the core is applied to the region $S_r$, its electromagnetic field exceeds a propagation velocity determined by the refractive index of the clad and is therefore emitted to the outside of the waveguide bend. As a result, bend radiation loss occurs. When the curvature radius R of the waveguide bend becomes smaller, the above-described inclination of the refractive index distribution becomes steep and therefore $d_r$ becomes smaller. Therefore, since the electric power amount of the field distribution applied to the region $S_r$ increases, the ratio of the emitted light increases and the bend radiation loss increases. Accordingly, in order to suppress the bend radiation loss, it is important to reduce the ratio of the field distribution electric power applied to the region $S_r$ as much as possible, that is, suppress the exudation of the field distribution in the region $S_r$ direction. In the case of the given specific refractive index difference $\Delta$, in order to suppress the field distribution exudation in the lateral direction, it suffices to increase the core size, in particular, the core width to enhance the optical confinement in the lateral direction.

Figure 2:
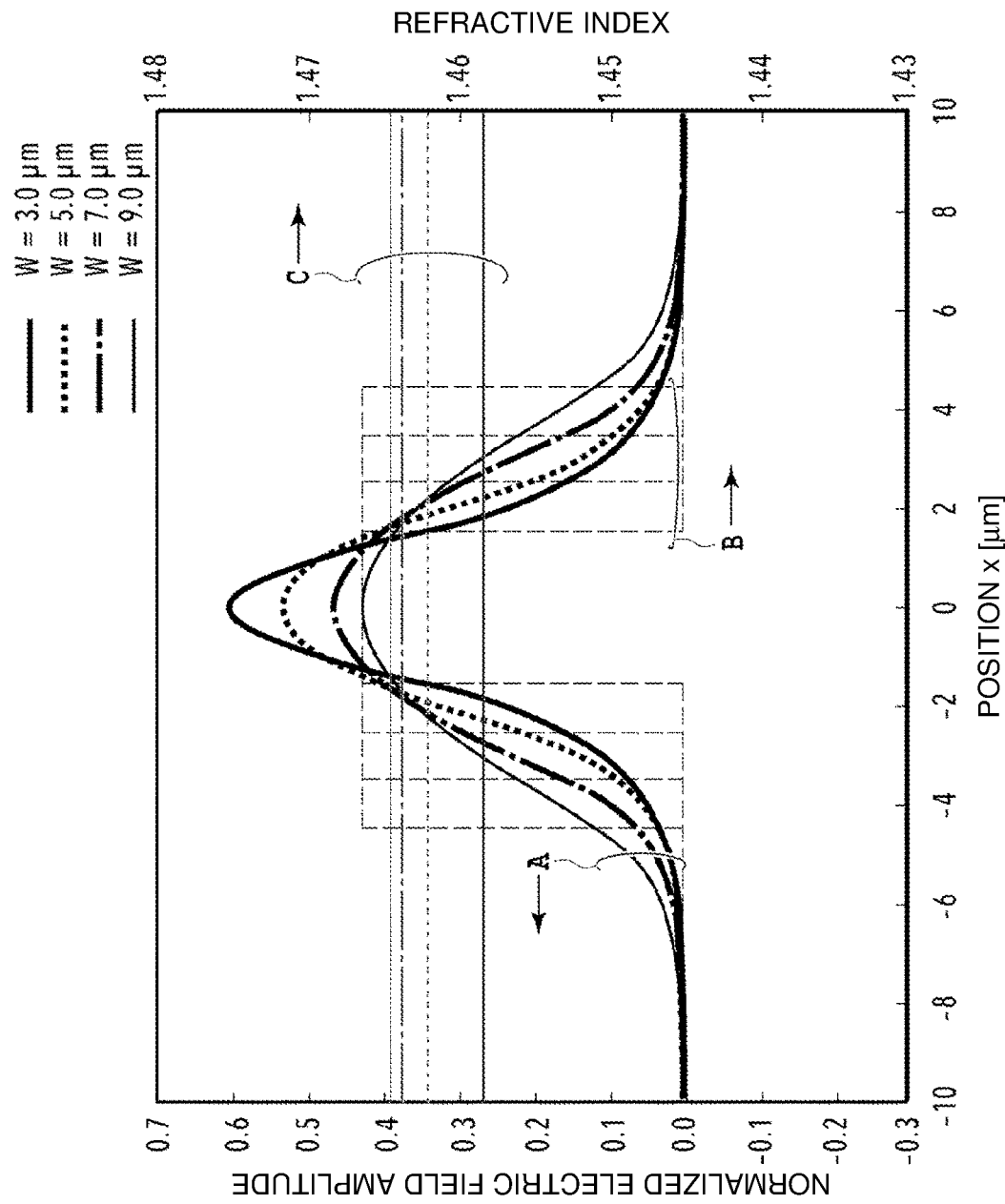
FIG. 2 is a diagram illustrating field distributions of the basic waveguide mode in a straight waveguide.
Figure 3:
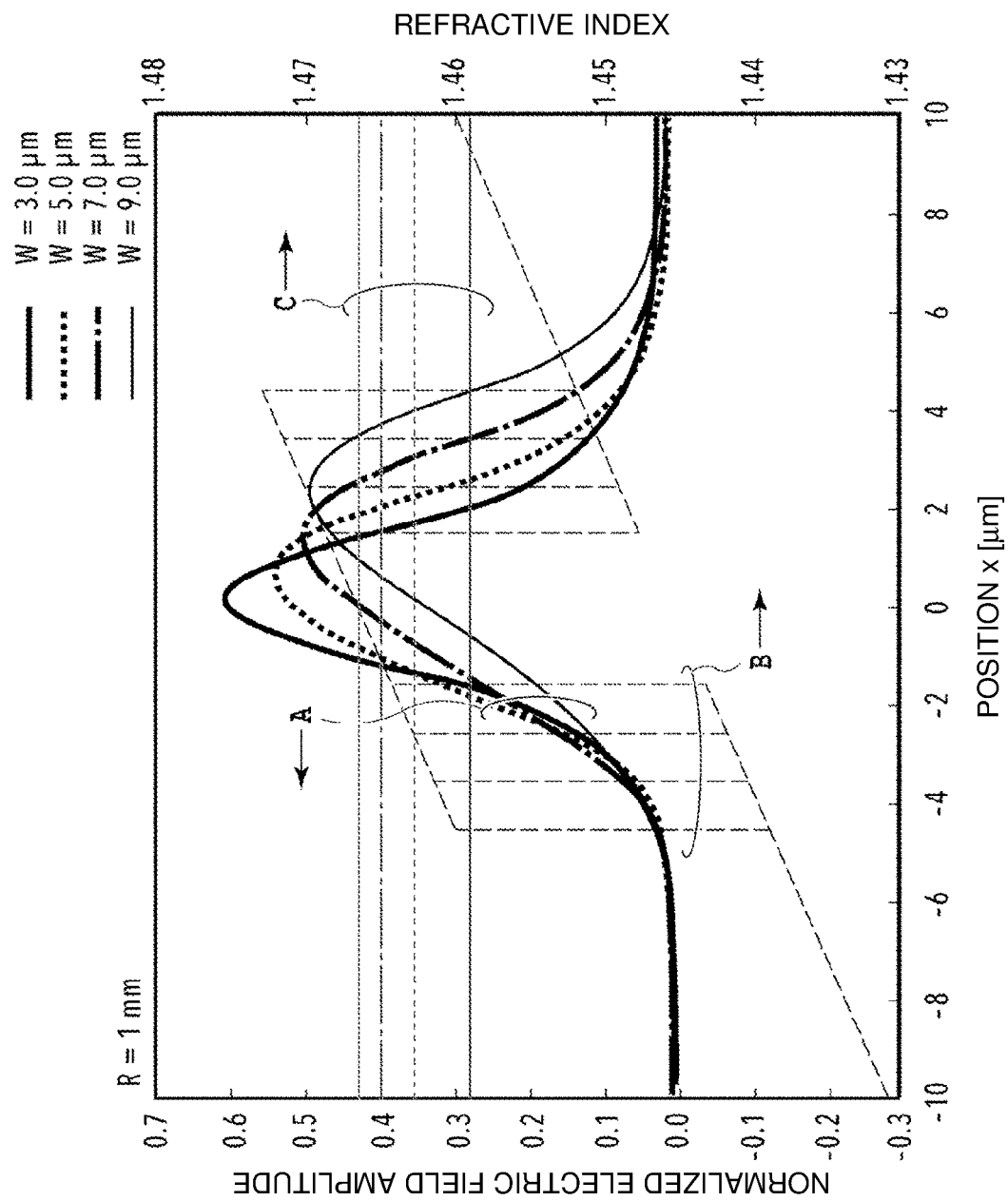
FIG. 3 is a diagram illustrating field distributions of the basic waveguide mode of a waveguide bend.

FIG. 2 illustrates field distributions of the basic waveguide mode in a straight waveguide, and FIG. 3 illustrates field distributions of the basic waveguide mode in a waveguide bend whose curvature radius R is 1 mm, as results obtained by numerical calculation. Here, as an example, assuming a Silica-based waveguide whose specific refractive index difference $\Delta$ is 2%, the refractive index of the clad is 1.445, the refractive index of the core is 1.474, and the core thickness (core height) is 3.4 µm, Slab approximation by the equivalent refractive index method is used in calculation. Unless otherwise mentioned, the same conditions apply to the following numerical calculations. In both of FIGS. 2 and 3, calculations are carried out for four cases in which the core width W is 3, 5, 7, or 9 µm. A line group A is field distributions in the basic waveguide mode, and a line group B is refractive index distributions of the waveguide, obtained through Slab approximation. A line group C illustrates levels of the equivalent refractive index ($n_{eq}$) calculated back from propagation constants of the basic waveguide mode in the same manner as in FIG. 1. In the drawing, the electric field amplitude of the field distribution is normalized with the total power.

Figure 4:
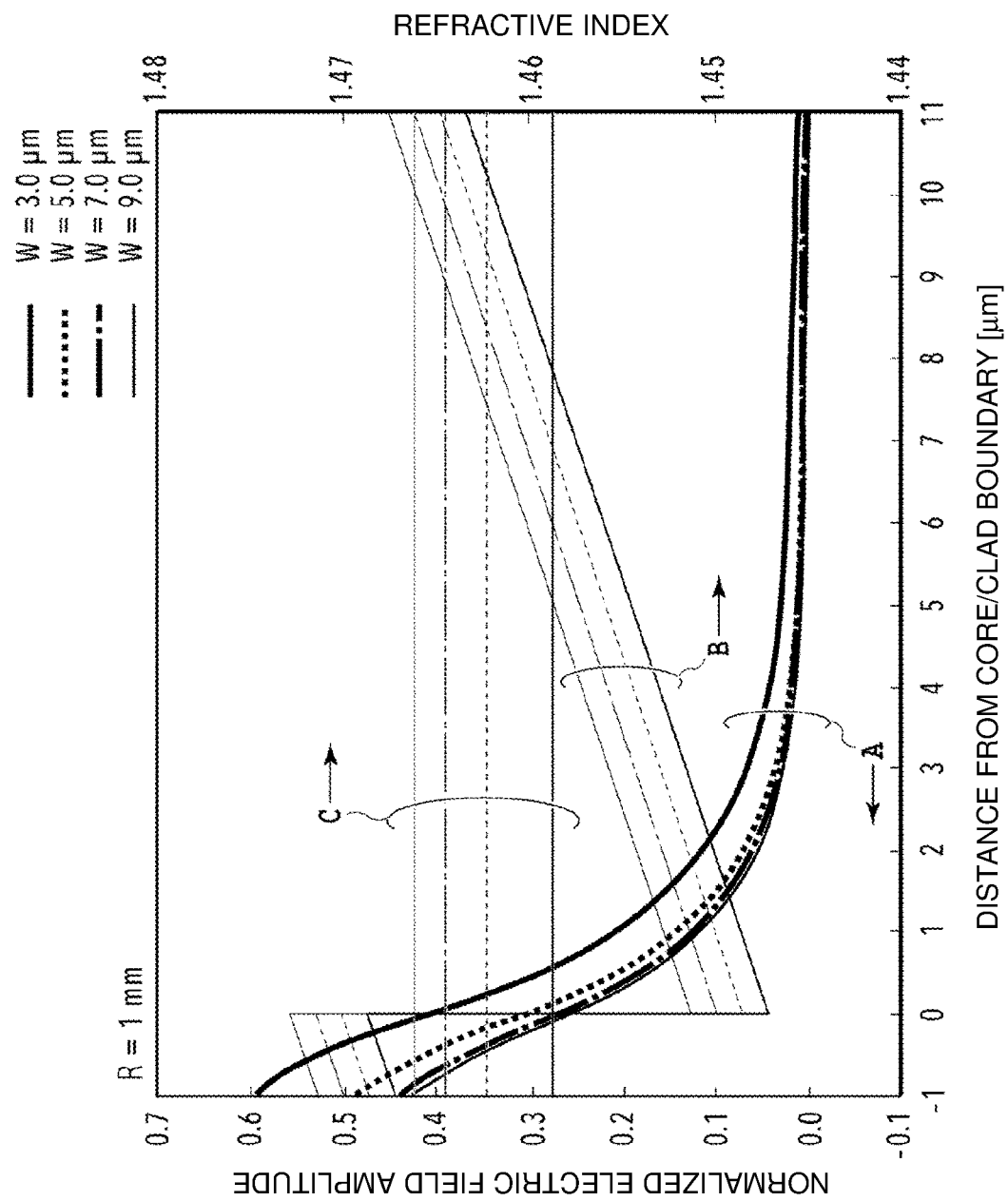
FIG. 4 is a diagram illustrating details of the field distributions of the waveguide bend.

FIG. 4 illustrates details of field distributions of the waveguide bend, in which the position x being the horizontal axis of FIG. 3 has been re-illustrated with reference to a core-clad boundary position outside the bending. In this drawing, at each waveguide width, a position where the dotted line intersects with the short dashes line is the critical distance $d_r$. From this drawing, it is understood that the exudation of the field distribution becomes smaller with increasing core width and the critical distance increases. That is, the bend radiation loss decreases with increasing core width.

Figure 5:
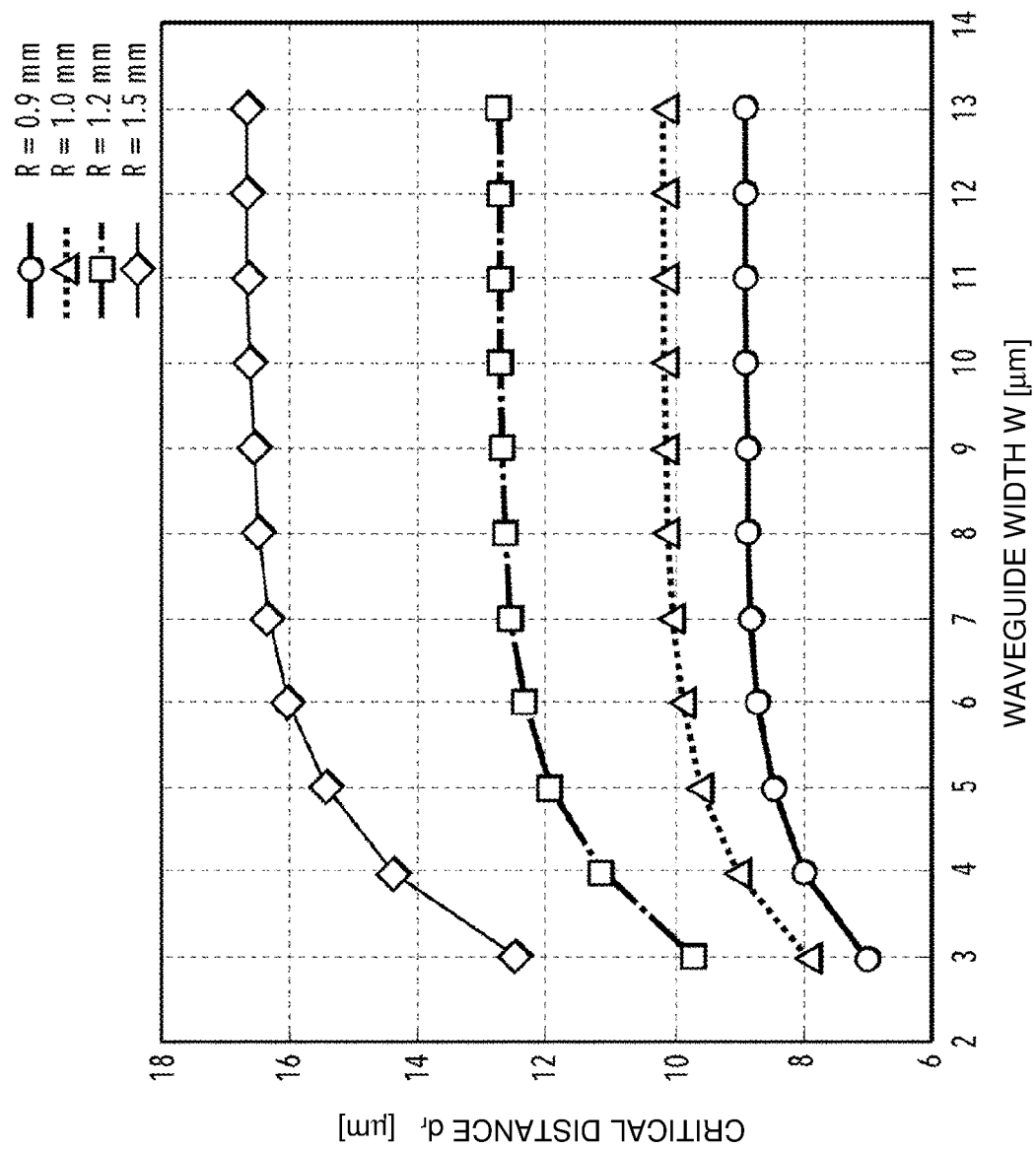
FIG. 5 is a diagram illustrating some relationships between waveguide width and critical distance in the waveguide bend.

FIG. 5 illustrates some relationships between the critical distance and waveguide width W in cases in which the curvature radius R is 0.9, 1.0, 1.2, or 1.5 mm. In any curvature radius, the larger the waveguide width, the longer the critical distance. However, the critical distance has almost leveled off when the waveguide width is around 8 µm, and it is understood that obtaining further effect of reducing the bend radiation loss cannot be obtained even if the waveguide width is made wider than this. In general, when the waveguide width increases, higher-order waveguide modes tend to be occurred even in a waveguide bend. When light propagates in a plurality of waveguide modes, interference with different periods occurs depending on the combination of each waveguide mode when an interferometer is configured on the waveguide, and thus interference characteristics deteriorate. Accordingly, it is not desired to excessively increase the waveguide width.

From the above it can be said that, in the case of the refractive index difference 2% and the core height 3.4 µm used in the above calculation, it is desirable that the critical distance is up to around 8 µm at which it is almost leveled off. This waveguide width is approximately 0.9 when it is converted to the value of a normalized propagation constant b. Similarly, in the case of other refractive index differences and core heights, the bend radiation loss becomes smaller with increasing core width. However, the effect of reducing the bend radiation loss is leveled off when the width exceeds a certain value. Accordingly, it is desirable to configure the waveguide bend so as to have a waveguide width comparable to the normalized propagation constant b=0.9.

Next, the influence of the waveguide width on the different-curvature waveguide connection loss will be described. As mentioned above, the different-curvature waveguide connection loss is caused by the difference in field distribution at a connection part between a waveguide bend and a straight waveguide. As can be understood from the field distributions illustrated in FIG. 3, in the case of the waveguide bend, the field distribution center shifts from the waveguide center to the outside of the bending and also the field distribution becomes asymmetric in the right-and-left direction. Regarding the shift of the field distribution center, at the connection point between the straight waveguide and the waveguide bend, the waveguide center position of the waveguide bend is shifted to the inside of the bending (toward the center of the curvature radius of the waveguide bend) and is connected. That is, at the connection point between the straight waveguide and the waveguide bend, the waveguide bend is connected while being offset in the optical axis direction to the inside of the bending from the optical axis of the straight waveguide. Specifically, the shift amount is determined in such a manner that the square of the absolute value of the overlap integral between a normalized electric field distribution of the basic propagation mode of the waveguide bend and a normalized electric field distribution of the basic propagation mode of the straight waveguide can be maximized, at the connection point between the straight waveguide and the waveguide bend. Using such an offset connection can reduce the difference in field distribution.

Figure 6:
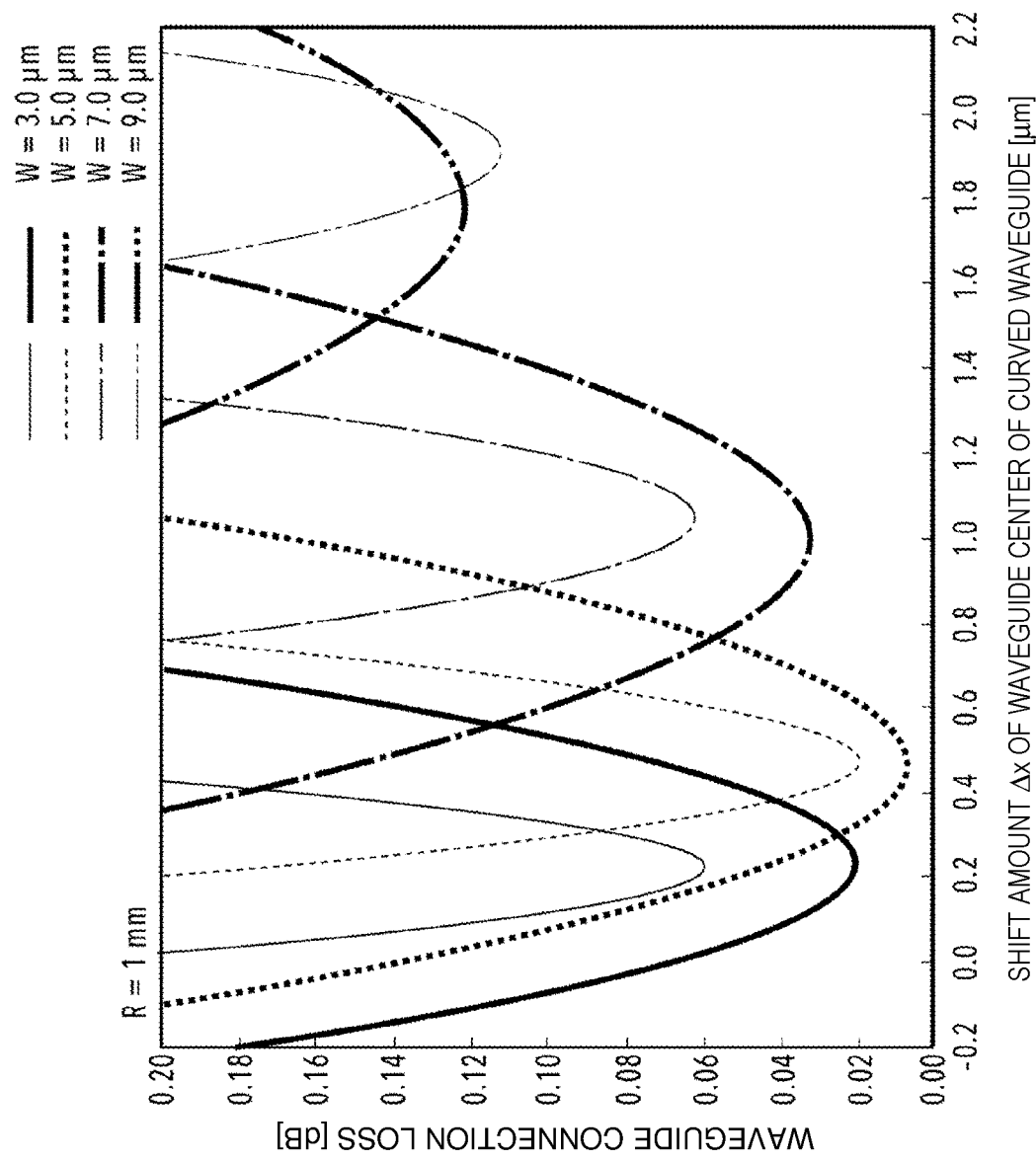
FIG. 6 is a diagram illustrating some relationships between shift amount of the waveguide bend at the waveguide center and different-curvature waveguide connection loss.

FIG. 6 illustrates shift amount dependency of the different-curvature waveguide connection loss. The different-curvature waveguide connection loss in this drawing has been obtained through numerical calculation from the square of the absolute value of the overlap integral between the field distributions illustrated in FIGS. 2 and 3. Specifically, the field distribution is used in carrying out the calculation when the waveguide center (optical axis) of the waveguide bend is shifted to the inside of the bending by a shift amount $\Delta x$. A bold line group indicates the waveguide connection loss when a straight waveguide and a waveguide bend are connected, and a thin line group indicates the waveguide connection loss when a right-turning waveguide bend and a left-turning waveguide bend are connected. In each case, the curvature radius R of the waveguide bend is 1 mm. Here, the right-turning waveguide bend and a left-turning waveguide bend have waveguide center positions shifted in respective waveguides. Therefore, when the right-turning waveguide bend and the left-turning waveguide bend are connected, the total offset amount is twice the shift amount $\Delta x$. When the straight waveguide and the waveguide bend are connected, the offset amount is equal to the shift amount $\Delta x$. It is understood that the connection with an offset can reduce the waveguide connection loss compared to a case of no offset provision ($\Delta x=0$). The shift amount $\Delta x$ at which the different-curvature waveguide connection loss is minimized is slightly different between the case where the straight waveguide and the waveguide bend are connected and the case where the right-turning waveguide bend and the left-turning waveguide bend are connected. However, it is understood that this difference is little. That is, when connecting waveguides that are different in curvature (1/R), it is understood that it is desired that these waveguides are connected so that their field distribution centers coincide with each other.

However, as understood from the fact that the bottom value of the waveguide connection loss illustrated in FIG. 6 does not become zero, the waveguide connection loss does not become zero even if the waveguide bend is connected by an optimum shift amount (optimum shift amount). This is because the disagreement of the field distribution due to asymmetry of the field distribution remains. As understood from FIG. 3, the asymmetry of the field distribution clearly increases as the waveguide width increases. On the other hand, even when the waveguide width is very small, the field distribution spread over the clad is different on right and left sides and therefore the asymmetry becomes larger.

Figure 7:
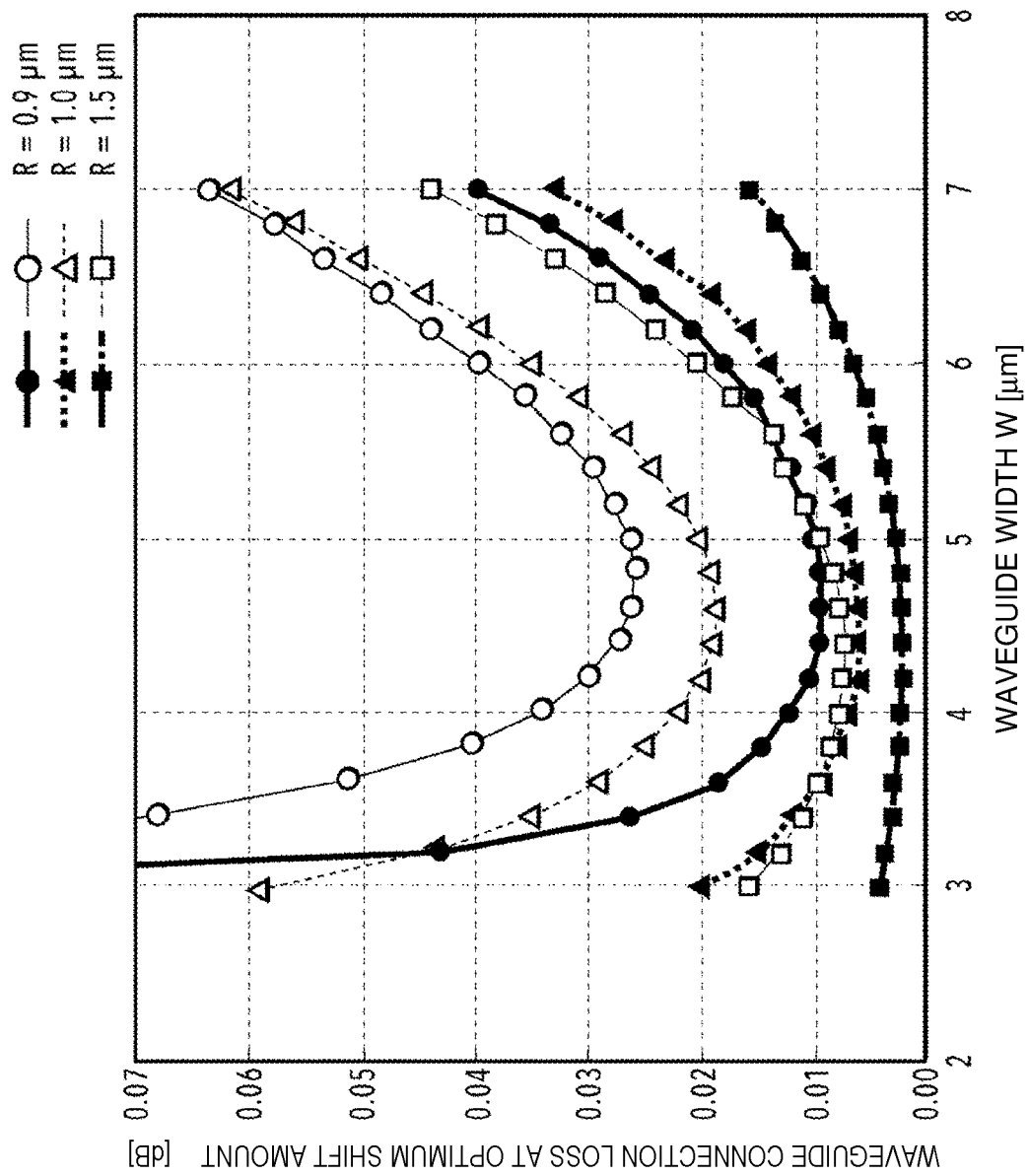
FIG. 7 is a diagram illustrating some relationships between waveguide connection loss at optimum shift amount and waveguide width.

FIG. 7 illustrates waveguide width dependency of the waveguide connection loss at the optimum shift amount.

FIG. 7 illustrates numerical calculation results in cases where the curvature radius R is 0.9, 1.0, or 1.5 mm. The filled plots on the bold line represent the waveguide connection loss when the straight waveguide and the waveguide bend are connected. Further, the outlined plots on a thin line represent the waveguide connection loss when the right-turning waveguide bend and the left-turning waveguide bend are connected. In any curvature radius and in any connection combination, it is understood that there is an optimum waveguide width at which the waveguide connection loss is minimized. Although it slightly differs depending on the curvature radius R, it is understood that the waveguide connection loss is minimized at the waveguide width of 4 to 5 μm in the case of a waveguide bend having R=1 mm. Although not illustrated in the drawing, an optimum waveguide width when the right-turning waveguide bend (curvature radius $R_1$) and the left-turning waveguide bend (curvature radius $R_2$) that are different in curvature radius are connected is the waveguide width that is almost the middle between an optimum waveguide width at the time of connecting the right-turning and left-turning waveguide bends having the curvature radius $R_1$ and an optimum waveguide width at the time of connecting the right-turning and left-turning waveguide bends having the curvature radius $R_2$.

Figure 8:
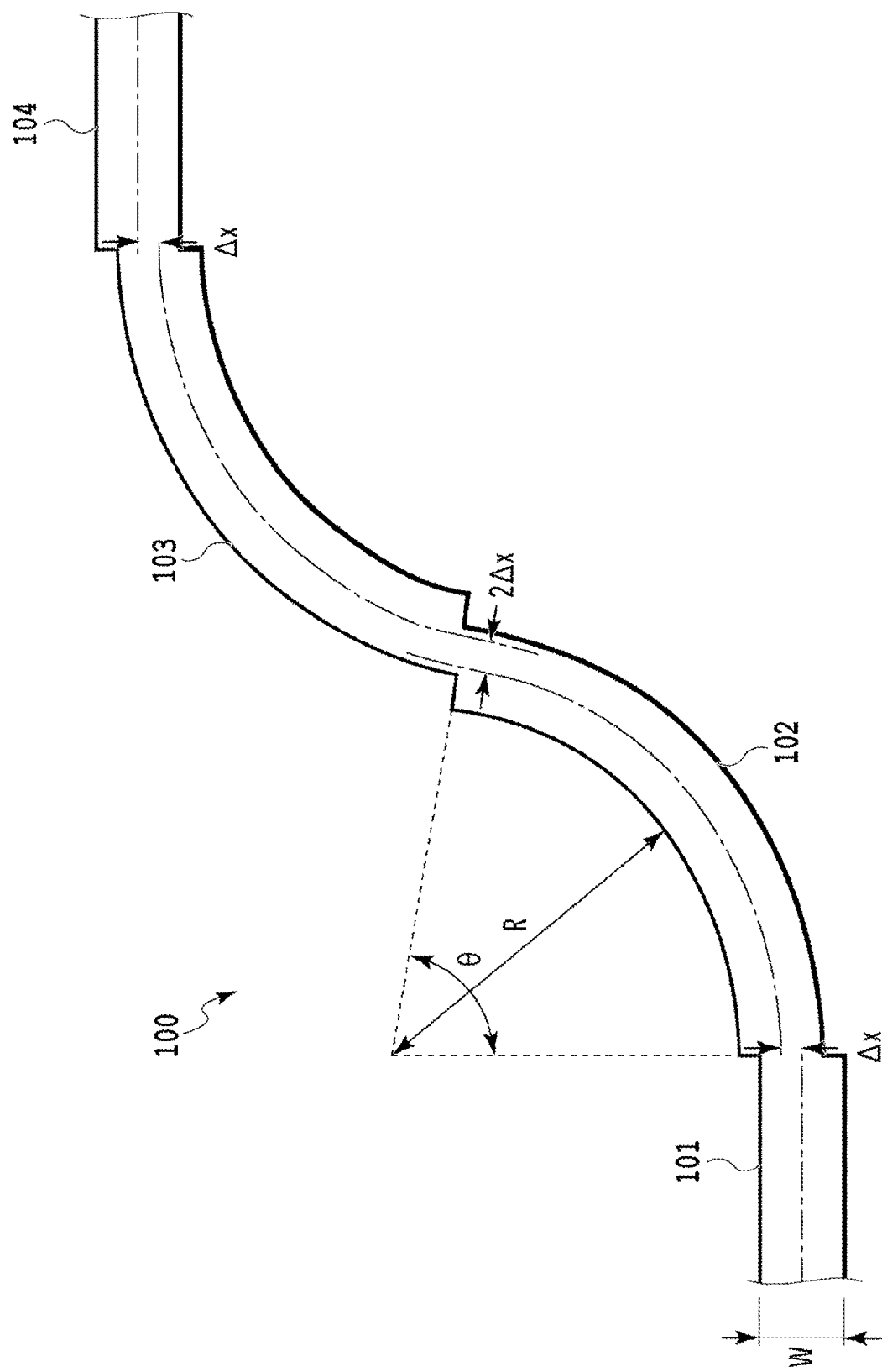
FIG. 8 is a diagram illustrating a configuration of an S-bend waveguide circuit.

In order to confirm that the above numerical calculation studies are correct even in actual waveguides, test circuits using Silica-based waveguides have been fabricated, and the circuit excess loss has been evaluated on waveguides having various design parameters. FIG. 8 illustrates an S-bend waveguide circuit 100 fabricated as the test circuit. The S-bend waveguide circuit 100 is a circuit in which a straight waveguide 101, a leftward waveguide bend 102, a rightward waveguide bend 103, and a straight waveguide 104 are sequentially connected. In order to suppress measurement errors, an actual evaluation circuit is configured as a circuit including a cascade-connection of N (N is equal to or greater than 10) S-bend waveguide circuits. Although it is obvious, respective waveguides 101 to 104 are connected in such a manner that they have the same angle in the waveguide direction at their connection points. The leftward waveguide bend 102 is connected to the straight waveguide 101 in such a manner that the waveguide center position (illustrated by a one point broken line in the drawing) deviates by $\Delta x$ toward the inside of the bending. Similarly, the rightward waveguide bend 103 is connected to the straight waveguide 104 in such a manner that the waveguide center position deviates by $\Delta x$ toward the inside of the bending. At the connection point of the leftward waveguide bend 102 and the rightward waveguide bend 103, respective waveguide bends are connected in such a manner that each one deviates by $\Delta x$ toward the inside of the bending to provide a total offset of $2\Delta x$. The waveguide width of each of the straight waveguide bends 101 to 104 is the same width W. The curvature radius R of respective waveguide bends 102 and 103 is 0.8 mm. Prepared are a total of 15 types of S-bend waveguide circuits in which there are three types of 20, 40, and 60 degrees with respect to bending angle θ and five types of 4, 5, 6, 7, and 8 μm with respect to the waveguide width W. In the plurality of test circuits prepared, the shift amount $\Delta x$ at the offset portion is appropriately changed to form each S-bend waveguide circuit. In fabricating the above-described test circuits, a well-known combination of the glass film layers deposition technology such as flame hydrolysis deposition (FHD) method and the fine processing technology such as reactive ion etching (RIE) is used to form the test circuit on a silicon substrate.

Figure 9:
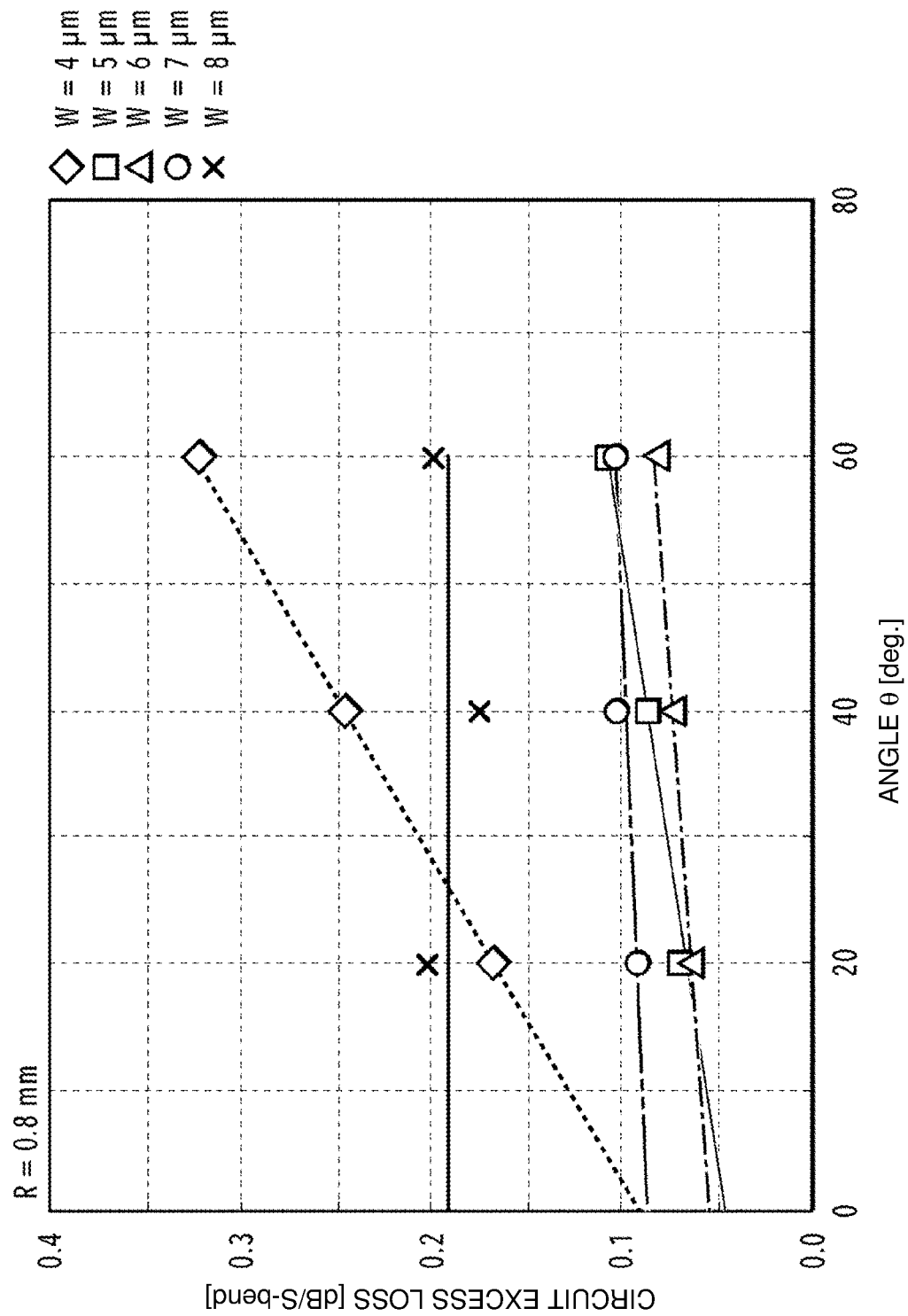
FIG. 9 is a diagram summarizing results of evaluation on the circuit excess loss in the S-bend waveguide circuit.

FIG. 9 illustrates results of circuit excess loss evaluation on the S-bend waveguide circuits, in which the circuit excess loss per S-bend waveguide circuit of the 15 types of test circuits is illustrated. The characteristics evaluation is based on average characteristics of 1500 to 1600 nm in the vicinity of the communication wavelength band. Each plot represents the loss in a circuit of Δx that is smallest in loss among the test circuits in which the shift amount Δx of the offset portion is changed, that is, the circuit excess loss at the optimum shift amount. In FIG. 9, the horizontal axis is the bending angle of the waveguide bend. Accordingly, the gradient of a straight line obtained by connecting plots as a linear straight line represents the bend radiation loss per 1°. The Y-intercept of the straight line represents the waveguide connection loss (the sum of the waveguide connection loss of two straight waveguide bends and the waveguide connection loss of one rightward/leftward curved waveguide bend). Therefore, the bend radiation loss and the waveguide connection loss can be evaluated separately.

Figure 10:
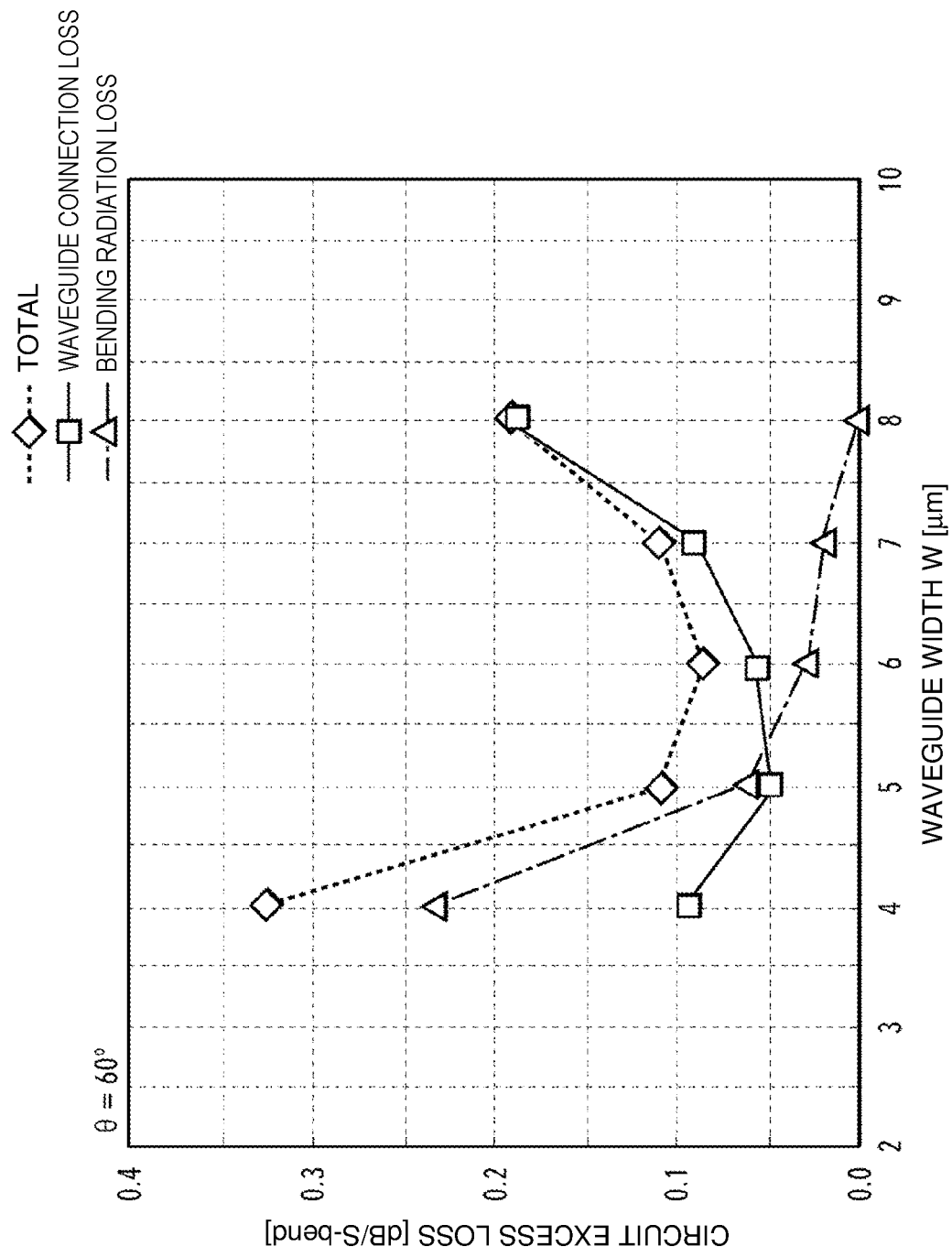
FIG. 10 is a diagram illustrating summarizing the breakdown of the circuit excess loss of the S-bend waveguide circuit.

FIG. 10 illustrates waveguide width dependency of the circuit excess loss when the bending angle θ is 60°, together with the breakdown of the circuit excess loss. From FIG. 10, it is understood that the bend radiation loss decreases as the waveguide width increases and becomes almost zero when the waveguide width is 7 to 8 μm. This waveguide width is approximately 0.85 to 0.9 when converted to the normalized propagation constant b. Further, it is understood that the waveguide connection loss has a minimum value in the vicinity of a little over 5 μm. This waveguide width is approximately 0.8 when converted to the normalized propagation constant b.

As mentioned above, although there is a slight difference quantitatively between the numerical calculation results and evaluation results of actually fabricated waveguides, the following was found. (1) The bend radiation loss becomes smaller as the core width increases and reaches almost the lower limit at a certain waveguide width $W_C$. (2) The waveguide connection loss is minimized at a certain waveguide width $W_0$. (3) The waveguide width $W_C$ and the waveguide width $W_0$ are mutually different, and $W_C$ becomes larger than $W_0$ ($W_C$ is almost 1.5 to 1.8 times $W_0$).

Embodiment 1: Taper-Connected Bend Waveguide Circuit

Figure 11:
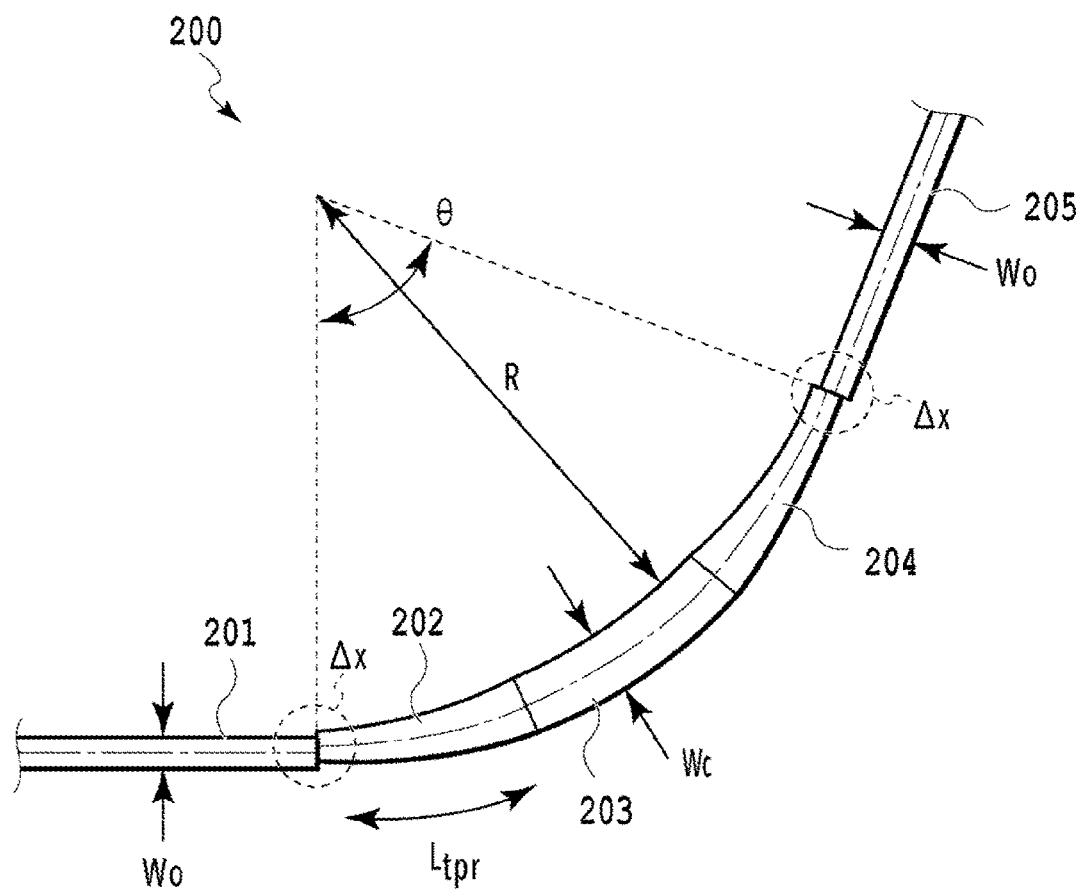
FIG. 11 is a diagram illustrating the configuration of a taper-connected bend waveguide circuit according to a first embodiment of the present invention.

FIG. 11 illustrates the configuration of a taper-connected bend waveguide circuit 200 according to a first embodiment of the present invention. The taper-connected bend waveguide circuit 200 is a waveguide circuit in which a straight waveguide 201, a tapered waveguide bend 202, a waveguide bend 203, a tapered waveguide bend 204, and a straight waveguide 205 are sequentially connected. The waveguide width of the straight waveguide 201/205 is constant and is $W_0$ at the connection point. The waveguide width of the waveguide bend 203 is $W_C$. The waveguide width is different between the two, the magnitude relationship is $W_0 < W_C$. The waveguide width of the tapered waveguide bend 202 is $W_0$ at a portion connected to the straight waveguide 201 and $W_C$ at a portion connected to the waveguide bend 203. The tapered waveguide bend 202 is configured in such a manner that the waveguide width gradually increases from $W_0$ to $W_C$. The waveguide width of the tapered waveguide bend 204 is $W_C$ at a portion connected to the waveguide bend 203 and $W_0$ at a portion connected to the straight waveguide 205. The tapered waveguide bend 204 is configured in such a manner that the waveguide width gradually decreases from $W_C$ to $W_0$. The waveguide bend 203 and the tapered waveguide bend 202/204 have the same curvature radius R. The tapered waveguide bend 202 is connected to the straight waveguide 201 in such a manner that the waveguide center position deviates by Δx toward the inside of the bending. The tapered waveguide bend 204 is connected to the straight waveguide 205 in such a manner that the waveguide center position deviates by Δx toward the inside of the bending. Here, Δx is an optimum shift amount at which the waveguide connection loss is minimized when the straight waveguide and the waveguide bend having the curvature radius R are connected using the waveguide width $W_0$. The waveguide bend 203 and the tapered waveguide bend 202/204 have the same curvature radius R. Further, since they have the same waveguide width WC at the connection portion, they are connected without any offset. Although it is obvious, respective waveguides 201 to 205 are connected in such a manner that they have the same angle in the waveguide direction at their connection points.

The waveguide width $W_0$ of the straight waveguide 201/205 is selected as a waveguide width at which the waveguide connection loss is minimized when the straight waveguide and the waveguide bend having the curvature radius R are connected using the optimum shift amount. That is, it is selected as a waveguide width at which the square of the absolute value of the overlap integral between the normalized electric field distribution of the basic propagation mode of the waveguide bend and the normalized electric field distribution of the basic propagation mode of the straight waveguide is maximized. The waveguide width $W_C$ of the waveguide bend 203 is selected as a waveguide width at which the bend radiation loss almost reaches the lower limit. Concrete waveguide width values are variable depending on the conditions (e.g., specific refractive index difference Δ, clad refractive index, core refractive index, core height, and curvature radius) of the waveguide used. For example, in the case of the above-mentioned waveguide (specific refractive index difference Δ=2%, clad refractive index=1.445, core refractive index=1.474, core height=3.4 μm, and curvature radius=near 1 mm), $W_0$ is set as the waveguide width (4 to 5 μm or a little over 5 μm) at which the waveguide connection loss is minimized in FIG. 7 or 10. In addition, $W_C$ is set as the width (around 8 μm) at which the critical distance starts being leveled off in FIG. 5, or as the minimum waveguide width (7 to 8 μm) at which the bend radiation loss does not increase in FIG. 10.

As mentioned above, the taper-connected bend waveguide circuit 200 of the present embodiment is greatly different in configuration from a conventional bend waveguide circuit in that the waveguide width $W_0$ of the straight waveguide 201/205 and the waveguide width $W_C$ of the waveguide bend 203 are different from each other, and the straight waveguide 201/205 and the waveguide bend 203 are connected via the tapered waveguide bend 202/204. While taking advantage of the degree of freedom capable of independently optimizing waveguide width $W_0$ and $W_C$, setting $W_0$ as the waveguide width at which the waveguide connection loss is minimized and also setting $W_C$ as the waveguide width larger than $W_0$ and capable of suppressing the bend radiation loss can realize a low-loss bend waveguide circuit.

In FIG. 11, the width $W_0$ of the straight waveguide 201 is set to be constant and the straight waveguide 2011/205 and the tapered waveguide bend 202/204 are offset-connected. What is important in minimizing the waveguide connection loss is that the waveguide width at the connection point between the straight waveguide and the waveguide bend is set to be the above-described optimum waveguide width $W_0$.

Accordingly, in the case of connecting a straight waveguide 201A having a constant width $W_S$, which is different from the waveguide width $W_0$, to the tapered waveguide bend 202, a straight tapered waveguide 201B whose waveguide width varies from $W_S$ to $W_0$ may be inserted between the straight waveguide 201A and the tapered waveguide bend 202. Even in such a configuration, since the waveguide width takes the optimum waveguide width $W_0$ at the connection part between the straight tapered waveguide 201B whose curvature is zero and the tapered waveguide bend 202, the waveguide connection loss can be minimized. This is similarly applied to the straight waveguide 205. That is, it is sufficient that the waveguide width of the straight waveguide is $W_0$ as the waveguide width at the connection point where it is offset-connected to the tapered waveguide bend. The same applies to the following embodiments.

There are several variations in the shape for changing the waveguide width in the tapered waveguide bend 202/204. The simplest shape is a straight tapered shape in which the waveguide width W varies in proportion to the coordinate z along the waveguide direction. For example, in the case of the tapered waveguide bend 202, it can be defined by the following equation.

$$W(z) = a_s \cdot z + W_0 \quad \text{(Equation 1)}$$

In the case of the tapered waveguide bend 204, the coordinate z may be taken in the opposite direction. Here, $a_s$ is an increment of the waveguide width per unit length. When $a_s$ is made larger, the change from $W_0$ to $W_C$ occurs rapidly and therefore the length $L_{tpr}$ of the tapered waveguide bend 202 in the waveguide direction becomes shorter. However, if the increase is excessive, it will cause coupling to a radiation mode, which leads to the occurrence of loss. Further, in the case of the waveguide width larger than a waveguide width in which a higher-order mode exists, coupling to the higher-order mode occurs and the loss may be caused. Contrary, when $a_s$ is made smaller, the loss by the coupling to radiation mode/higher-order mode becomes smaller, but $L_{tpr}$ becomes longer. Accordingly, the coupling to radiation mode/higher-order mode is substantially negligible. That is, it suffices to select the value of $a_s$ such that the field distribution of the basic waveguide mode changes adiabatically, while the propagation energy of propagation light stays in the basic waveguide mode without being dissipated to other modes such as the radiation mode/higher-order mode.

As a shape better than the taper of the above-described straight tapered shape, there is a non-linear tapered shape in which the waveguide width W changes exponentially with respect to the coordinate z along the waveguide direction. For example, in the case of the tapered waveguide bend 202, it can be defined by the following equation.

$$W(z) = (W_0 + b) \cdot e^{a_e z} - b \quad \text{(Equation 2)}$$

In the case of the tapered waveguide bend 204, the coordinate z may be taken in the opposite direction. Here, $a_e$ is the change rate of the waveguide width per unit length. It suffices to select the value of $a_e$ such that the field distribution of the basic waveguide mode changes adiabatically, similar to the case of the taper of the straight tapered shape. The reason why the non-linear tapered shape is preferable is as follows.

As is well known, the coupling ratio of propagation light having field distribution widths $w_1$ and $w_2$ is $2w_1 w_2/(w_1^2 + w_2^2)$ when the field distributions are approximated by Gauss distribution. When one field distribution width is taken as a reference and $c_{\Delta_w} = (w_2 - w_1)/w_1$ represents the change rate of the other field distribution width, the coupling loss in decibel representation is almost proportional to 1.5 power of $c_{\Delta_w}$. This means that in the coupling of light having different field distributions the coupling loss becomes smaller when changing the field distribution step by step rather than changing the field distribution by a single step. For example, in the case of making light having a field distribution radius $w_1 = 1$ being coupled with light of $w_3 = 2$, if the step number of the coupling is only one, the change rate will be $c_{\Delta_w} = 1$ and the coupling loss will be approximately 1 dB. However, if a step of a field distribution of $w_2 = 2^{1/2}$ intervenes in this coupling, the rate of change from $w_1$ to $w_2$ will be $c\Delta w_1 \approx 0.41$ and the rate of change from $w_2$ to $w_3$ will be $c\Delta w_2 \approx 0.41$. The total coupling loss is 0.534 dB = 0.267 dB + 0.267 dB. As described above, when the change rate of the field distribution width in each step is the same ($c_{\Delta_{w1}} = c_{\Delta_{w2}}$), the coupling loss is the smallest. When the change rate in each step differs ($c_{\Delta_{w1}} \neq c_{\Delta_{w2}}$), the coupling loss becomes larger than the above value. This applies to any other multiple steps.

In an ordinary optical waveguide, since almost all the optical power is confined in the core, the waveguide width in a region where the optical confinement coefficient is constant and a little less than 1 is often used. Therefore, it can be considered that the waveguide width W and the field distribution width w of the propagation light are almost in a proportional relationship. Therefore, in the tapered waveguide having the non-linear tapered shape of Equation 2 (here, b=0 for the sake of simplicity), when the waveguide is dissected into minute sections $\Delta z$ in the propagation direction (z direction), the change rate $c_{\Delta_{w(i)}}$ of the field distribution width in each section i (i=1 to N) is always constant and the same. Accordingly, it is possible to effectively shorten taper length $L_{tpr}$ while suppressing the circuit excess loss due to the change in the waveguide width.

As described above, the waveguide width W and the field distribution width w of the propagation light are not strictly proportional. In particular, when the waveguide width is small, the optical confinement coefficient varies greatly. Further, the field distribution is not strictly the Gauss distribution. More precisely, it is desirable that the change rate of the field distribution is constant. That is, it is desirable to gradually change the waveguide width in such a manner that the coupling ratio $\eta_{tpr}$, which is the square of the absolute value of the overlap integral between normalized field distributions of the basic waveguide mode before and after propagation of minute sections, becomes constant in each section (in general, it becomes a non-linear width change). Equation 2 is a simple approximation representing the change in the waveguide width at which the overlap integral almost becomes constant.

As described above, the taper length of the tapered waveguide bend 202/204 requires the constant length $L_{tpr}$, in order to suppress the circuit excess loss due to the change in waveguide width. Accordingly, the bending angle of each tapered waveguide bend 202/204 is $\theta_{tpr} = L_{tpr}/R$ [rad]. When the required bending angle $\theta$ of the taper-connected bend waveguide circuit 200 is relatively large and satisfies $\theta > 2\theta_{tpr}$, it suffices to configure the bend waveguide circuit so as to have the configuration illustrated in FIG. 11, as described above. However, in the case of $\theta = 2\theta_{tpr}$, the taper-connected bend waveguide circuit 200 will be configured to exclude the waveguide bend 203 and include the straight waveguide 201, the tapered waveguide bend 202/204, and the straight waveguide 205 that are sequentially connected. Further, when the bending angle $\theta$ is relatively small and satisfies $\theta < 2\theta_{tpr}$, it suffices to exclude the waveguide bend 203 and set to taper length of the tapered waveguide bend 202/204 to be $L_{tpr}'=R\cdot\theta/2$ and also set the waveguide width $W_C$ of the thicker one of the tapered waveguide bends 202/204 to be up to waveguide width $W_C'$, which can be reached by this taper length $L_{tpr}'$.

Embodiment 2: Taper-Connected S-Bend Waveguide Circuit

Figure 12:
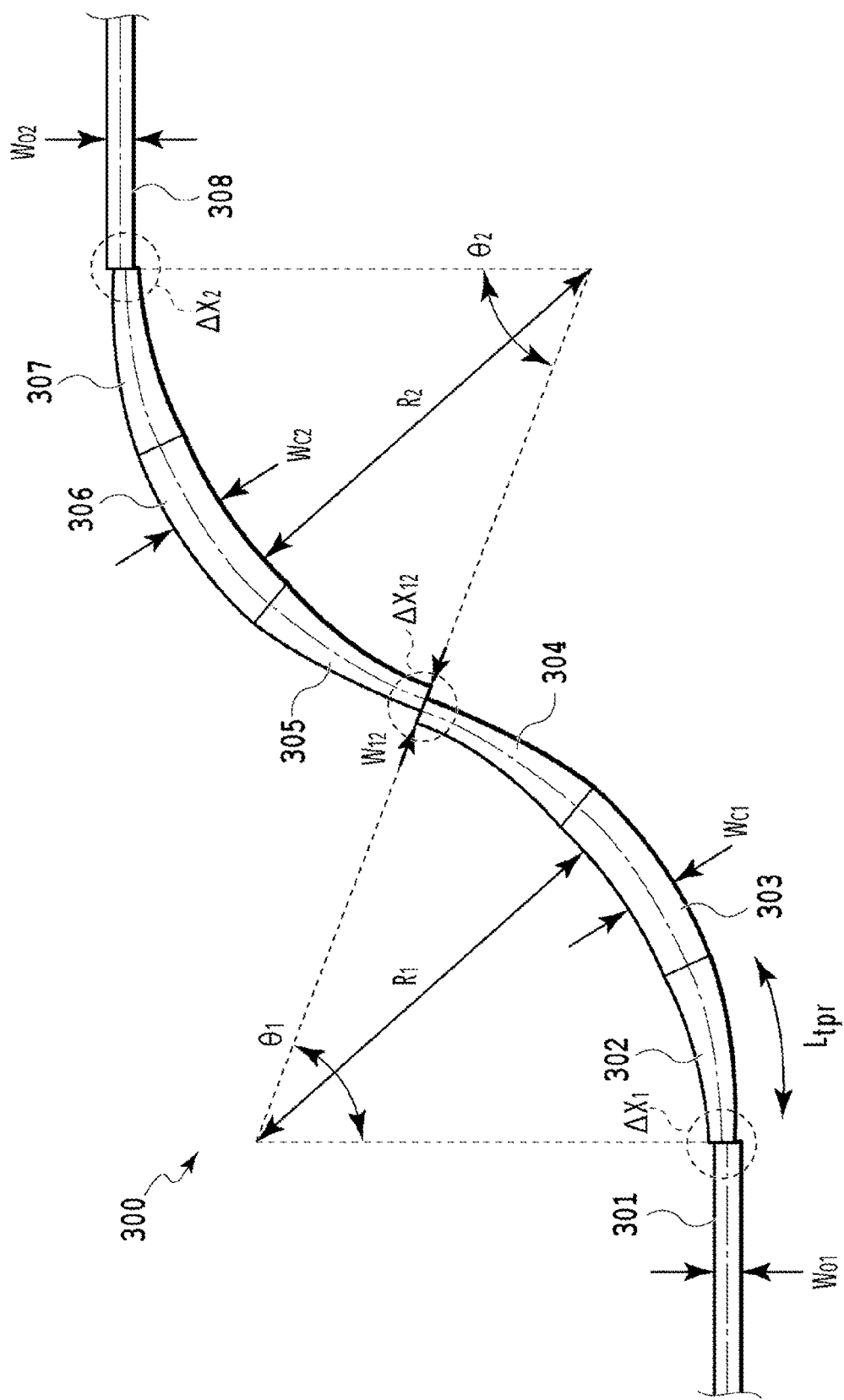
FIG. 12 is a diagram illustrating the configuration of a taper-connected S-bend waveguide circuit according to a second embodiment of the present invention.

FIG. 12 illustrates the configuration of a taper-connected S-bend waveguide circuit 300 according to a second embodiment of the present invention. The taper-connected S-bend waveguide circuit 300 is a waveguide circuit in which a straight waveguide 301, a tapered leftward waveguide bend 302, a leftward waveguide bend 303, a tapered leftward waveguide bend 304, a tapered rightward waveguide bend 305, a rightward waveguide bend 306, a tapered rightward waveguide bend 307, and a straight waveguide 308 are sequentially connected. The straight waveguide 301 has a waveguide width of $W_{01}$, the straight waveguide 308 has a waveguide width of $W_{02}$, the leftward waveguide bend 303 has a waveguide width of $W_{C1}$, and the rightward waveguide bend 306 has a waveguide width of $W_{C2}$. The straight waveguide and the waveguide bend are different in waveguide width, and the magnitude relationship is $W_{01}<W_{C1}$ and $W_{02}<W_{C2}$. The waveguide width of the tapered leftward waveguide bend 302 is $W_{01}$ at a portion connected to the straight waveguide 301 and $W_{C1}$ at a portion connected to the leftward waveguide bend 303. The tapered leftward waveguide bend 302 is configured in such a manner that the waveguide width gradually increases from $W_0$ to $W_{C1}$. The waveguide width of the tapered leftward waveguide bend 304 is $W_{C1}$ at a portion connected to the leftward waveguide bend 303 and $W_{12}$ at a portion connected to the tapered rightward waveguide bend 305. The tapered leftward waveguide bend 304 is configured in such a manner that the waveguide width gradually decreases from $W_{C1}$ to $W_{12}$. This waveguide width $W_{12}$ is an almost intermediate value between $W_{01}$ and $W_{02}$, as described below. The leftward waveguide bend 303 and the tapered leftward waveguide bend 302/304 have the same curvature radius $R_1$. The waveguide width of the tapered rightward waveguide bend 305 is $W_{12}$ at a portion connected to the tapered leftward waveguide bend 304 and $W_{C2}$ at a portion connected to the rightward waveguide bend 306. The tapered rightward waveguide bend 305 is configured in such a manner that the waveguide width gradually increases from $W_{12}$ to $W_{C2}$. The waveguide width of the tapered rightward waveguide bend 307 is $W_{C2}$ at a portion connected to the rightward waveguide bend 306 and $W_{02}$ at a portion connected to the straight waveguide 308. The tapered rightward waveguide bend 306 is configured in such a manner that the waveguide width gradually decreases from $W_{C2}$ to $W_{02}$. The rightward waveguide bend 306 and the tapered leftward waveguide bend 305/307 have the same curvature radius $R_2$.

The tapered leftward waveguide bend 302 is connected to the straight waveguide 301 in such a manner that the waveguide center position deviates by $\Delta_{x1}$ toward the inside of the bending. The tapered rightward waveguide bend 307 is connected to the straight waveguide 308 in such a manner that the waveguide center position deviates by $\Delta_{x2}$ toward the inside of the bending. Here, $\Delta_{x1}$ is an optimum shift amount at which the waveguide connection loss is minimized when the straight waveguide and the waveguide bend having the curvature radius $R_1$ are connected at the waveguide width $W_{01}$. $\Delta_{x2}$ is an optimum shift amount at which the waveguide connection loss is minimized when the straight waveguide and the waveguide bend having the curvature radius $R_2$ are connected at the waveguide width $W_{02}$.

At the connection point of the tapered leftward waveguide bend 304 and the tapered rightward waveguide bend 305, respective waveguide bends are connected in such a manner that the waveguide center position deviates toward the inside of the bending so as to provide a total offset of $\Delta_{x12}$. Here, $\Delta_{x12}$ is an optimum shift amount at which the waveguide connection loss is minimized when the waveguide bend having the curvature radius $R_1$ and the waveguide bend being opposite in bending direction and having the curvature radius $R_2$ are connected at the waveguide width $W_{12}$. That is, at the connection point, the tapered leftward waveguide bend 304 and the tapered rightward waveguide bend 305 are connected in such a manner that respective optical axes are offset toward the inside of the bending. Specifically, the shift amount is determined in such a manner that the square of the absolute value of the overlap integral between the normalized electric field distribution of the basic propagation mode of the tapered leftward waveguide bend 304 and the normalized electric field distribution of the basic propagation mode of the tapered rightward waveguide bend 305 can be maximized at the connection point of the both. As described above with respect to the shift amount dependency of the waveguide connection loss in FIG. 6, $\Delta_{x12}\approx\Delta_{x1}+\Delta_{x2}$, almost, because it suffices to align and connect the field distribution centers of respective waveguides. The leftward waveguide bend 303 and the tapered leftward waveguide bend 302/304 have the same curvature radius $R_1$. Further, since the waveguide width at the connection portion is the same $W_{C1}$, they are connected without any offset. Similarly, the rightward waveguide bend 306 and the tapered rightward waveguide bend 305/306 are connected without any offset. Although it is obvious, respective waveguides 301 to 308 are connected in such a manner that they have the same angle in the waveguide direction at their connection points.

The waveguide width $W_{01}$ of the straight waveguide 301 is selected as the waveguide width at which the waveguide connection loss is minimized when the straight waveguide and the waveguide bend having the curvature radius $R_1$ are connected using the optimum shift amount. The waveguide width $W_{C1}$ of the waveguide bend 303 is selected as the waveguide width at which the bend radiation loss in the waveguide bend having the curvature radius $R_1$ almost reaches the lower limit. The waveguide width $W_{02}$ of the straight waveguide 308 is selected as the waveguide width at which the waveguide connection loss is minimized when the straight waveguide and the waveguide bend having the curvature radius $R_2$ are connected using the optimum shift amount. The waveguide width $W_{C2}$ of the waveguide bend 306 is selected as the waveguide width at which the bend radiation loss in the waveguide bend having the curvature radius $R_2$ almost reaches the lower limit. The waveguide width $W_{12}$ of the connection portion between the tapered leftward waveguide bend 304 and the tapered rightward waveguide bend 305 is selected as the waveguide width at which the waveguide connection loss is minimized when the waveguide bend having the curvature radius $R_1$ and the waveguide bend being opposite in bending direction and having the curvature radius of $R_2$ are connected using the optimum shift amount. That is, the one selected is the waveguide width at which the square of the absolute value of the overlap integral between the normalized electric field distribution of the basic propagation mode of the tapered leftward waveguide bend 304 and the normalized electric field distribution of the basic propagation mode of the tapered rightward waveguide bend 305 is maximized. As described above with respect to the waveguide width dependency of the waveguide connection loss in FIG. 7, $W_{12} \approx (W_{01}+W_{02})/2$, almost.

As mentioned above, the taper-connected S-bend waveguide circuit 300 of the present embodiment is greatly different in configuration from the conventional S-bend waveguide circuit 100 in that the waveguide widths $W_{01}$ and $W_{02}$ of the straight waveguide 301/308 and the waveguide widths $W_{C1}$ and $W_{C2}$ of the leftward waveguide bend 303/rightward waveguide bend 306 are different from each other, wherein $W_{C1}$ and $W_{C2}$ are almost 1.5 to 1.8 times $W_{01}$ and $W_{02}$, as described above, the straight waveguide 301 and the leftward waveguide bend 303 are connected via the tapered leftward waveguide bend 302, the leftward waveguide bend 303 and the rightward waveguide bend 306 are connected via the tapered leftward waveguide bend 304 and the tapered rightward waveguide bend 305 at the waveguide width $W_{12}$ substantially, and the rightward waveguide bend 306 and the straight waveguide 308 are connected via the tapered rightward waveguide bend 307. While taking advantage of the degree of freedom capable of independently optimizing the waveguide widths $W_{01}$, $W_{02}$, $W_{12}$, $W_{C1}$, and $W_{C2}$, setting $W_{01}$, $W_{02}$, and $W_{12}$ as the waveguide width at which the waveguide connection loss is minimized and also setting $W_{C1}$, $W_{C2}$ as the waveguide width larger than $W_{01}$, $W_{02}$, and $W_{12}$ and capable of suppressing the bend radiation loss can realize a low-loss S-bend waveguide circuit.

In many S-bend waveguide circuits, $R_1=R_2$ is often used from the viewpoint of easiness in pattern design and homogenization/reduction of circuit excess loss. Regarding the waveguide width $W_{C1}$ of the leftward waveguide bend 303 and the waveguide width $W_{C2}$ of the rightward waveguide bend 306, in the case of $R_1 \neq R_2$, the waveguide width at which the bend radiation loss almost reaches the lower limit is slightly different between them. Therefore, it is desirable to select the optimum value for each (namely, $W_{C1} \neq W_{C2}$). However, when the smallness of the difference between the optimum $W_{C1}$ and the optimum $W_{C2}$ is taken into consideration, the same value may be set from the viewpoint of simplifying the pattern design. Further, when the straight waveguide 301 is not parallel to the straight waveguide 308, $\theta_1 \neq \theta_2$.

Regarding the shape change with respect to the waveguide width in the tapered leftward waveguide bend 302/304 and the tapered rightward waveguide bend 305/306, similar to Embodiment 1, the tapered shape represented by Equation 1 or the non-tapered shape expressed by Equation 2 can be used.

Further, similar to Embodiment 1, the leftward waveguide bend 303 and the rightward waveguide bend 306 are excludible depending on the required bending angles $\theta_1$ and $\theta_2$ of the taper-connected S-bend waveguide circuit 300. Further, the waveguide width $W_{C1}$ of the thicker one of the tapered leftward waveguide bends 302/304 or the waveguide width $W_{C2}$ of the thicker one of the tapered rightward waveguide bends 305/307 may be set to be up to a reachable waveguide width.

Embodiment 3: Taper-Connected W-Bend Waveguide Circuit

Figure 13:
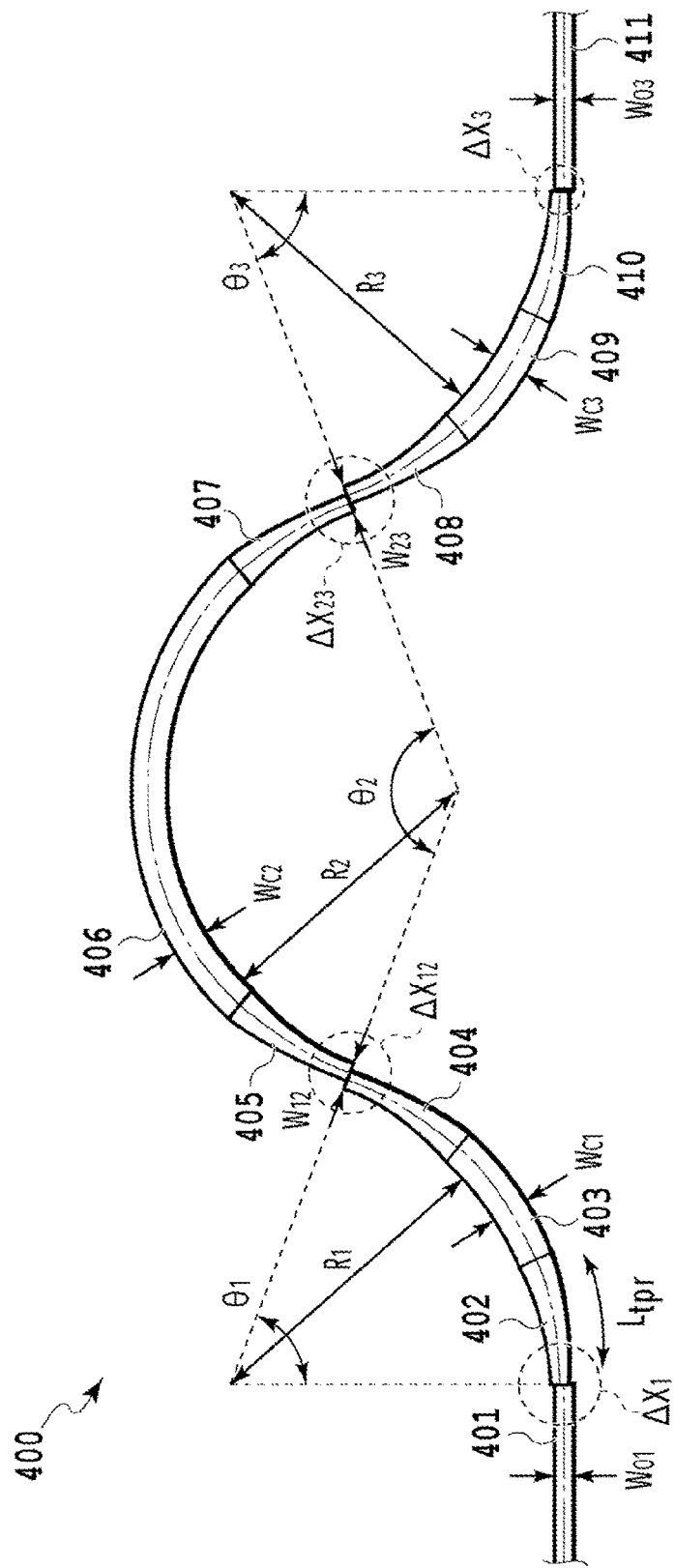
FIG. 13 is a diagram illustrating the configuration of a taper-connected W-bend waveguide circuit according to a third embodiment of the present invention.

FIG. 13 illustrates the configuration of a taper-connected W-bend waveguide circuit 400 according to a third embodiment of the present invention. The taper-connected W-bend waveguide circuit 400 is a waveguide circuit in which a straight waveguide 401, a tapered leftward waveguide bend 402, a leftward waveguide bend 403, a tapered leftward waveguide bend 404, a tapered rightward waveguide bend 405, a rightward waveguide bend 406, a tapered rightward waveguide bend 407, a tapered leftward waveguide bend 408, a leftward waveguide bend 409, a tapered leftward waveguide bend 410, and a straight waveguide 411 are sequentially connected. This circuit is used as a delay circuit or the like for providing a predetermined difference in optical path length. This circuit is configured to further include the tapered leftward waveguide bend 408, the leftward waveguide bend 409, and the tapered leftward waveguide bend 410, in addition to the taper-connected S-bend waveguide circuit 300 of Embodiment 2. The configuration of each part (tapered shape or the like), the optimum value of the waveguide width in each portion, and the optimum shift amount at each waveguide connection part are similar to those in Embodiment 2. Further, similar to Embodiment 2, respective waveguides 401 to 411 are connected in such a manner that respective waveguides have the same connection angle at each connection point. Further, the reason why the circuit excess loss can be reduced is the same as that of Embodiment 2.

Here, it is assumed that the tapered leftward waveguide bend 402, the leftward waveguide bend 403, and the tapered leftward waveguide bend 404 constitute a first waveguide bend group. The tapered rightward waveguide bend 405, the rightward waveguide bend 406, and the tapered rightward waveguide bend 407 constitute a second waveguide bend group. The tapered leftward waveguide bend 408, the leftward waveguide bend 409, and the tapered leftward waveguide bend 410 constitute a third waveguide bend group. It can be said that the taper-connected bend waveguide circuit 200 of Embodiment 1 is a waveguide circuit in which straight waveguides are connected to the front and rear ends of the first waveguide bend group. The taper-connected S-bend waveguide circuit 300 of Embodiment 2 is a waveguide circuit in which straight waveguides are connected to the front and rear ends of a tandem waveguide circuit connection composed of the first and second waveguide bend groups. The taper-connected W-bend waveguide circuit 400 of Embodiment 3 is a waveguide circuit in which straight waveguides are connected to the front and rear ends of a tandem waveguide circuit connection composed of the first to third waveguide bend groups. Accordingly, regarding an N-bend waveguide circuit in which straight waveguides are connected to the front and rear ends of a tandem waveguide circuit connection composed of a total of N waveguide bend groups, the ideas of Embodiments 1 to 3 are applicable and can be easily expanded as a taper-connected N-bend waveguide circuit of the present invention.

Addition of Clothoid Connection

In the first to third embodiments, the waveguide width of the waveguide connection part and the waveguide width of the waveguide bend are independently optimized by inserting the tapered waveguide bend to the connection part between the straight waveguide and the waveguide bend, or to the connection part between the waveguide bend and the waveguide bend being opposite in bending direction. By selecting the waveguide width at which the waveguide connection loss is minimized in the waveguide connection part and the waveguide width capable of suppressing the bend radiation loss in the waveguide bend, the low-loss waveguide bend has been realized. However, as can be understood from the graph of the relationship between the waveguide connection loss and the waveguide width in FIG. 7, a slight waveguide connection loss remains even in the case of selecting the optimum shift amount and the optimum waveguide width in the connection of each waveguide. In particular, the smaller the curvature radius of the waveguide bend, the larger the waveguide connection loss at the optimum waveguide width remains. This is because, as described above, the field distribution disagreement remains due to the asymmetry of the field distribution at the waveguide connection part. The smaller the curvature radius of the waveguide bend, the larger the asymmetry of the field distribution. Thus, the disagreement with a symmetric field distribution of the straight waveguide, or the disagreement with a field distribution that is opposite in direction of asymmetry of a waveguide bend being opposite in bending direction, becomes larger.

In order to reduce the waveguide connection loss due to this asymmetry of the field distribution, further ingenuity is required. Since the cause is basically the disagreement in field distribution, it suffices to gradually change the field distribution symmetry based on the same idea as the above-described discussion on the tapered waveguide. Specifically, in the case of connecting waveguide bends to a straight waveguide, a waveguide bend having a large curvature radius is first connected, then waveguide bends having bending radii decreasing step by step are sequentially connected, and finally a waveguide bend having an intended curvature radius is connected. A representative example of the above is a clothoid connection using waveguides in which waveguide bends are arranged so that the curvature gradually changes (as a clothoid curve).

The waveguide of a clothoid connection part has a curved shape in which the curvature k=1/R changes by a constant value for each constant waveguide length ΔL. Here, R represents a curvature radius of a waveguide bend having the waveguide length ΔL. For example, when $L_{clt}$ represents a path length of a clothoid waveguide and z represents the coordinate of the path along the waveguide direction, the curvature radius R of the waveguide changes as follows in the case of the clothoid waveguide.

$$R(z) = 1 / \left\{ \left( \frac{1}{R_N} - \frac{1}{R_0} \right) \frac{z}{L_{clt}} + \frac{1}{R_0} \right\}$$ (Equation 3)

Here, $R_0$ represents a curvature radius at the first waveguide portion (z=0), and $R_N$ represents a curvature radius at the last waveguide portion (z=$L_{clt}$). When it is used for connection from a straight waveguide to a waveguide bend of a curvature radius $R_C$, $R_0 = \infty$ and $R_N = R_C$. In this case, the coefficient of z is $k_C/L_{clt}$. Here, $k_C$ represents a curvature $k_C = 1/R_C$ of the waveguide bend having the curvature radius $R_C$. This coefficient $k_C/L_{clt}$ means a change rate of the curvature per unit waveguide length (unit path length), and it suffices to select the value such that the field distribution of the basic waveguide mode changes adiabatically, similar to the case of the above-described tapered waveguide. That is, it suffices to select the path length $L_{clt}$ appropriately so as to match the curvature radius of a waveguide bend to be connected.

Clothoid Tapered Waveguide

When incorporating the above-described clothoid connection into a tapered waveguide bend to configure a clothoid tapered waveguide in which the waveguide width and the curvature radius gradually change, the waveguide width may be independently determined according to Equation 1 or Equation 2 and also the curvature radius may be independently determined according Equation 3. That is, in setting the waveguide width, it is sufficient that at a connection point of two minute sections ΔL the square of the absolute value of the overlap integral between normalized electric field distributions of the both becomes constant. In the case of a linear tapered shape, the setting may be based on Equation 1. In the case of a non-linear tapered shape, the setting may be based on Equation 2. Further, it suffices to set the curvature radius based on Equation 3 such that a derivative value of the curvature with respect to the waveguide direction becomes constant. Specifically, it is sufficient that at the connection point of two minute sections ΔL the curvature changes such that the square of the absolute value of the overlap integral between normalized electric field distributions of the both becomes constant.

However, from the viewpoint of the basic principle of making the field distribution change rate as constant as possible, it is desirable to put further ingenuity into practice as described below.

First, the field distribution change rate in the clothoid waveguide is checked. The field distribution in the clothoid waveguide changes gradually with propagation, but its change occurs not only in the asymmetry of the field distribution but also at the center position of the field distribution. As understood from FIG. 6, the waveguide connection loss when the shift amount is zero (the waveguide connection loss due to the asymmetry of the field distribution and the positional deviation of the field distribution center) is much larger than the waveguide connection loss when the waveguide center position is adjusted to the optimum shift amount (the waveguide connection loss due to the asymmetry of the field distribution). Accordingly, when observing the field distribution change rate caused by the propagation, it suffices to pay attention mainly on the positional deviation of the field distribution center.

Next, it is checked how the field distribution center changes with propagation, in a simple clothoid waveguide in which the waveguide width is constant. The optimum shift amount Δx of the waveguide center when connecting a straight waveguide to a waveguide bend having the curvature radius R by offset connection is considered to represent the amount of positional deviation of the field distribution center in the waveguide bend. This value is almost in inverse proportion to the curvature radius R as in the following equation.

$$\Delta x = \alpha(W)/R$$ (Equation 4)

Here, α(W) represents a proportional coefficient that is variable depending on the waveguide width W. When the waveguide width W is constant, α(W) becomes a constant value and Equation 4 can be rewritten using Equation 3 as follow.

$$\Delta x(z) = \frac{\Delta x_C}{L_{clt}} \cdot z$$ (Equation 5)

Here, $\Delta x_C$ is an optimum shift amount in the waveguide bend having the curvature radius $R_C$. Further, in the used Equation 3, $R_0 = \infty$ and $R_N = R_C$ are set. As understood from this equation, the clothoid waveguide can be construed as a waveguide in which the curvature radius R varies in such a manner that the optimum shift amount Δx due to bending changes in proportion to the z-direction path (propagation distance). Even in general cases including the case of $R_0 \neq \infty$, the clothoid waveguide can be construed as a waveguide in which the curvature radius R varies in such a manner that the optimum shift amount due to bending changes (linearly changes) like a linear function of the path (propagation distance). Roughly speaking, since the field distribution center causes a lateral deviation at a constant rate with propagation, this waveguide can be said to have an almost constant field distribution change rate.

However, in the case of the waveguide width W changing with propagation, configuring the clothoid waveguide using an ordinary clothoid curve in which the curvature radius changes according to Equation 3 may negate the constancy of the field distribution change rate, as will be described below. First, since the coefficient α(W) is a coefficient that depends on the waveguide width W, when the ordinary clothoid curve is used, an optimum shift amount Δx(z) obtainable from Equation 4, namely the positional deviation of the field distribution center, changes non-linearly with respect to the path (propagation distance).

Figure 14:
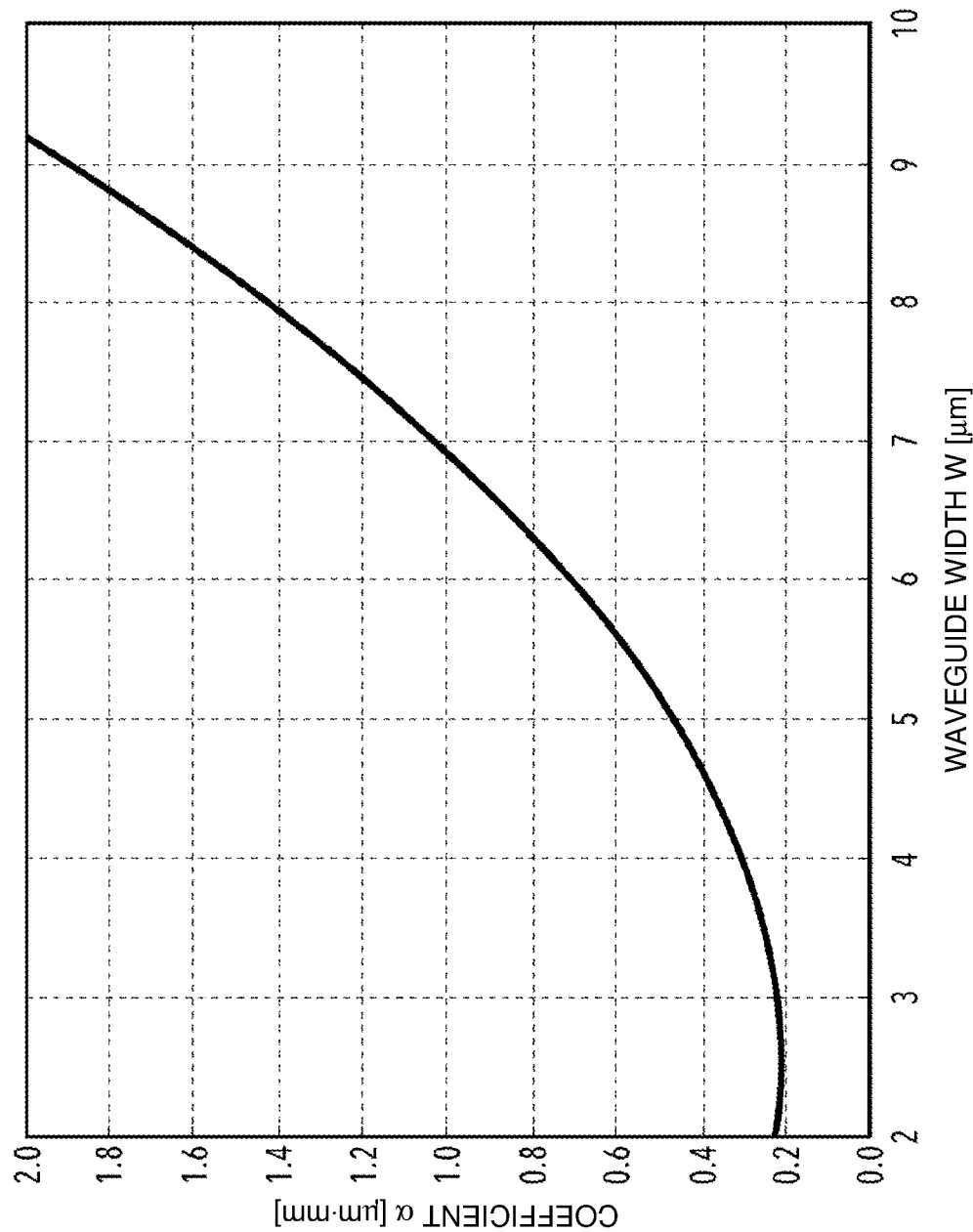
FIG. 14 is a diagram illustrating waveguide width dependency of coefficient α.

FIG. 14 illustrates waveguide width dependency of coefficient α. The coefficient α(W) is calculated based on the optimum shift amount obtainable from FIG. 6, and has quadratic characteristics. Accordingly, in the case of the waveguide width varying from a thin width to a thick width, the field distribution center of an ordinary clothoid waveguide changes in a shape close to a cubic function of the path (propagation distance), and does not cause a deviation of a constant ratio (linear functional change). Next, the coupling ratio of two propagation lights having the same field distribution width w, wherein one field distribution center is deviated from the other field distribution center by δx, becomes $\exp(-(\delta x/w)^2)$, as is well known, when the field distribution is approximated by the Gauss distribution. Further, as described above for the tapered waveguide, the field distribution width w of the propagation light changes depending on the waveguide width W. Therefore, when the waveguide width W is different, the coupling ratio, namely, the field distribution change rate, is different even when the field distribution center deviation δx is the same. From the above reason, in the case of the clothoid waveguide based on the ordinary clothoid curve, it can be understood that the field distribution change rate is not constant.

Accordingly, in order to keep the field distribution change rate constant, it is necessary to obtain an allowable change amount δx(W) of the field distribution center per unit propagation length, considering the field distribution width w corresponding to the waveguide width W, and obtain a curvature radius of a corresponding minute section from this δx(W) considering α(W).

Specifically, it suffices to set the changes of the waveguide width and the curvature at a connection point of two minute sections δL in such a manner that the square of the absolute value of the overlap integral between normalized electric field distributions of the both becomes constant. The curvature k of the clothoid tapered waveguide bend satisfies the equation (6) with respect to the coordinate z along the waveguide direction of this waveguide.

$$k(z) = \Delta s(z)/\alpha(W(z))$$

$$\left| \int\int E^*(W(z), s=0) \cdot E\left(W(z), s = \frac{d\Delta s(z)}{dz}\delta L\right) dx dy \right|^2 = Const.$$

(Equation 6)

Here, in a waveguide having the waveguide width W, when the square of the absolute value of the overlap integral between respective normalized electric field distributions of the basic propagation mode of a waveguide bend having the curvature radius R and a straight waveguide is maximized, α(W) is a value obtained by multiplying the curvature radius R of the waveguide bend with an offset value between the waveguide center of the waveguide bend and the waveguide center of the straight waveguide, Δs(z) represents an estimated shift amount of the field distribution at z, an x-y-z rectangular coordinate system defines a space, E represents a normalized field distribution of a straight waveguide having the waveguide width W and a waveguide center shifted by s in the waveguide width direction, * represents a complex conjugate, W(z) represents a waveguide width at z, and δL represents a waveguide length of the minute section.

Figure 15:
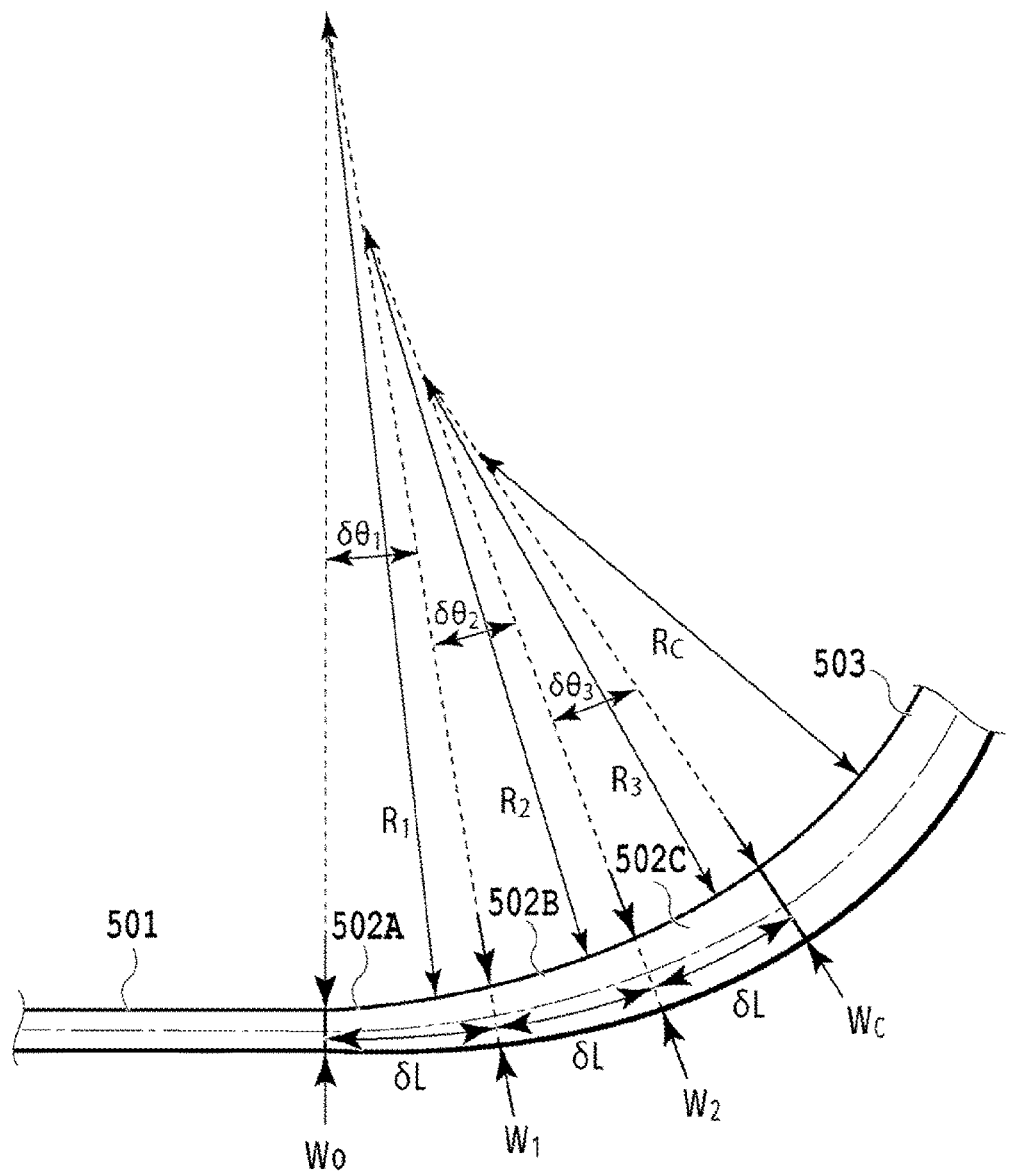
FIG. 15 is a diagram illustrating the configuration of a clothoid tapered waveguide bend.

FIG. 15 illustrates the configuration of a clothoid tapered waveguide bend, which is a clothoid tapered waveguide bend 502 that connects a straight waveguide 501 having the waveguide width $W_0$ and a waveguide bend 503 having the waveguide width $W_C$ and the curvature radius $R_C$. The clothoid tapered waveguide bend 502 is configured as a cascade connection of waveguides, which is composed on minute sections each having a waveguide length δL. FIG. 15 illustrates three sections configured by minute waveguide 502A to 502C. As the configuration of each minute waveguide, there are various configurations such as a simple straight waveguide, a tapered straight waveguide whose waveguide width differs at the beginning and the end, a simple waveguide bend, and a tapered waveguide bend whose waveguide width differs at the beginning and the end. When δL is sufficiently small, the difference between respective configurations can be effectively eliminated. Therefore, any configuration may be adopted. Hereinafter, the configuration using the tapered waveguide bend that is the smoothest in connecting respective sections and is advantageous in reducing the circuit excess loss will be mainly described in detail.

Parameters of the minute waveguide in the i-th section are waveguide width $W_{i-1}$ at the start point of the minute section, waveguide width $W_i$ at the end point of the minute section, curvature radius $R_i$, (or curvature $k_i=1/R_i$), and bending angle $\delta\theta_i$. In the following procedure (steps), these values are determined, and finally the coordinates of the minute waveguide are determined. The waveguide length (section length) of each section is basically the constant value δL.

(1) Calculation of Waveguide Width $W_i$:

Using the method such as Equation 1 or Equation 2 described above for the tapered waveguide, the waveguide width $W_i$ at the end point after δL propagation is calculated with reference to the waveguide width $W_{i-1}$ at the start point. The waveguide width at the start point is the waveguide width at the end point of a minute waveguide in the previous section ((i−1)th section). In the first section, this is the waveguide width $W_0$ of the straight waveguide 501. Further, if the waveguide width $W_i$ at the end point calculated as described above has passed $W_C$, it is forcibly set to $W_i=W_C$. At this time, δL may be appropriately shorten only in this section so that the relationship $W_i=W_C$ can be obtained in the calculation.

(2) Calculation of Field Distribution Shift Amount $\Delta x_i$:

For example, as a waveguide width $W_i'$ of this section, a median value $(W_i+W_{i-1})/2$ obtainable with reference to the waveguide width $W_i$ at the end point and the waveguide width $W_{i-1}$ at the start point, or an average value among the sections, is used to obtain an allowable change amount $\delta x_i$ ($W_i'$) of the field distribution center. As mentioned above, this $\delta x_i$ is obtained as a value at which the coupling ratio of two propagation lights, in which one field distribution center deviates from the other field distribution center by $\delta x_i$, in the field distribution of propagation light at the waveguide width $W_i'$, becomes a predetermined constant value $\eta_{clt}$ (a value sufficiently close to 1, namely, a value at which the coupling loss becomes a sufficiently small value). Regarding this constant value $\eta_{clt}$, the same value is used in all sections. However, in a section in which $\delta L$ is different from the ordinary value, the value of $\eta_{clt}$ is appropriately adjusted according to the value of $\delta L$. A value obtainable by adding this $\delta x_i$ to a field distribution shift amount $\Delta x_{i-1}$ of the previous section ((i−1)th section) is defined as a field distribution shift amount $\Delta x_i$ of this section. That is, $\Delta x_i$ is calculated as $\Delta x_i = \Delta x_{i-1} + \delta x_i$. In the first section, the field distribution shift amount of the straight waveguide 501 is $\Delta x_0 = 0$.

Figure 16:
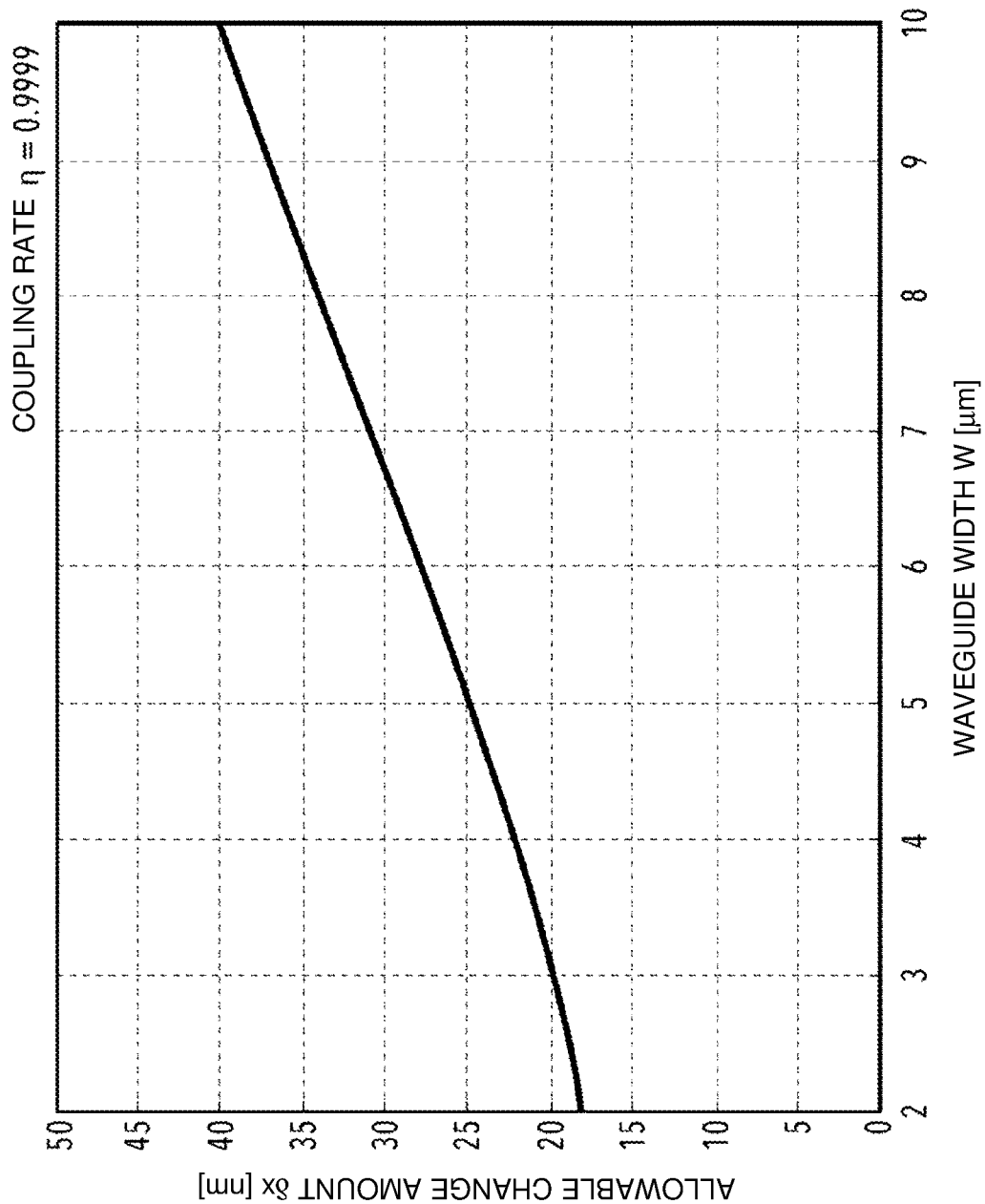
FIG. 16 is a diagram illustrating waveguide width dependency of an allowable change amount of a field distribution central position.

As an example, FIG. 16 illustrates waveguide width W dependency of the allowable change amount $\delta x$ of the field distribution center, in the case of coupling ratio $\eta_{clt} = 0.9999$, as a result of numerical calculation using the field distribution of a straight waveguide according to the Marcatili's method. Although it cannot be said to be a linear characteristic, the change is almost a linear function in a region where the waveguide width is thick ($\geq 4$ μm). Here, the above calculation is based on the field distribution of a straight waveguide (although this is an approximate calculation having no problem), but in order for more accurate calculation, it is preferable to use the field distribution of a waveguide bend having the curvature radius $R_i$. However, the curvature radius $R_i$ in this section is calculated in the following step (3) and cannot be used in the step (2). Therefore, a curvature radius $R_{i-1}$ in the previous section is used technically.

(3) Calculation of Curvature Radius $R_i$:

From $W_i'$ of this section and the field distribution shift amount $\Delta x_i$, the curvature radius $R_i$ of this section is calculated using Equation 4, namely, $R_i = \alpha(W_i')/\Delta x_i$. In the case of $R_i$ having passed $R_C$, it is forcibly set to $R_i = R_C$.

(4) Calculation of Bending Angle $\delta\theta_i$:

From $R_i$ in this section, the bending angle $\delta\theta_i$ is calculated using $\delta\theta_i = \delta L/R_i$.

As mentioned above, until a section N where the waveguide width reaches $W_C$ and the curvature radius reaches $R_C$, the parameters relating to the minute waveguide of each section are sequentially determined and the minute waveguides of respective sections are smoothly connected. That is, the clothoid tapered waveguide bend 502 is configured through sequential connection in which the start-point position/angle in waveguide direction at the start point of this section and the end-point position/angle in waveguide direction at the end point of the previous section are made match. At the start-point portion of the clothoid tapered waveguide bend 502, which is connected to the straight waveguide 501, the curvature radius is substantially ∞ (the curvature is substantially zero) and therefore the field distribution center causes no positional deviation. Accordingly, the straight waveguide 501 and the clothoid tapered waveguide bend 502 are connected so that the waveguide centers coincide with each other. That is, they are connected without any offset. Regarding the end-point portion of the clothoid tapered waveguide bend 502 connected to the waveguide bend 503, the waveguide width is $W_C$ and the curvature radius is $R_C$, and these are the same as the waveguide width $W_C$ and the curvature radius $R_C$ of the waveguide bend 503 to be connected. Therefore, they have the same amount of positional deviation with respect to the field distribution center at the connection point. Accordingly, the clothoid tapered waveguide bend 502 and the waveguide bend 503 are connected so that the waveguide centers coincide with each other. That is, they are connected without any offset. Although it is obvious, respective waveguides 501 to 503 are connected in such a manner that they have the same angle in the waveguide direction at their connection points.

In the case of configuring the minute waveguide by a simple straight waveguide, it suffices to sequentially connect straight waveguides each having the waveguide width $W_i'$ at start/end-point positions of respective sections. In the case of configuring the minute waveguide by a simple waveguide bend, it suffices to sequentially connect waveguide bends each having the curvature radius $R_i$ and the waveguide width $W_i'$ at start/end-point positions of respective sections. In the case of configuring the minute waveguide by a tapered straight waveguide, it suffices to sequentially connect tapered straight waveguides each having the start-point waveguide width $W_{i-1}$ and the end-point waveguide width $W_i$ at start/end-point positions of respective sections.

Further, depending on the magnitude relationship between the waveguide width $W_0$ of the straight waveguide 501 and the waveguide width $W_C$ of the waveguide bend 503, and the curvature radius $R_C$, a section in which the curvature radius does not reach $R_C$ may occur, even though the waveguide width has reached $W_C$, in the latter half sections. In such a section (waveguide width reaching section), it suffices to set $W_i = W_C$ in step (1) and then perform the calculations of steps (2) to (4). On the contrary, a section in which the waveguide width does not reach $W_C$ may occur, even though the curvature radius has reached $R_C$, in the latter half sections. In such a section (curvature radius reaching section), it suffices to set $R_i = R_C$ in step (3) and then performs the calculations of steps (1), (2), and (4). In these sections, the change in field distribution due to the propagation is cased only by the change in waveguide width or the change in curvature radius. Therefore, the field distribution change rate is smaller than that of the section in which both the changes occur. From the viewpoint of the basic principle of making the field distribution change rate as constant as possible, it is desirable to adjust the above-described $\eta_{clt}$ it in the waveguide width reaching section and adjust $\eta_{tpr}$ in the curvature radius reaching section, so that the field distribution change rate becomes constant throughout all the sections.

In this specification, the method for configuring the clothoid tapered waveguide bend 502 by connecting a finite number of minute waveguides has been described. However, the path length (section length) $\Delta L$ of the minute waveguide may be designed as infinitesimal so that a continuous waveguide can be substantially configured.

Further, in the above description, field distribution calculation results by the equivalent refractive index method based Slab approximation or the Marcatili's method have been used in calculating the coefficient $\alpha(W)$ and the allowable change amount $\Delta x(W)$ used in the design. However, in order for more accurate design, it is desirable to use calculation results of the field distribution based on the mode solver or the like obtainable using the finite element method/boundary element method. Further, it is also desirable to use any results obtainable by analyzing measurement data from the S-bend waveguide circuit 100 described above or the like.

Figure 17:
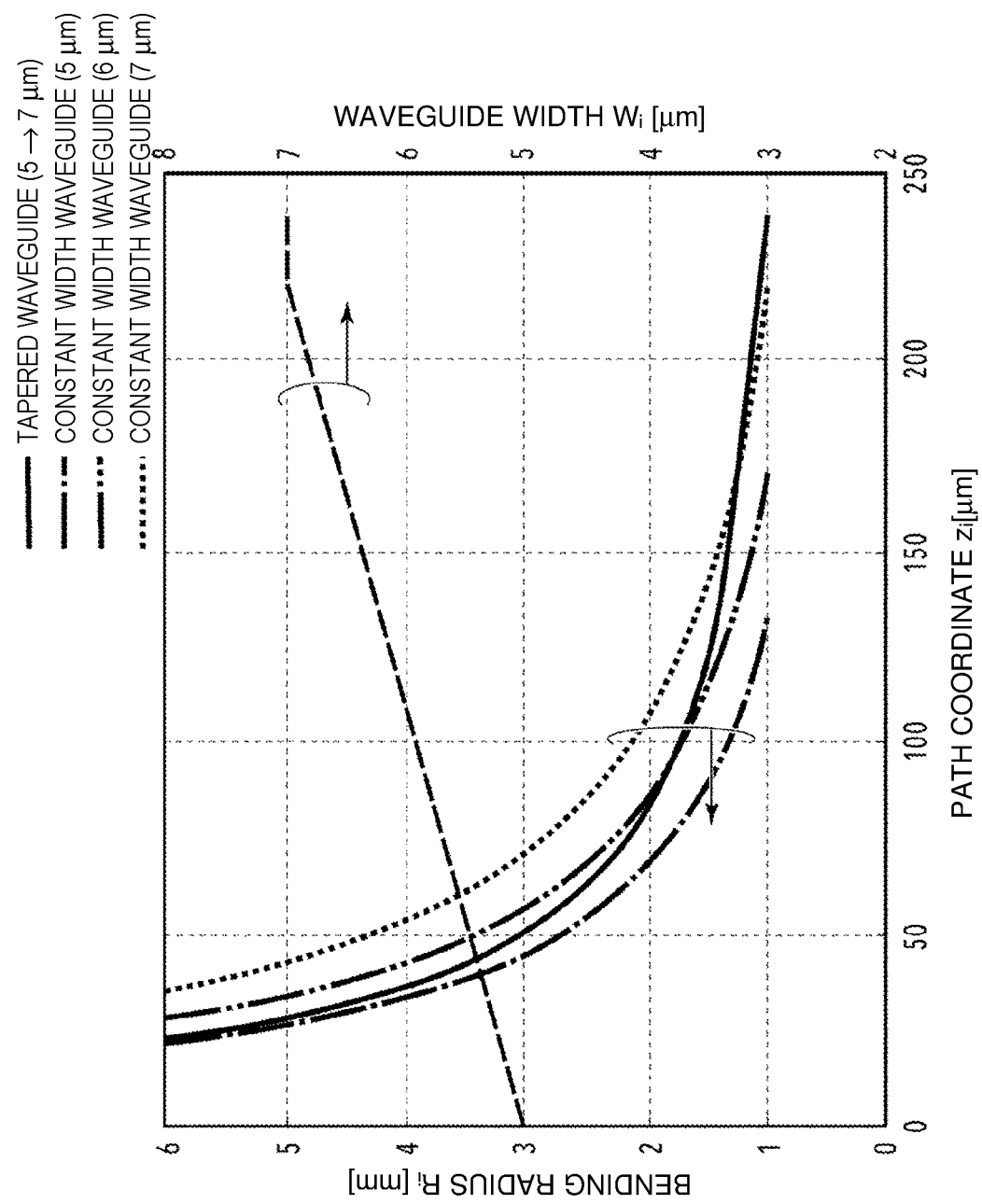
FIG. 17 is a diagram illustrating parameter examples of the clothoid tapered waveguide bend.

FIG. 17 illustrates a concrete parameter design example of the clothoid tapered waveguide bend 502, in which design values are $W_0 = 5$ μm, $W_C = 7$ μm, $R_C = 1$ mm, and $\delta L = 1$ μm. The horizontal axis is coordinate $z_i = i \cdot \delta L$ of the clothoid tapered waveguide bend 502 along the path in the waveguide direction. The left vertical axis is the curvature radius $R_i$ in each section. The right vertical axis is the waveguide width $W_i$ in each section. The solid line indicates the curvature radius, and the short dashes line indicates the waveguide width. For reference, the curvature radius designed when the waveguide width is constant from the beginning to the end is also illustrated. An alternate long and short dash line is the case where the waveguide width is constant at 5 µm. An alternate long and two short dashes line is the case of 6 µm constant. A dotted line is the case of 7 µm constant. That is, in the case of a simple clothoid waveguide in which the waveguide width does not vary, or in the case where $R_i$ is not in conjunction with $W_i$ and independently designed, the curvature radius changes like the alternate long and short dash line, the alternate long and two short dashes line, and the dotted line. The change in the curvature radius of the clothoid tapered waveguide bend 502 indicated by the solid line is a characteristic change that is apparently different from those. This characteristic occurs because $R_i$ and $W_i$ are designed in conjunction with each other so that the field distribution change rate becomes constant, as described above.

Configuring the clothoid tapered waveguide as mentioned above can make the rate of field distribution change due to the propagation constant, even in the waveguide in which the waveguide width and the curvature radius vary. As a result, while the circuit excess loss due to the changes in waveguide width and curvature radius is suppressed, a path length $L_{cltpr}$ of the clothoid tapered waveguide can be effectively shortened.

In the case illustrated in FIG. 15, the waveguide width $W_C$ of the waveguide bend 503 is larger than the waveguide width $W_0$ of the straight waveguide 501. The clothoid tapered waveguide bend 502 will be established if it is designed through the above-described procedure, even when $W_0 > W_C$, as will be de exemplarily illustrated in the following embodiments 9 and 10. Even in this case, using the clothoid tapered waveguide bend can reduce the different-curvature waveguide connection loss to an extremely small value. Of course, as described in Embodiments 1 to 3, it is generally preferable that the waveguide width of a waveguide bend is wider than that of a liner waveguide because the bend radiation loss can be suppressed. That is, the clothoid tapered waveguide bend is configured in such a manner that the product of a derivative value of the absolute value of the curvature with respect to the waveguide direction and a derivative value of the waveguide width with respect to the waveguide direction is equal to or greater than zero.

Although the clothoid tapered waveguide 502 connecting the straight waveguide 501 to the waveguide bend 503 having the curvature radius $R_C$ has been exemplarily described in the above description, similar way of thinking is of course applicable to a clothoid tapered waveguide that connects waveguide bends differentiated in curvature radius. Accordingly, the clothoid tapered waveguide bend of the present embodiment is an optical waveguide inserted between a first waveguide and a second waveguide, in which the waveguide width continuously changes from a first waveguide width at a connection point of the first waveguide to a second waveguide width at a connection point of the second waveguide, the curvature radius continuously changes from a first curvature radius at the connection point of the first waveguide to a second curvature radius at the connection point of the second waveguide, the first waveguide width and the second waveguide width are different from each other, and the first curvature radius and the second curvature radius are different from each other. Therefore, the usage of the clothoid tapered waveguide having such a configuration can reduce the waveguide connection loss to an extremely small value when connecting waveguides differentiated in waveguide width and curvature. Further, this connection waveguide can be configured to have a short length.

Embodiment 4: Clothoid Taper-Connected Bend Waveguide Circuit

Figure 18:
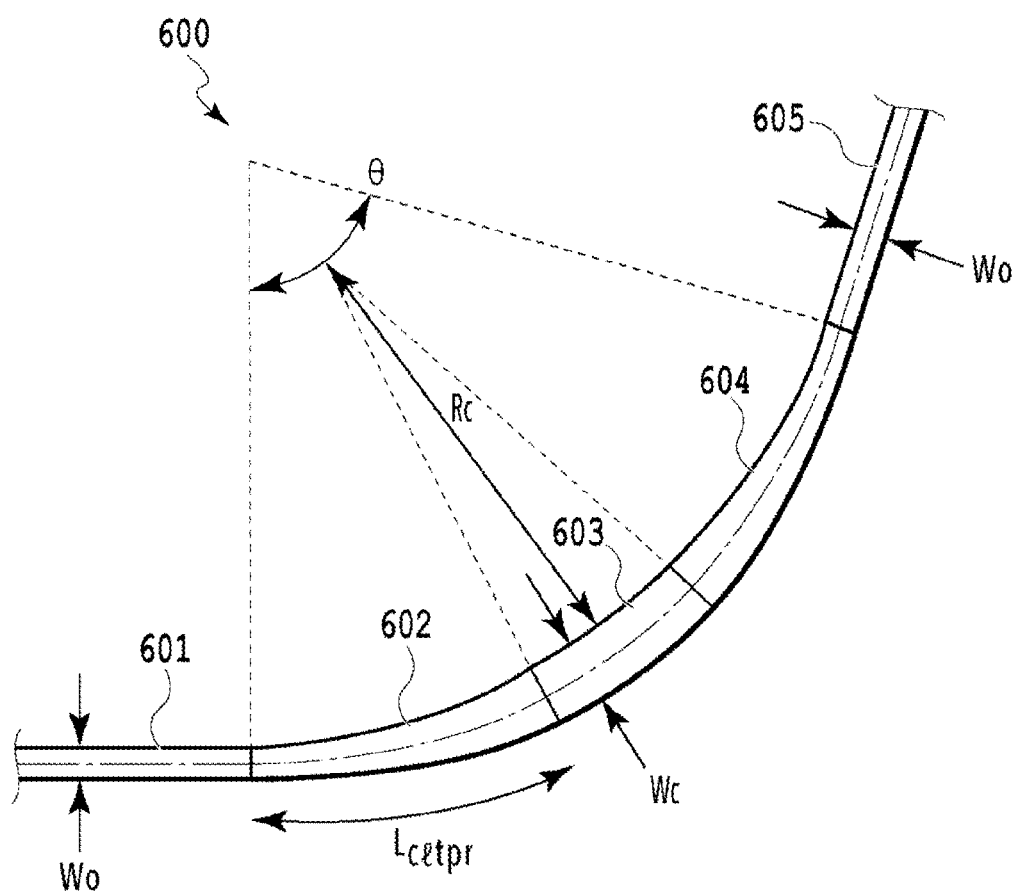
FIG. 18 is a diagram illustrating the configuration of a clothoid taper-connected bend waveguide circuit according to a fourth embodiment of the present invention.

FIG. 18 illustrates the configuration of a clothoid taper-connected bend waveguide circuit 600 according to a fourth embodiment of the present invention. The clothoid taper-connected bend waveguide circuit 600 is a waveguide circuit in which a straight waveguide 601, a clothoid tapered waveguide bend 602, a waveguide bend 603 having a curvature radius $R_C$ (curvature $k_C=1/R_c$), a clothoid tapered waveguide bend 604, and a straight waveguide 605 are sequentially connected. This configuration can be obtained by replacing the tapered waveguide bend 202/204 in the taper-connected bend waveguide circuit 200 of Embodiment 1 with the clothoid tapered waveguide bend 602/604. The waveguide width of the straight waveguide 601/605 is $W_0$, the waveguide width of the waveguide bend 603 is $W_C$, the both are different in waveguide width, and the magnitude relationship is $W_0 < W_C$. The clothoid tapered waveguide bend 602 is configured in such a manner that the waveguide width gradually increases from $W_0$ on the straight waveguide 601 side to $W_C$ on the waveguide bend 603 side and the curvature radius gradually decreases from substantially ∞ on the straight waveguide 601 side to $R_C$ on the waveguide bend 603 side. The clothoid tapered waveguide bend 602 has the configuration designed by the procedure described above. The clothoid tapered waveguide bend 604 is configured in such a manner that the waveguide width gradually decreases from $W_C$ on the waveguide bend 603 side to $W_0$ on the straight waveguide 605 side and the curvature radius gradually increases from $R_C$ on the waveguide bend 603 side to substantially ∞ on the straight waveguide 605 side. The clothoid tapered waveguide bend 604 has the configuration designed by the procedure described above. However, the section of the minute waveguide has a younger number on the straight waveguide 605 side, and the configuration is designed by obtaining in order from the section of the minute waveguide on the straight waveguide 605 side. Regarding the way of causing the waveguide width $W_i$ and the curvature radius $R_i$ to change in the clothoid tapered waveguide bend 602/604, $W_i$ and $R_i$ may be independently determined as described above, but it is of course desirable to obtain $R_i$ in conjunction with $W_i$. The clothoid tapered waveguide bend 602/604, the straight waveguide 601/605, and the waveguide bend 603 are connected so that the waveguide centers coincide with each other. That is, they are connected without any offset, as described above. Although it is obvious, respective waveguides 601 to 605 are connected in such a manner that they have the same angle in the waveguide direction at the connection point.

As mentioned above, the taper-connected bend waveguide circuit 600 of the present embodiment is greatly different in configuration from the conventional bend waveguide circuit in that the waveguide width $W_0$ of the straight waveguide 601/605 and the waveguide width $W_C$ of the waveguide bend 603 are different from each other, and in that the straight waveguide 601/600 and the waveguide bend 603 are connected via the clothoid tapered waveguide bend 602/604. The latter point is also different from the taper-connected bend waveguide circuit 200 of Embodiment 1. Using the clothoid tapered waveguide bend 602/604 makes respective waveguides 601 to 605 coincide with each other in field distribution at all the connection points and can reduce the waveguide connection loss to the utmost limit. Further, the clothoid tapered waveguide bend 602/604 used in this embodiment can keep the rate of field distribution change due to the propagation constant, by designing $R_i$ in conjunction with $W_i$, as described above. As a result, while the circuit excess loss is suppressed, the path length $L_{cltpr}$ of the clothoid tapered waveguide bend 602/604 can be effectively shortened. That is, the circuit size of the clothoid taper-connected bend waveguide circuit 600 can be reduced.

Further, even in the present embodiment, the degree of freedom capable of independently optimizing the waveguide widths $W_0$ and $W_C$ is a great merit. In general, making the waveguide width thicker than the single mode condition may obtain a multimode waveguide in which a higher-order mode exists. Therefore, it is not desired to increase the waveguide width excessively. However, compared with the basic waveguide mode, the higher-order mode is large in the ratio of the electric field distribution that exudes to the clad. Therefore, in the case of the waveguide bend, this mode is attenuated faster due to the bend radiation loss. Therefore, in the waveguide bend, even when this higher-order mode is excited, its guided wave can be suppressed to a certain extent. On the other hand, in the straight waveguide, the higher-order mode attenuation due to such bend radiation loss cannot be used. Therefore, compared to the waveguide bend, it is anyway necessary to make it difficult for the higher-order mode to exist. Accordingly, suppressing the waveguide width $W_0$ to a smaller waveguide width at which the higher-order mode is hardly present (difficult to be excited) in the case of the straight waveguide, and increasing the waveguide width $W_C$ to a wider waveguide width at which the bend radiation loss of the basic waveguide mode can be suppressed in the case of the waveguide bend, can realize a bend waveguide circuit with low loss and less influenced by the higher-order mode.

As described above, the path length $L_{cltpr}$ and the bending angle $\theta_{cltpr}=\Sigma(\delta\theta_i)$ of the clothoid tapered waveguide bend 602/604 are required to be constant in length and angle in order to suppress the circuit excess loss due to changes in waveguide width and curvature radius. The required bending angle $\theta$ of the taper-connected bend waveguide circuit 600 is relatively large. In the case of $\theta>2\theta_{cltpr}$, it suffices to configure the bend waveguide circuit so as to have the configuration illustrated in FIG. 18 as described above. However, in the case of $\theta=2\theta_{cltpr}$, the waveguide bend 603 is removed, and the straight waveguide 601, the clothoid tapered waveguide bend 602/604, and the straight waveguide 605 are sequentially connected to configure the clothoid taper-connected bend waveguide circuit 600. Further, when the bending angle $\theta$ is relatively small and satisfies $\theta<2\theta_{cltpr}$, not only the waveguide bend 603 is removed but also the waveguide width $W_i$ and the curvature radius $R_i$ at the end point of the final section N of the clothoid tapered waveguide bend 602/604 are set up to the reachable waveguide width $W_C'$ and curvature radius $R_C'$, so that the bending angle of the clothoid tapered waveguide bend 602/604 becomes $\theta_{cltpr}/2$.

Embodiment 5: Clothoid Taper-Connected S-Bend Waveguide Circuit

Figure 19:
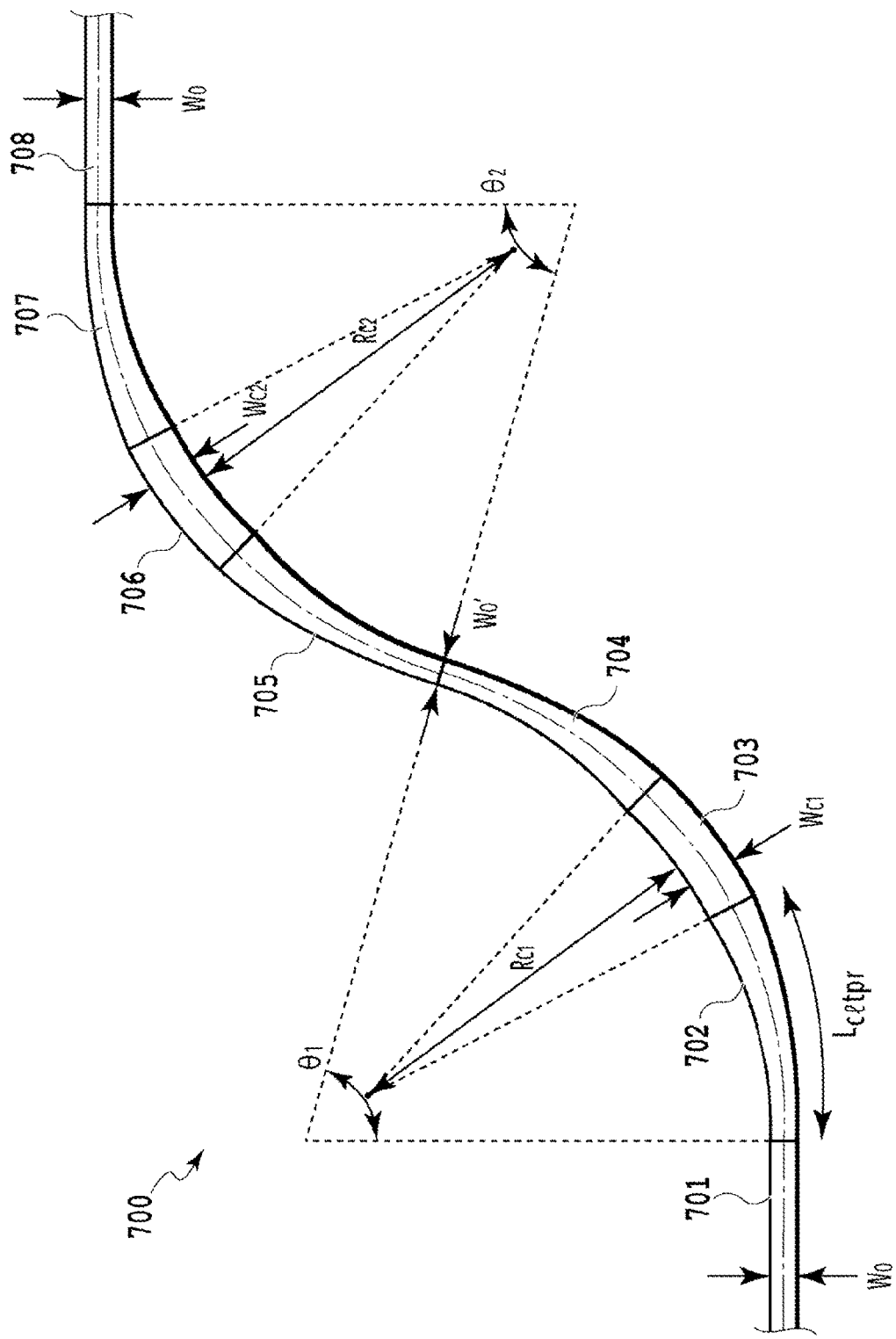
FIG. 19 is a diagram illustrating the configuration of a clothoid taper-connected S-bend waveguide circuit according to a fifth embodiment of the present invention.

FIG. 19 illustrates the configuration of a clothoid taper-connected S-bend waveguide circuit 700 according to a fifth embodiment of the present invention. The clothoid taper-connected S-bend waveguide circuit 700 is a waveguide circuit in which a straight waveguide 701, a clothoid tapered leftward waveguide bend 702, a leftward waveguide bend 703, a clothoid tapered leftward waveguide bend 704, a clothoid tapered rightward waveguide bend 705, a rightward waveguide bend 706, a clothoid tapered rightward waveguide bend 707, and the straight waveguide 708 are sequentially connected. This configuration can be obtained by replacing the tapered leftward waveguide bend 302/304 and the tapered leftward waveguide bend 305/307 in the taper-connected S-bend waveguide circuit 300 of Embodiment 2 with the clothoid tapered leftward waveguide bend 702/704 and the clothoid tapered rightward waveguide bend 705/707, respectively. The waveguide width of the straight waveguide 701/708 is $W_0$, the waveguide width of the leftward waveguide bend 703 is $W_{C1}$, the waveguide width of the rightward waveguide bend 706 is $W_{C2}$, the straight waveguide and the waveguide bend are different in waveguide width, and the magnitude relationship is $W_0<W_{C1}$ and $W_0<W_{C2}$. The waveguide width at the connection point between the clothoid tapered leftward waveguide bend 704 and the clothoid tapered rightward waveguide bend 705 is $W_0'$, and the magnitude relationship is $W_0'$ $W_{C1}$, $W_0'$ $W_{C2}$, and $W_0' \geq W_0$. The curvature radius of the leftward waveguide bend 703 is $R_{C1}$ (curvature $k_{C1}=1/R_{C1}$), and the curvature radius of the rightward waveguide bend 706 is $R_{C2}$ (curvature $k_{C2}=1/R_{C2}$).

The clothoid tapered leftward waveguide bend 702 is configured in such a manner that the waveguide width gradually increases from $W_0$ on the straight waveguide 701 side to $W_{C1}$ on the leftward waveguide bend 703 side and the curvature radius gradually decreases from substantially $\infty$ on the straight waveguide 701 side to $R_{C1}$ on the waveguide bend 703 side. Similarly, the clothoid tapered rightward waveguide bend 705 is configured in such a manner that the waveguide width gradually increases from $W_0'$ on the clothoid tapered leftward waveguide bend 704 side to $W_{C2}$ on the rightward waveguide bend 706 and the curvature radius gradually decreases from substantially $\infty$ on the clothoid tapered leftward waveguide bend 704 side to $R_{C2}$ on the rightward waveguide bend 706 side. In details, both the clothoid tapered leftward waveguide bend 702 and the clothoid tapered rightward waveguide bend 705 have the configurations designed by the procedure described above. The clothoid tapered leftward waveguide bend 704 is configured in such a manner that the waveguide width gradually decreases from WC1 on the leftward waveguide bend 703 to $W_0'$ on the clothoid tapered rightward waveguide bend 705 side and the curvature radius gradually increases from RC1 on the leftward waveguide bend 703 side to substantially $\infty$ on the clothoid tapered rightward waveguide bend 705. The clothoid tapered rightward waveguide bend 707 is configured in such a manner that the waveguide width gradually decreases from $W_{C2}$ on the rightward waveguide bend 706 side to W0 on the straight waveguide 708 side and the curvature radius gradually increases from $R_{C2}$ on the rightward waveguide bend 706 side to substantially $\infty$ on the straight waveguide 708 side. In details, both the clothoid tapered leftward waveguide bend 704 and the clothoid tapered rightward waveguide bend 707 have the configurations designed by the procedure described above. However, the section of the minute waveguide has a younger number on the clothoid tapered rightward waveguide bend 705/ straight waveguide 708 side, and the configuration is designed by obtaining in order from the section of the minute waveguide on the clothoid tapered rightward waveguide bend 705/straight waveguide 708 side. Regarding the way of causing the waveguide width $W_i$ and the curvature radius $R_i$ to change in each clothoid tapered waveguide bend, $W_i$ and $R_i$ may be independently determined as described above, but it is of course desirable obtain $R_i$ in conjunction with $W_i$.

As described above, respective waveguides are connected so that the waveguide centers coincide with each other. That is, they are connected without any offset. Although it is obvious, respective waveguides are connected in such a manner that they have the same angle in the waveguide direction at their connection points.

At the connection point between the clothoid tapered leftward waveguide bend 704 and the clothoid tapered rightward waveguide bend 705, it is basically desirable that the waveguide width $W_0'$ of both waveguides 704/705 is equivalent to the waveguide width $W_0$ of the straight waveguide 701/708 from the viewpoint of suppressing the higher-order mode. In the vicinity of the connection point between the clothoid tapered leftward waveguide bend 704 and the clothoid tapered rightward waveguide bend 705, the minute waveguides configuring the clothoid tapered leftward waveguide bend 704 and the clothoid tapered rightward waveguide bend 705 become larger in curvature radius and therefore become similar to the straight waveguide in curvature. As described in Embodiment 4, in the straight waveguide, the higher-order mode attenuation due to the bend radiation loss cannot be used. The higher-order mode attenuation rate due to the bend radiation loss in the waveguide bend is dependent on the magnitude of the curvature of the waveguide bend. Therefore, even in the waveguide bend, the higher-order mode attenuation becomes weaker when the curvature radius is large. Accordingly, in the vicinity of the connection point between the clothoid tapered leftward waveguide bend 704 and the clothoid tapered rightward waveguide bend 705, it is desirable to set the waveguide width comparable to that of the straight waveguide so as to make it difficult for the higher-order mode to exist.

As mentioned above, the clothoid taper-connected S-bend waveguide circuit 700 of the present embodiment is different in configuration from the conventional S-bend waveguide circuit 100 in that the waveguide width $W_0$ of the straight waveguide 701/708 is different from the waveguide widths $W_{C1}$ and $W_{C2}$ of the leftward waveguide bend 703/rightward waveguide bend 706. In addition, this circuit is greatly different in that the straight waveguide 701 and the leftward waveguide bend 703 are connected via the clothoid tapered leftward waveguide bend 702, the leftward waveguide bend 703 and the rightward waveguide bend 706 have the waveguide width of substantially $W_0'$ and are connected via the clothoid tapered leftward waveguide bend 704 and the clothoid tapered rightward waveguide bend 705, and the rightward waveguide bend 706 and the straight waveguide 708 are connected via the clothoid tapered rightward waveguide bend 707. The latter point is also different from the taper-connected S-bend waveguide circuit 300 of Embodiment 2.

While taking advantage of the degree of freedom capable of independently optimizing waveguide widths $W_0$, $W_0'$, $W_{C1}$, and $W_{C2}$, the clothoid taper-connected S-bend waveguide circuit 700 of the present embodiment sets $W_0$ and $W_0'$ as the waveguide width at which the higher-order mode is hardly present (difficult to be excited) and also sets $W_{C1}$ and $W_{C2}$ as the waveguide width larger than $W_0$ and $W_0'$ so that the bend radiation loss of the basic mode can be suppressed. As a result, an S-bend waveguide circuit with low loss and less influenced by the higher-order mode can be realized. Using the clothoid tapered leftward waveguide bend 702/704 and the clothoid tapered rightward waveguide bend 705/707 makes respective waveguides coincide with each other in field distribution at all the connection points and can reduce the waveguide connection loss to the utmost limit. Further, the clothoid tapered leftward waveguide bend 702/704 and the clothoid tapered rightward waveguide bend 705/707 used in this embodiment can keep the rate of field distribution change due to the propagation constant by designing $R_i$ in conjunction with $W_i$, as described above. As a result, while the circuit excess loss is suppressed, the path length $L_{cltpr}$ of the clothoid tapered leftward waveguide bend 702/704 and the clothoid tapered rightward waveguide bend 705/707 can be effectively shortened. That is, the circuit size of the clothoid taper-connected S-bend waveguide circuit 700 can be reduced.

In many S-bend waveguide circuits, $R_1 = R_2$ is often used from the viewpoint of easiness in pattern design and homogenization/reduction of circuit excess loss. Further, regarding waveguide width $W_{C1}$ of the leftward waveguide bend 703 and waveguide width $W_{C2}$ of the rightward waveguide bend 706, in the case of $R_1 \neq R_2$, the waveguide width at which the bend radiation loss almost reaches the lower limit is slightly different between them. Therefore, it is desirable to select the optimum value for each (namely, $W_{C1} \neq W_{C2}$). However, when the smallness of the difference between the optimum $W_{C1}$ and the optimum $W_{C2}$ is taken into consideration, the same value may be set from the viewpoint of simplifying the pattern design. Further, when the straight waveguide 701 is not parallel to the straight waveguide 708, $\theta_1 \neq \theta_2$.

Further, similar to Embodiment 4, the leftward waveguide bend 703 and the rightward waveguide bend 706 may be removed depending on the required bending angles $\theta_1$ and $\theta_2$ of the clothoid taper-connected S-bend waveguide circuit 700. Further, the waveguide width $W_i$ and the curvature radius $R_i$ at the end-point of the final section N of the clothoid tapered leftward waveguide bend 702/704 and the clothoid tapered rightward waveguide bend 705/707 may be set up to the reachable waveguide width $W_C'$ and curvature radius $R_C'$.

Embodiment 6: Clothoid Taper-Connected W-Bend Waveguide Circuit

Even in the taper-connected W-bend waveguide circuit of Embodiment 3, as in Embodiments 4 and 5, a clothoid taper-connected W-bend waveguide circuit according to a sixth embodiment can be configured by replacing each tapered waveguide bend with a clothoid tapered leftward (rightward) waveguide bend. Even in the present embodiment, as in Embodiments 4 and 5, a compact W-bend waveguide circuit with low loss and less influenced by the higher-order mode can be realized. Further, as in the description in Embodiment 3, regarding an N-bend waveguide circuit in which straight waveguides are connected to the front and rear ends of a tandem waveguide circuit connection composed of N waveguide bend groups, the ideas of Embodiments 4 to 6 are applicable and can be easily expanded to a clothoid taper-connected N-bend waveguide circuit of the present invention.

Embodiment 7: Clothoid Taper-Connected Bend Waveguide Circuit Having Another Configuration The clothoid tapered waveguide bend of the present embodiment can be used, as in Embodiments 4 to 6, in order not only for connecting the straight waveguide and the waveguide bend but also for connecting the waveguide bends different in the curvature radius R (curvature k=1/R).

Figure 20:
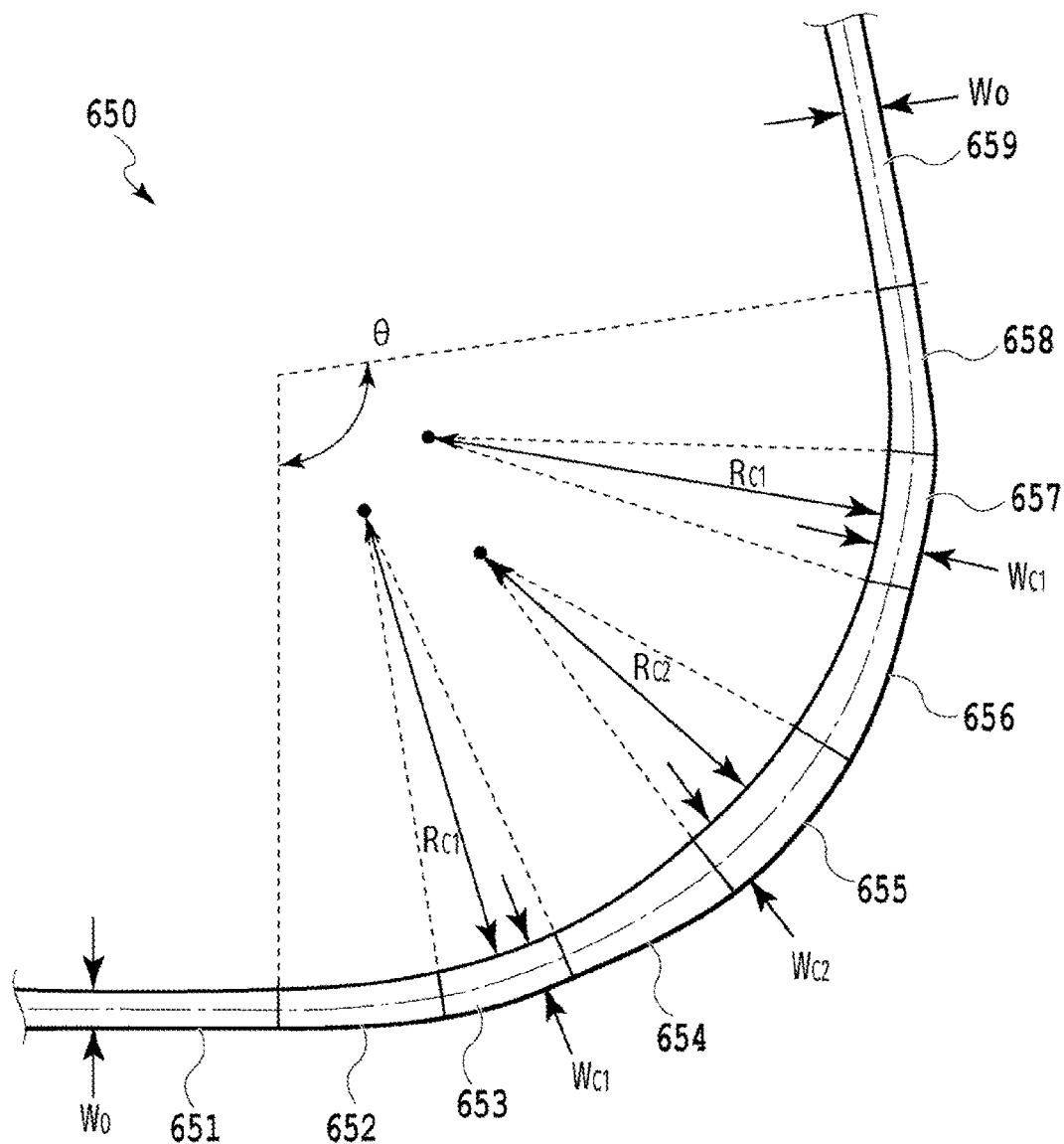
FIG. 20 is a diagram illustrating the configuration of a clothoid taper-connected bend waveguide circuit of another configuration 1 according to a seventh embodiment of the present invention.

FIG. 20 illustrates the configuration of a clothoid taper-connected bend waveguide circuit 650 of another configuration 1 according to a seventh embodiment of the present invention. The clothoid taper-connected bend waveguide circuit 650 is a waveguide circuit in which a straight waveguide 651, a clothoid tapered waveguide bend 652, a waveguide bend 653 having a curvature radius $R_{C1}$, a clothoid tapered waveguide bend 654, a waveguide bend 655 having a curvature radius $R_{C2}$, a clothoid tapered waveguide bend 656, a waveguide bend 657 having a curvature radius $R_{C1}$, a clothoid tapered waveguide bend 658, and a straight waveguide 659 are sequentially connected. This circuit is different from the clothoid taper-connected bend waveguide circuit 600 of Embodiment 4 in that the waveguide bends 653/655/657 differentiated in curvature radius are included and the clothoid tapered waveguide bends 654/656 are added correspondingly.

Such a configuration can be adopted when requested for convenience in layout or when requested to intentionally insert a waveguide bend having a gentle curvature radius in the middle. The waveguide width of the straight waveguide 651/659 is $W_0$, the waveguide width of the waveguide bend 653/657 is $W_{C1}$, and the waveguide width of the waveguide bend 655 is $W_{C2}$. These waveguide widths are different from each other, and the magnitude relationship is $W_0<W_{C1}$ and $W_0<W_{C2}$. In the clothoid taper-connected bend waveguide circuit 650, the bending radii are in a relationship of $R_{C1}>R_{C2}$, and the waveguide widths are in a relationship of $W_{C1}<W_{C2}$, correspondingly. As mentioned above, in the case of a waveguide having a smaller curvature radius, the waveguide width is set to be relatively larger for the purpose of reducing the bend radiation loss. On the contrary, in the case of a waveguide having a larger curvature radius, the waveguide width is set to be relatively smaller for the purpose of suppressing the higher-order mode.

The clothoid tapered waveguide bend 652/658 is similar in configuration to the clothoid tapered waveguide bend 602/604. The clothoid tapered waveguide bend 654 is configured in such a manner that the waveguide width gradually changes from $W_{C1}$ on the waveguide bend 653 side to $W_{C2}$ on the waveguide bend 655 side and the curvature radius gradually changes from $R_{C1}$ on the waveguide bend 653 side to $R_{C2}$ on the waveguide bend 655 side. The clothoid tapered waveguide bend 656 is configured in such a manner that the waveguide width gradually changes from $W_{C2}$ on the waveguide bend 655 side to $W_{C1}$ on the waveguide bend 657 side and the curvature radius gradually changes from $R_{C2}$ on the waveguide bend 655 side to $R_{C1}$ on the waveguide bend 657 side. In details, they have the configurations designed by the procedure described above. However, in step (3), the initial field distribution shift amount $\Delta x_0$ becomes $\Delta x_0 = \alpha(W')/R'$, which can be calculated from the waveguide width W' and the curvature radius R' of the waveguide bend connected. Further, on the clothoid tapered waveguide bend, the section of the minute waveguide has basically a younger number on the smaller waveguide width side, and the configuration is designed by obtaining in order from the section of the minute waveguide on the younger number side. For example, in the case of the clothoid tapered waveguide bend 654, a younger number is on the waveguide bend 653 side, and further $W'=W_{C1}$ and $R'=R_{C1}$. Regarding the way of causing the waveguide width $W_i$ and the curvature radius $R_i$ to change in these clothoid tapered waveguide bends, $W_i$ and $R_i$ may be independently determined as described above, but it is of course desirable to obtain $R_i$ in conjunction with $W_i$. As described above, respective waveguides are connected so that the waveguide centers coincide with each other. That is, they are connected without any offset. Although it is obvious, respective waveguides are connected in such a manner that they have the same angle in the waveguide direction at their connection points.

In this manner, in a waveguide circuit in which bending waveguides having various bending radii (curvatures) are combined, the waveguide width is selected according to the curvature radius. That is, when the curvature radius R is small, the waveguide width W is set to be relatively larger. When the curvature radius R is large, the waveguide width W is set to be relatively smaller. As a result, a bend waveguide circuit with low loss and less influenced by the higher-order mode can be realized, in which the propagation of the higher-order mode can be suppressed and the bend radiation loss of the basic waveguide mode can be reduced. Further, when the straight waveguide is generalized as a waveguide having an infinite curvature radius, it can be said that the clothoid tapered waveguide bend 652/654/656/658 is used to connect waveguides differentiated in curvature radius. As a result, respective waveguides are made coincide with each other in field distribution at all connection points and the waveguide connection loss can be reduced to the utmost limit. Further, in each clothoid tapered waveguide bend 652/654/656/658, designing $R_i$ in conjunction with $W_i$ as described above can make the rate of field distribution change due to the propagation constant. As a result, while the circuit excess loss is suppressed, the path length of each clothoid tapered waveguide bend can be effectively shortened. That is, the circuit size of the clothoid taper-connected bend waveguide circuit 650 can be reduced.

Although the present embodiment has been described in detail as a developed version of Embodiment 4, similar developed versions can be configured for Embodiments 5 and 6. From a different point of view, when the clothoid tapered leftward waveguide bend 704 and the clothoid tapered rightward waveguide bend 705 in Embodiment 5 are regarded as a single clothoid tapered waveguide bend, the curvature radius of the leftward waveguide bend 703 is regarded as a positive curvature radius (i.e., positive curvature), and the curvature radius of the rightward waveguide bend 706 is regarded as a negative curvature radius (i.e., negative curvature), it can be said that this single clothoid tapered waveguide bend is a waveguide in which waveguide bends differentiated in curvature radius (curvature) are connected.

Figure 21:
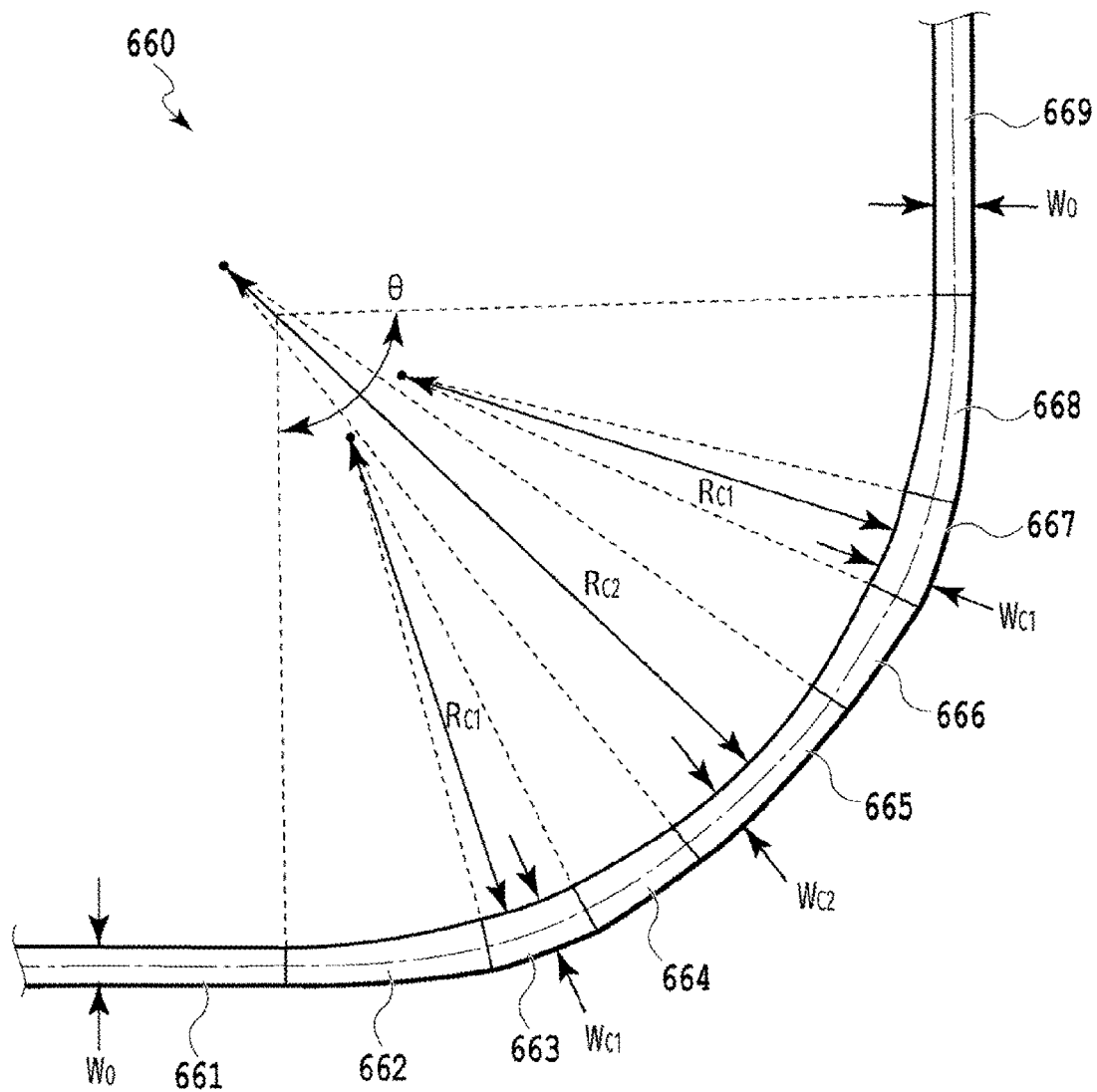
FIG. 21 is a diagram illustrating a configuration of a clothoid taper-connected bend waveguide circuit of another configuration 2 according to an eighth embodiment of the present invention.

Embodiment 8: Clothoid Taper-Connected Bend Waveguide Circuit Having Another Configuration FIG. 21 illustrates the configuration of a clothoid taper-connected bend waveguide circuit 660 of another configuration 2 according to an eighth embodiment of the present invention. The clothoid taper-connected bend waveguide circuit 660 is a waveguide circuit in which a straight waveguide 661, a clothoid tapered waveguide bend 662, a waveguide bend 663 having the curvature radius $R_{C1}$, a clothoid tapered waveguide bend 664, a waveguide bend 665 having the curvature radius $R_{C2}$, a clothoid tapered waveguide bend 666, a waveguide bend 667 having the curvature radius $R_{C1}$, a clothoid tapered waveguide bend 668, and a straight waveguide 669 are sequentially connected. This circuit is different from the clothoid taper-connected bend waveguide circuit 600 of Embodiment 4 in that the waveguide bends 663/665/667 differentiated in curvature radius are included and the clothoid tapered waveguide bends 664/666 are added correspondingly.

Such a configuration can be adopted when requested for convenience in layout or when requested to intentionally insert a waveguide bend having a gentle curvature radius in the middle. The waveguide width of the straight waveguide 661/669 is $W_0$, the waveguide width of the waveguide bend 663/667 is $W_{C1}$, and the waveguide width of the waveguide bend 665 is $W_{C2}$. These waveguide widths are different from each other, and the magnitude relationship is $W_0 < W_{C1}$ and $W_0 < W_{C2}$. In the clothoid taper-connected bend waveguide circuit 660, the bending radii are in a relationship of $R_{C1} > R_{C2}$, and the waveguide widths are in a relationship of $W_{C1} > W_{C2}$ correspondingly. As mentioned above, in the case of a waveguide having a smaller curvature radius, the waveguide width is set to be relatively larger for the purpose of reducing the bend radiation loss. On the contrary, in the case of a waveguide having a larger curvature radius, the waveguide width is set to be relatively smaller for the purpose of suppressing the higher-order mode.

The clothoid tapered waveguide bend 662/664/666/668 is the same in configuration as Embodiment 7 and has the configuration designed by the procedure described above.

In this manner, in a waveguide circuit in which bending waveguides having various bending radii (curvatures) are combined, the waveguide width is selected according to the curvature radius. As a result, a bend waveguide circuit with low loss and less influenced by the higher-order mode can be realized, in which the propagation of the higher-order mode can be suppressed and the bend radiation loss of the basic waveguide mode can be reduced. It can be said that the clothoid tapered waveguide bend 662/664/666/668 is used to connect waveguides different in curvature radius. As a result, respective waveguides are made coincide with each other in field distribution at all the connection points and the waveguide connection loss can be reduced to the utmost limit. Further, in each clothoid tapered waveguide bend 662/664/666/668, designing $R_i$ in conjunction with $W_i$ as described above can make the rate of field distribution change due to the propagation constant. As a result, while the circuit excess loss is suppressed, the path length of each clothoid tapered waveguide bend can be effectively shortened. That is, the circuit size of the clothoid taper-connected bend waveguide circuit 660 can be reduced.

Embodiment 9: Application to Directional Coupler

A directional coupler (DC) is configured by two straight waveguides arranged in parallel with and close to each other, which is a main body part, and a total of four deployed waveguides that are connected to the front and rear ends of these two straight waveguides, respectively. A waveguide bend, an S-bend waveguide, a W-bend waveguide or the like may be used as this deployed waveguide according to the circuit layout. Further, all the four deployed waveguides are not limited to be identical in type. Different types of deployed waveguides may be used depending on the developing direction. Applying the waveguide circuits of Embodiments 1 to 6 to the waveguide bend, the S-bend waveguide, and the W-bend waveguide of these deployed waveguides can realize a low-loss directional coupler while suppressing increase in the circuit size of the directional coupler.

However, in the directional coupler, in order to reduce the length (coupling length) of two waveguides closely arranged, the width $W_{dc}$ of these two waveguides is often designed to be smaller than the width of the ordinary waveguide. The waveguide width $W_0$ of the straight waveguide in the waveguide circuits of Embodiments 1 to 3 using the tapered waveguide bend is optimized to the waveguide width at which the waveguide connection loss with the waveguide bend is minimized, and therefore it often does not coincide with the waveguide width $W_{dc}$ of the directional coupler. On the other hand, the waveguide width $W_0$ of the straight waveguide in the waveguide circuits of Embodiments 4 to 6 using the clothoid tapered waveguide bend has good consistency with the waveguide width $W_{dc}$ of the directional coupler because it suffices to be a smaller waveguide width at which the higher-order mode is hardly present (difficult to be excited) in the straight waveguide. However, since it is smaller than the width of the ordinary waveguide, some consideration is required. An exemplary configuration of the directional coupler when the clothoid tapered waveguide bend is used for a deployed waveguide will be described in detail below.

Figure 22:
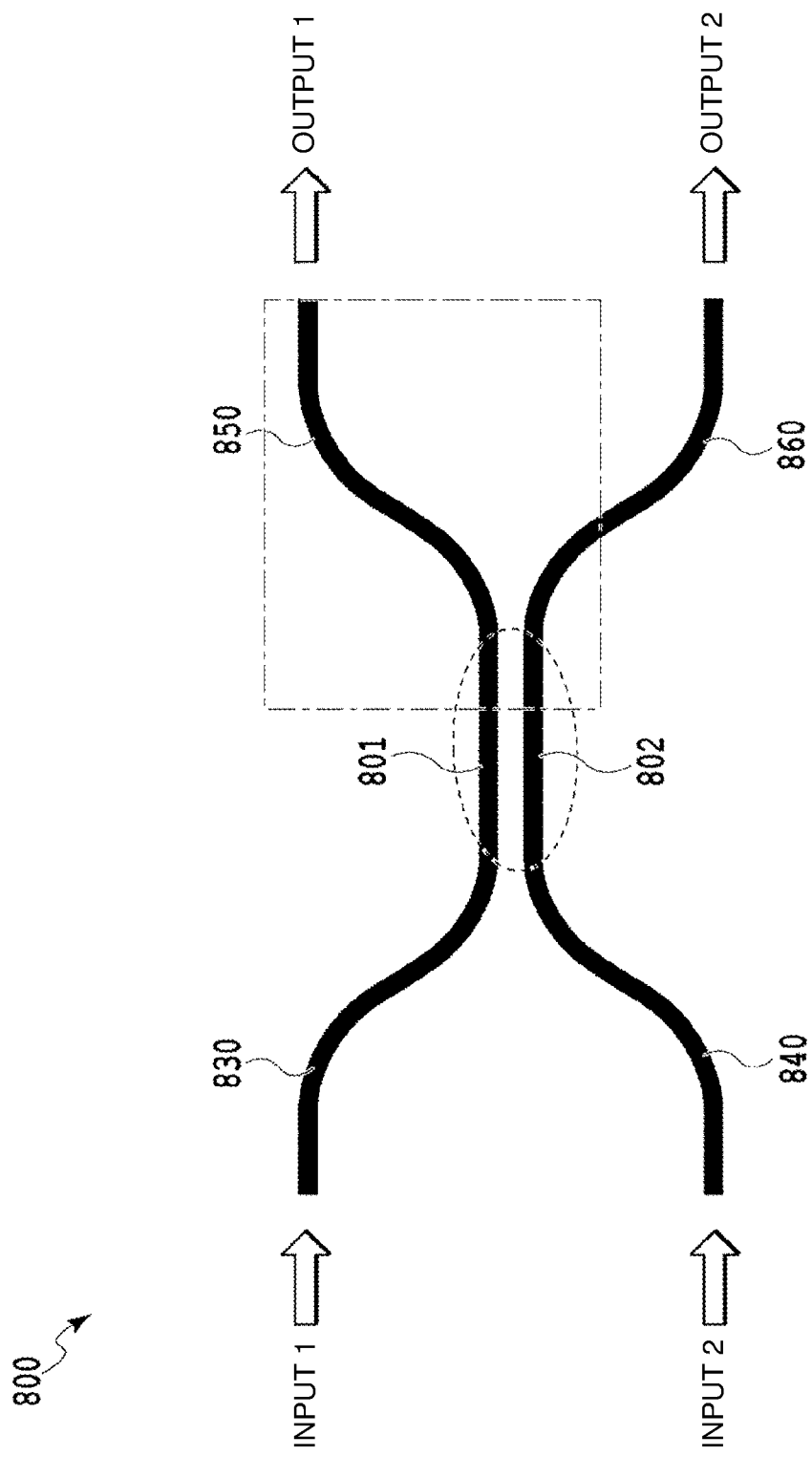
FIG. 22 is a diagram illustrating a clothoid tapered S-bent type directional coupler according to a ninth embodiment of the present invention.

FIG. 22 illustrates the configuration of a clothoid tapered S-bent type directional coupler 800 according to a ninth embodiment of the present invention. The clothoid tapered S-bent type directional coupler 800 is configured by two straight waveguides 801/802 arranged in parallel and close to each other and a total of four DC-oriented clothoid tapered S-bend waveguides 830 to 860 connected to the front or rear end of these two waveguides, respectively. These DC-oriented clothoid tapered S-bend waveguides 830 to 860 are basically the same in configuration, and these DC-oriented clothoid tapered S-bend waveguides are arranged symmetrically. Therefore, hereinafter, only the configuration of a DC-oriented clothoid tapered S-bend waveguide 850 on the upper right side will be described in detail.

Figure 23:
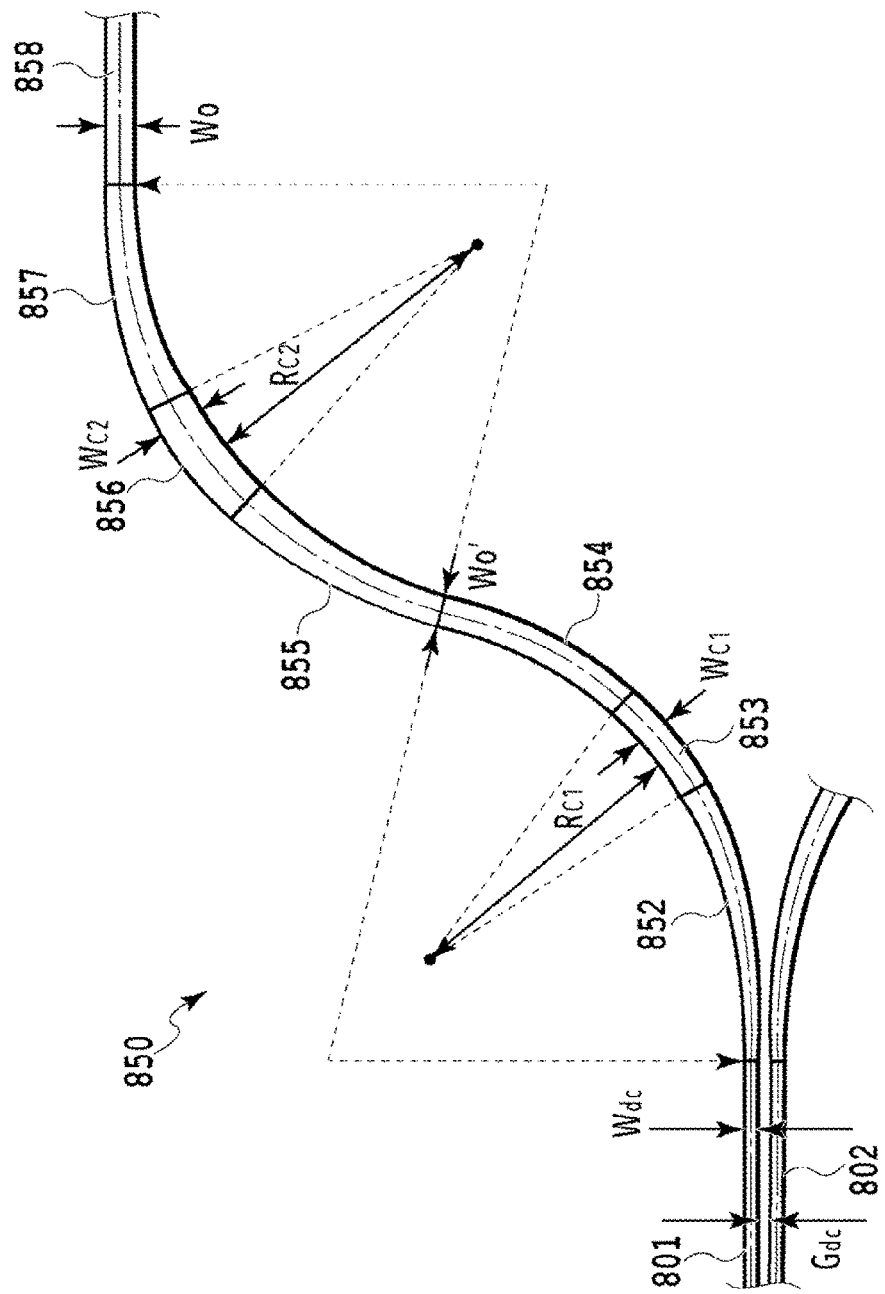
FIG. 23 is a diagram illustrating a detailed configuration of a DC-oriented clothoid tapered S-bend waveguide according to the ninth embodiment.

FIG. 23 is an enlarged view of a configuration near the DC-oriented clothoid tapered S-bend waveguide 850. The DC-oriented clothoid tapered S-bend waveguide 850 is a waveguide in which a clothoid tapered leftward waveguide bend 852 connected to the straight waveguide 801, a leftward waveguide bend 853, a clothoid tapered leftward waveguide bend 854, a clothoid tapered rightward waveguide bend 855, a rightward waveguide bend 856, a clothoid tapered rightward waveguide bend 857, and a straight waveguide 858 are sequentially connected. This waveguide is similar in configuration to the clothoid taper-connected S-bend waveguide circuit 700 of Embodiment 5. The waveguide width of the straight waveguide 801/802 is $W_{dc}$, and the gap between these waveguides is $G_{dc}$. Accordingly, the gap between respective waveguide centers of the straight waveguides 801/802 is $W_{dc} + G_{dc}$. The waveguides configuring other DC-oriented clothoid tapered S-bend waveguides 830/840/860 are arranged together with the waveguide configuring the DC-oriented clothoid tapered S-bend waveguide 850 so as to be symmetrical as a whole.

A part including the DC-oriented clothoid tapered S-bend waveguide 850 and the straight waveguide 801 is basically similar in configuration to the clothoid taper-connected S-bend waveguide circuit 700. However, there is a significant difference in that the waveguide width of the straight waveguide 801 is $W_{dc}$ and is smaller than waveguide width $W_0$ of the ordinary straight waveguide ($W_{dc} < W_0$). This means that, as a great difference, the waveguide width of the straight waveguide 701 is changed from $W_0$ to $W_{dc}$ in the clothoid taper-connected S-bend waveguide circuit 700. Along with this, the waveguide width of the clothoid tapered leftward waveguide bend 852 gradually increases from $W_{dc}$ on the straight waveguide 801 side to $W_{C1}$ on the leftward waveguide bend 853 side. Regarding the curvature radius, it is configured to gradually decrease from substantially $\infty$ on the straight waveguide 701 side to $R_{C1}$ on the waveguide bend 703 side, which is the same as the clothoid tapered leftward waveguide bend 702. The parameters of the minute waveguides in the clothoid tapered leftward waveguide bend 852 are basically designed according to the procedure described above. However, since $W_{dc}$ is smaller than the ordinary waveguide width $W_0$, the following restrictions are added to the curvature radius of the minute waveguide.

As described above, the larger the waveguide width, the smaller the bend radiation loss. Conversely, the bend radiation loss becomes larger with decreasing waveguide width. Accordingly, the clothoid tapered leftward waveguide bend 852 is required to have a curvature radius larger than the standard minimum curvature radius on the straight waveguide 801 side where the width becomes smaller than the width $W_0$. That is, it is necessary to limit the curvature radius $R_i$ by an allowable curvature radius $R_{lim}(W_i)$ corresponding to the waveguide width $W_i$.

Figure 24:
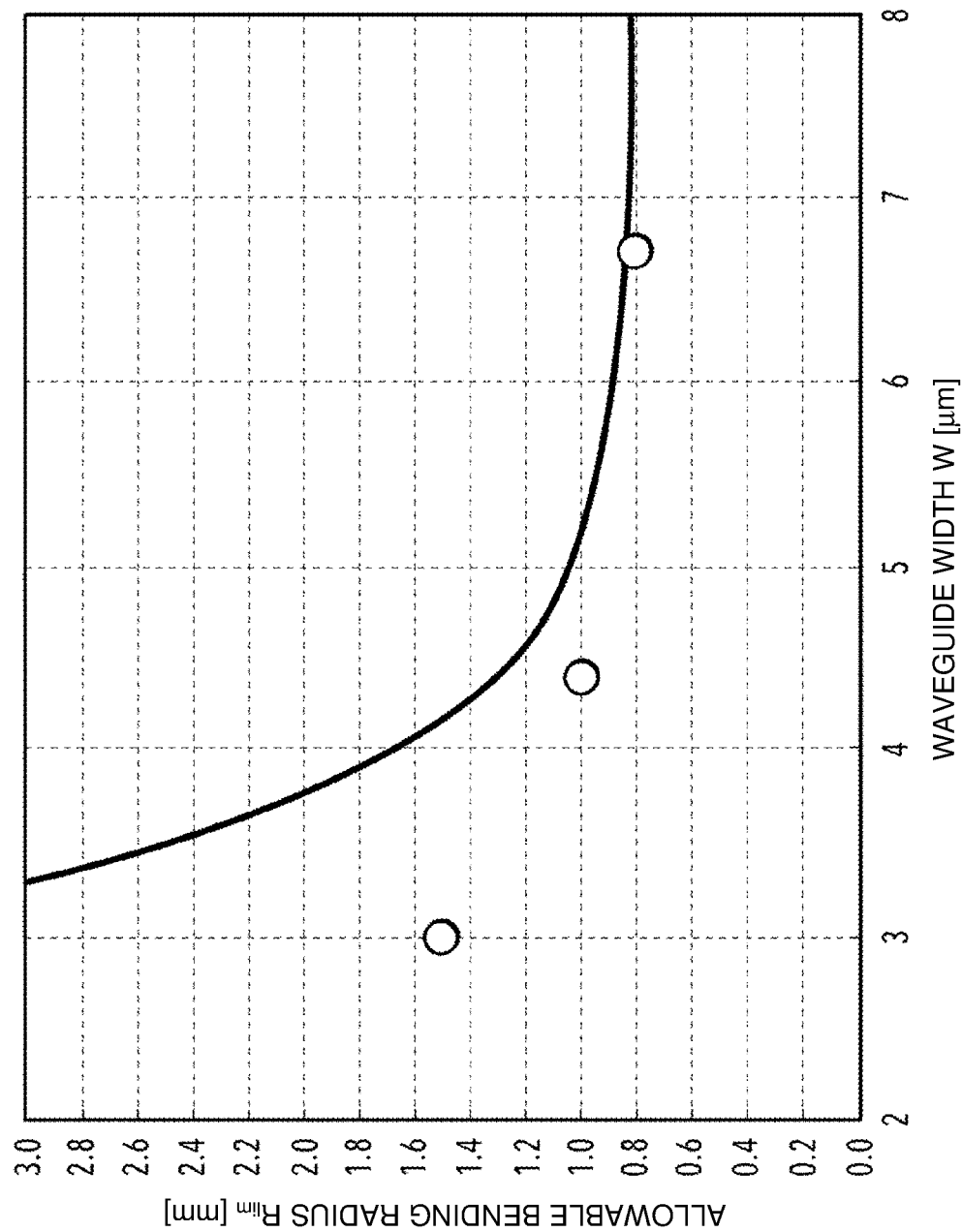
FIG. 24 is a diagram illustrating some relationships between waveguide width and allowable curvature radius in the waveguide bend.

FIG. 24 is a diagram illustrating a relationship between the waveguide width $W_i$ and the allowable curvature radius $R_{lim}$. The plots in the drawing indicate waveguide widths at which the bend radiation loss becomes 0.0125 dB/mm in the case of R=0.8, 1.0, and 1.5 mm, which has been obtained from the above-described test circuit configured by the S-bend waveguide circuit 100. Since the electric field strength distribution of the clad is attenuated exponentially according to the distance, the ratio of the field distribution power applied to the region $S_r$, when the waveguide width is changed to change the critical distance $d_r$, almost changes exponentially. Accordingly, the allowable curvature radius $R_{lim}$ also changes approximately exponentially with respect to the waveguide width $W_i$. In the drawing, the solid line indicates the allowable curvature radius $R_{lim}(W_i)$ estimated from the plots on the slightly safe side. In the case of the clothoid tapered waveguide bend including a minute waveguide in which the waveguide width $W_i$ is smaller than the ordinary waveguide width $W_0$, the curvature radius $R_i$ is prevented from falling below this allowable curvature radius $R_{lim}(W_i)$. Specifically, in step (3), in the case of $R_i < R_{lim}(W_i)$, $R_i = R_{lim}(W_i)$. The limitation of the curvature radius $R_i$ by this allowable curvature radius $R_{lim}(W_i)$ applies to any waveguide bend at other places such as the clothoid tapered leftward waveguide bend 854, when the waveguide width $W_i$ is smaller than the ordinary waveguide width $W_0$.

When the application to an optical circuit is taken into consideration, the bend radiation loss determined by a waveguide width W(z) is limited so as not to exceed a predetermined value (0.0125 dB/mm).

Further, a waveguide pitch D of the deployed waveguides of the directional coupler, that is, the gap between the center of the straight waveguide constituting the DC-oriented clothoid tapered S-bend waveguide 830 and the center of the straight waveguide constituting the DC-oriented clothoid tapered S-bend waveguide 840 or the gap between the center of the straight waveguide constituting the DC-oriented clothoid tapered S-bend waveguide 850 and the center of the straight waveguide constituting the DC-oriented clothoid tapered S-bend waveguide 860 is not so relatively large. The path length of the clothoid tapered leftward waveguide bend 852 is not so long. Therefore, even if the waveguide width is increased from $W_{dc}$ in the clothoid tapered leftward waveguide bend 852, it may not become larger than $W_0'$ because of the restrictions on the change rate of the waveguide width. In such a case, since the magnitude relationship of the waveguide widths is $W_{dc} < W_{C1} \le W_0'$, and therefore the clothoid tapered leftward waveguide bend 854 is configured in such a manner that the waveguide width gradually increases from $W_{C1}$ on the leftward waveguide bend 853 side to $W_0'$ on the clothoid tapered rightward waveguide bend 855 side (in the case of $W_{C1} = W_0'$, the waveguide width becomes constant) and the curvature radius gradually increases from $R_{C1}$ on the leftward waveguide bend 853 side to substantially ∞ on the clothoid tapered rightward waveguide bend 855 side. Even when the magnitude relationship of the waveguide widths is different, the detailed parameter determination is performed similarly according to the procedure described above. Further, from the same reason, if the magnitude relationship of the waveguide widths happens to be $W_0' < W_{C2} W_0$, a similar configuration will be obtained for the clothoid tapered rightward waveguide bend 857. That is, it is configured in such a manner that the waveguide width gradually increases from $W_{C2}$ on the rightward waveguide bend 856 side to $W_0$ on the straight waveguide 858 side (in the case of $W_{C2} = W_0$, the waveguide width becomes constant) and the curvature radius gradually increases from $R_{C2}$ on the leftward waveguide bend 856 side to substantially ∞ on the straight waveguide 858.

As mentioned above, the DC-oriented clothoid tapered S-bend waveguides 830 to 860 used in the clothoid tapered S-bent type directional coupler 800 are different from the clothoid taper-connected S-bend waveguide circuit 700 of Embodiment 5 in that the waveguide width of the straight waveguide 801/802 is $W_{dc}$, which is shorter than the waveguide width $W_0$ of the ordinary straight waveguide ($W_{dc} < W_0$), and correspondingly the curvature radius $R_i$ of the clothoid tapered leftward waveguide bend and the clothoid tapered rightward waveguide bend is limited by the allowable curvature radius $R_{lim}(W_i)$ corresponding to the waveguide width $W_i$, and also in that the waveguide width may gradually increase (or become constant) in the clothoid tapered leftward waveguide bend 854 and the clothoid tapered rightward waveguide bend 857.

As described above with reference to FIG. 10, the waveguide width $W_{C1}$ of the leftward waveguide bend 853 and waveguide width $W_{C2}$ of the rightward waveguide bend 856 are 0.8 to 0.9 when converted into the value of the normalized propagation constant b, as long as the curvature at the connection point is not zero.

As mentioned above, even in the directional coupler, when the above-described points are taken into consideration, the clothoid taper-connected S-bend waveguide circuit can be applied to the deployed waveguide portion. As a result, respective waveguides are made coincide with each other in field distribution at all connection points and the waveguide connection loss can be reduced to the utmost limit. Further, the clothoid tapered leftward waveguide bend 852/854 and the clothoid tapered rightward waveguide bend 855/857 can keep the rate of field distribution change due to propagation constant by designing $R_i$ in conjunction with $W_i$ as described above. As a result, while the circuit excess loss is suppressed, the path length $L_{cltpr}$ of the clothoid tapered rightward (leftward) waveguide bend can be effectively shortened. That is, the circuit size of the directional coupler can be reduced. These effects can be obtained even when $W_{C1} W_0'$ or $W_{C2} W_0$. Further, even when the deployed waveguide pitch D is large and the waveguide length of the waveguide bend is long, setting $W_0$ and $W_0'$ as waveguide widths at which the higher-order mode is hardly present (difficult to be excited) and also setting $W_{C1}$ and $W_{C2}$ as waveguide widths whose values are larger than $W_0$ and $W_0'$ so that the bend radiation loss of the basic mode can be suppressed can realize a directional coupler capable of further reducing the loss while avoiding the influence of the higher-order mode.

Embodiment 10: Application to Directional Coupler

Figure 25:
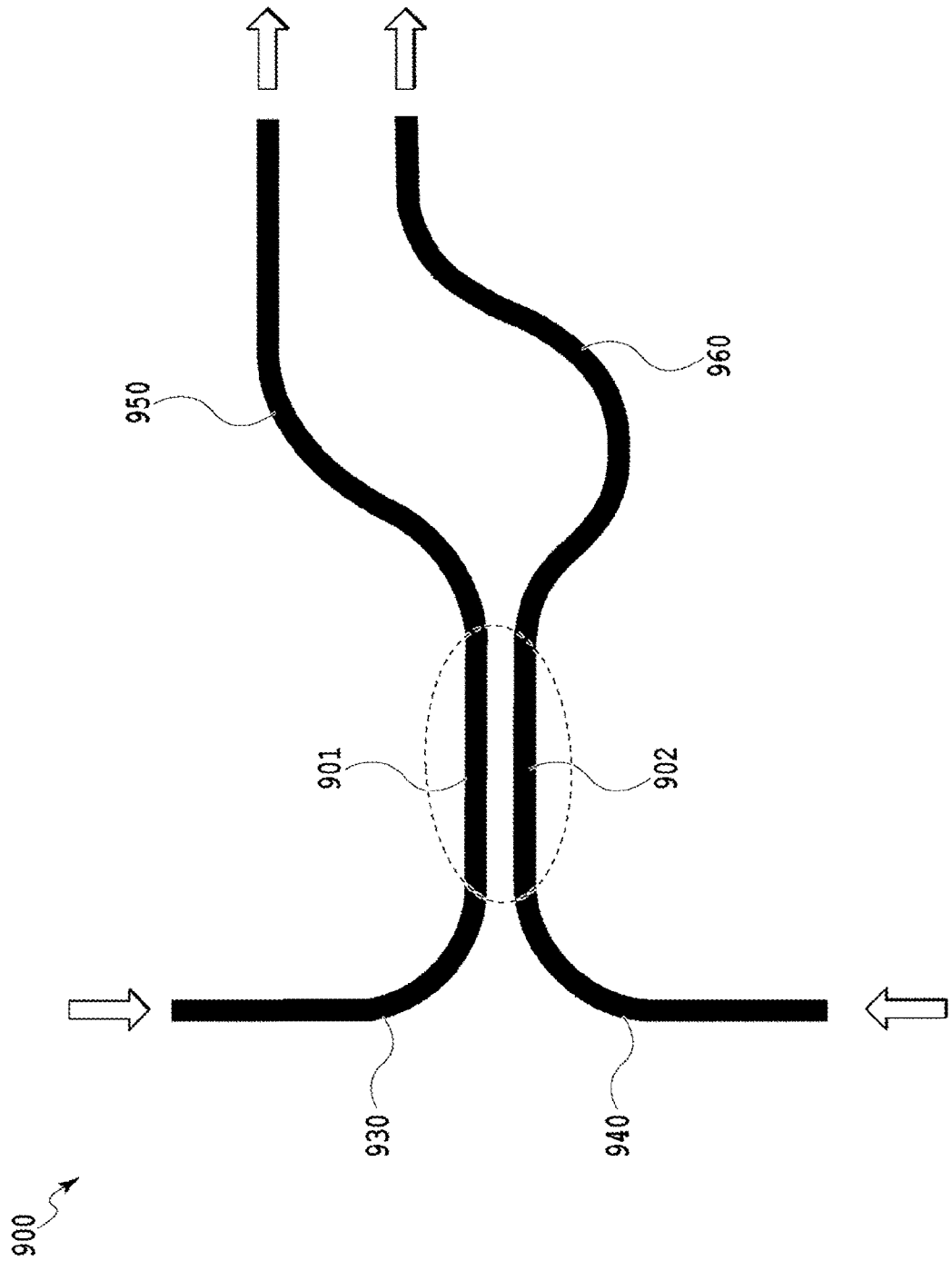
FIG. 25 is a diagram illustrating a clothoid tapered bent type directional coupler according to a tenth embodiment of the present invention.

FIG. 25 illustrates the configuration of a clothoid tapered bent type directional coupler 900 according to a tenth embodiment of the present invention. The clothoid tapered bent type directional coupler 900 is configured by two straight waveguides 901/902 arranged in parallel and close to each other, DC-oriented clothoid tapered bend waveguides 930/940 connected to the left sides of respective straight waveguides 901/902, a DC-oriented clothoid tapered S-bend waveguide 950 connected to the right side of the straight waveguide 901, and a DC-oriented clothoid tapered W-bend waveguide 960 connected to the right side of the straight waveguide 902. The DC-oriented clothoid tapered S-bend waveguide 950 is the same in configuration as the DC-oriented clothoid tapered S-bend waveguide 850. The DC-oriented clothoid tapered bend waveguides 930/940 are the ones derived through reconfiguration of the clothoid taper-connected bend waveguide circuit 600 of Embodiment 4. The DC-oriented clothoid tapered W-bend waveguide 960 is the one derived through reconfiguration of the clothoid taper-connected W-bend waveguide circuit 700 of Embodiment 6. In each of them, the same idea as the method for configuring the DC-oriented clothoid tapered S-bend waveguide 850 described in Embodiment 9 is adopted. As mentioned above, even when the configuration of the deployed waveguide is different, various clothoid taper-connected bend waveguide circuits of the present invention can be applied and the merits thereof can be obtained.

EXAMPLES

Using the Silica-based waveguide technique, the above-described circuits of some embodiments were fabricated and the circuit excess loss was evaluated. A well-known combination of the glass film layers deposition technology such as flame hydrolysis deposition (FHD) method and the fine processing technology such as reactive ion etching (RIE) was used to form these circuits on silicon substrates. Used waveguides are approximately 2% in specific refractive index difference $\Delta$ and approximately 4 µm in core height.

Example 1: Clothoid Taper-Connected S-Bend Waveguide Circuit

The clothoid taper-connected S-bend waveguide circuit 700 of Embodiment 5 was fabricated. Respective waveguide widths are $W_0=W_0'=5$ µm and $WC=W_{C1}=W_{C2}=7.0$ µm. Respective bending radii are $R_{C1}=R_{C2}=0.8$ mm, and bending angles are $\theta=\theta_1=\theta_2=40, 60°$. The waveguide width $W_i$ and the curvature radius $R_i$ in the clothoid tapered leftward waveguide bend 702/704 and the clothoid tapered rightward waveguide bend 705/707 have the same values as those in FIG. 19. In addition, as a reference, a circuit of $W_C=5$ µm, that is, a conventional S-bend waveguide circuit 100 ($\theta=20, 40, 60°$) was also fabricated. The circuit size, at $\theta=60°$, was approximately 1.8×1 mm in the clothoid taper-connected S-bend waveguide circuit 700 of the present invention, whereas it was approximately 1.4×0.8 mm in the conventional S-bend waveguide circuit 100.

Figure 26:
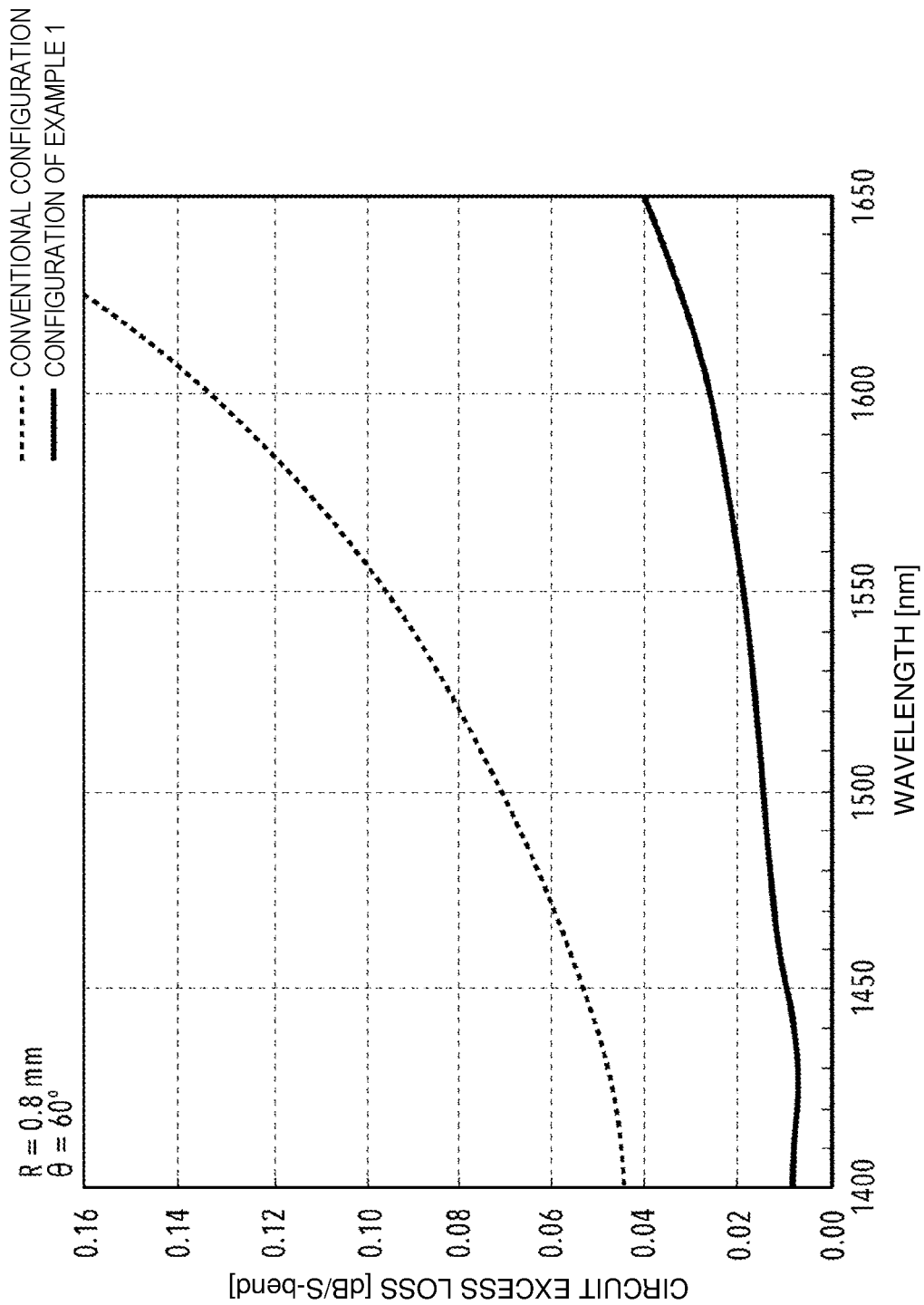
FIG. 26 is a diagram illustrating wavelength dependency of the circuit excess loss in Example 1.

FIG. 26 illustrates evaluation result with respect to the wavelength dependency of the circuit excess loss per S-bend of the fabricated waveguide circuit, in the case of $\theta=60°$. In the drawing, the solid line indicates characteristics of the clothoid taper-connected S-bend waveguide circuit 700 having the configuration of Example 1. In the drawing, the short dashes line indicates characteristics of the S-bend waveguide circuit 100 having the conventional configuration. The circuit excess loss in the clothoid taper-connected S-bend waveguide circuit 700 was 0.019 dB/S-bend as an average among evaluation wavelengths 1500 to 1600 nm. On the other hand, the circuit excess loss the conventional S-bend waveguide circuit 100 was 0.098 dB/S-bend. The circuit excess loss greatly decreases, in particular, the circuit excess loss decreases in a long wavelength region, and a flat loss characteristic with respect to the wavelength was obtained. In general, in a waveguide bend, the exudation of the field distribution into the clad is large when the wavelength is long rather than when the wavelength is short, and the bend radiation loss becomes larger. The reduction of the circuit excess loss in the long wavelength region reveals that the bend radiation loss in the waveguide bend is reduced.

Figure 27:
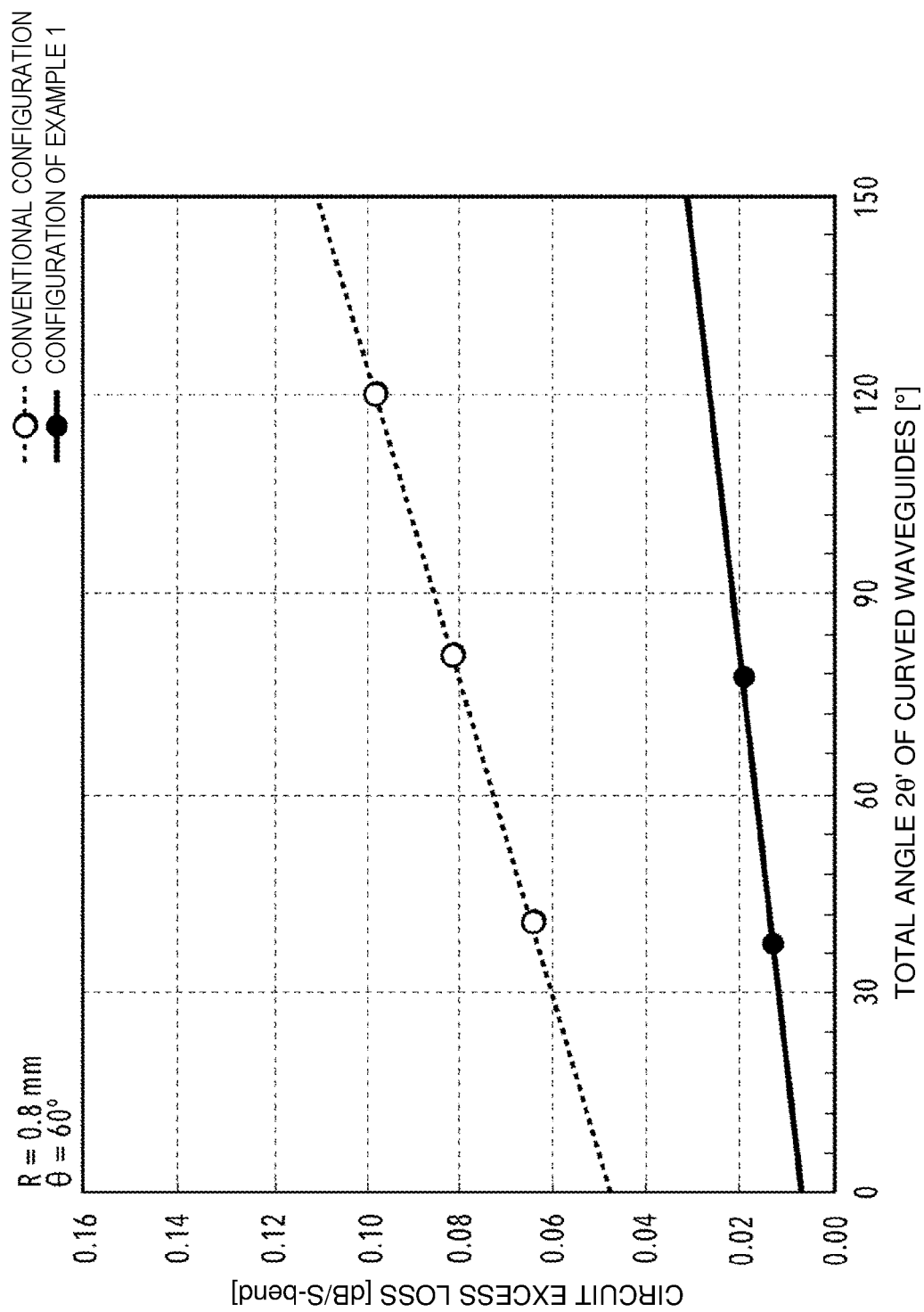
FIG. 27 is a diagram illustrating bending angle dependency of the circuit excess loss in Example 1.

FIG. 27 illustrates the bending angle dependency of the circuit excess loss per S-bend of the fabricated waveguide circuit. In the drawing, the filled plots (solid line) indicate characteristics of the clothoid taper-connected S-bend waveguide circuit 700. In the drawing, outlined plots (short dashes line) indicate characteristics of the conventional S-bend waveguide circuit 100. Here, the bending angle is set to the total bending angle $2\theta'$ of only pure waveguide bends (waveguide bends having a constant waveguide width and a constant curvature radius). That is, in the clothoid taper-connected S-bend waveguide circuit 700, the bending angles of the clothoid tapered leftward waveguide bend 702/704 and the clothoid tapered rightward waveguide bend 705/707 are not included, and the horizontal axis is a total of $2\theta'$, in which $\theta'$ is the bending angle for only the leftward waveguide bend 703 and the rightward waveguide bend 706. In the conventional S-bend waveguide circuit 100, a sum $2\theta$ of the bending angle $\theta$ of the leftward waveguide bend 102 and the bending angle $\theta$ of the rightward waveguide bend 103 is taken as the horizontal axis as it is. Accordingly, the gradient of a characteristic straight line when the plots are connected by a linear straight line represents a bend radiation loss per 1° of pure waveguide bend. The Y-intercept of the characteristic straight line represents the total per S-bend of the waveguide connection loss.

Here, the waveguide connection loss in the clothoid taper-connected S-bend waveguide circuit 700 represents a waveguide connection loss in the connection of the straight waveguide 701/the rightward waveguide bend 703/the leftward waveguide bend 706/the straight waveguide 708, intervened by the clothoid tapered leftward waveguide bend 702/704 and the clothoid tapered rightward waveguide bend 705/707. In addition, it can be said that the bend radiation loss occurring in the clothoid tapered leftward waveguide bend 702/704 and the clothoid tapered rightward waveguide bend 705/707 is included here. In comparison with the characteristic straight line (short dashes line) of the conventional S-bend waveguide circuit 100, the characteristic straight line (the solid line) of the clothoid taper-connected S-bend waveguide circuit 700 is different in that the Y-intercept of the characteristic straight line is significantly smaller. Therefore, it is understood that the intervention by the clothoid tapered leftward waveguide bend 702/704 and the clothoid tapered rightward waveguide bend 705/707 can reduce the waveguide connection loss extremely effectively. In addition, since the gradient of the characteristic straight line is smaller, it is understood that making the waveguide width $W_C$ of the waveguide bend larger than the ordinary waveguide width $W_0$ can reduce the radiation loss in the waveguide bend.

As mentioned above, the usage of the clothoid tapered waveguide bend in which $R_i$ is designed in conjunction with $W_i$ has reduced the waveguide connection loss to the utmost limit while suppressing the increase in circuit size. Further, the setting of $W_0$ and $W_0'$ as waveguide widths at which the higher-order mode is hardly present (difficult to be excited) and also the setting of $W_{C1}$ and $W_{C2}$ as waveguide widths whose values are larger than $W_0$ and $W_0'$ so that the bend radiation loss of the basic mode can be suppressed have realized an S-bend waveguide circuit with low loss and less influenced by the higher-order mode.

Example 2: Clothoid Tapered S-Bent Type Directional Coupler

The clothoid tapered S-bent type directional coupler 800 of Embodiment 9 was fabricated with a design of 50% coupling. Respective waveguide widths are $W_{dc}$=3.5 μm, $W_0$=$W_0'$=$W_{C1}$=5 μm, and $W_{C2}$=7.0 μm. Respective bending radii are $R_{C1}$=1 mm, $R_{C2}$=1.3 mm, and input-output gap D=0.1 mm. The circuit length L is approximately 1.4 mm. In addition, as a reference, a 50% coupling directional coupler having the conventional configuration disclosed in Patent Literature 2 was also fabricated. The entire design is performed so that the waveguide width $W_{dc}$ of the directional coupler portion is the same 3.5 μm, the waveguide width $W_0$ of the ordinary portion is the same 5 μm, and the circuit size is the same (D=0.1 mm, L=approximately 1.4 mm).

Figure 28:
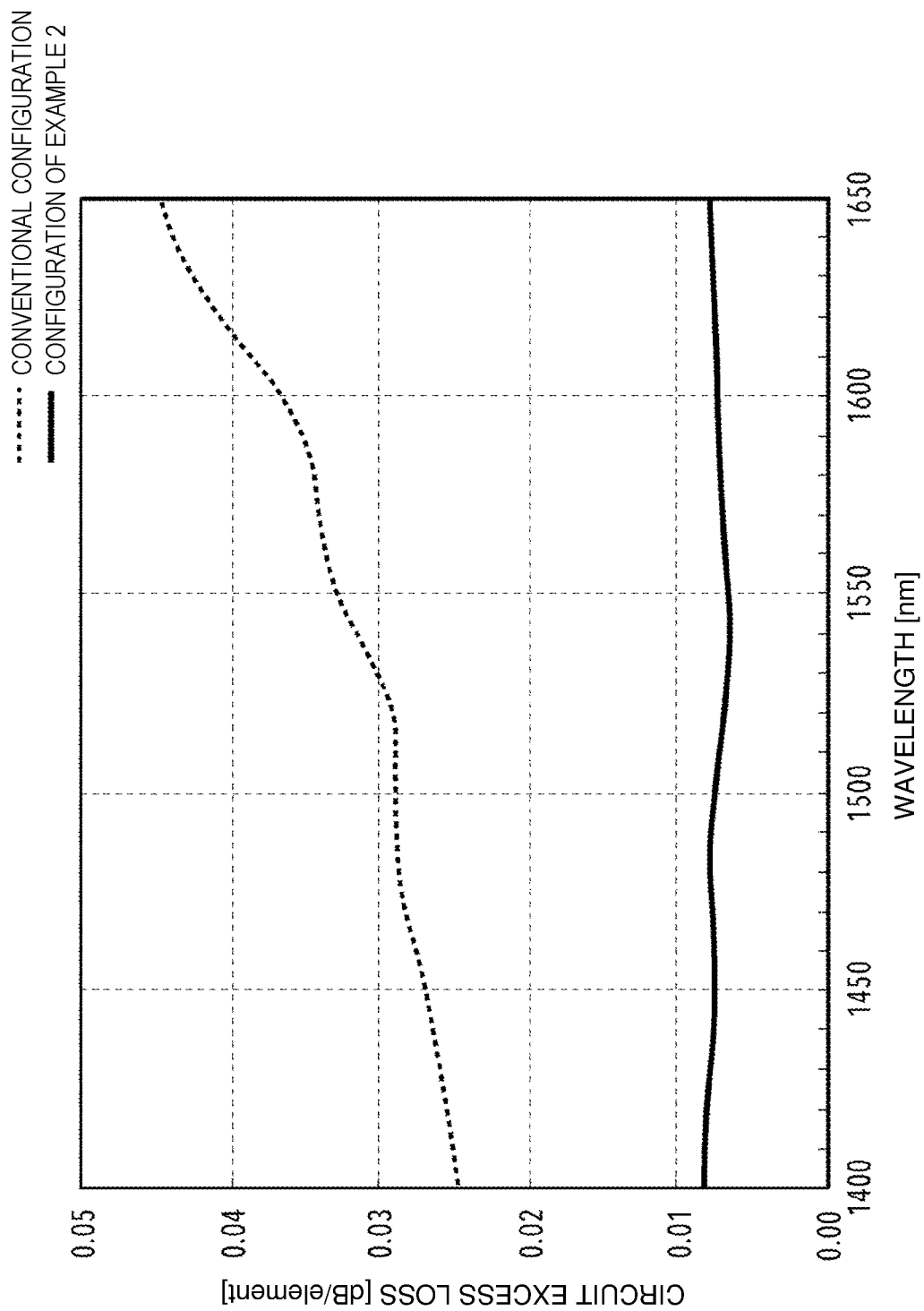
FIG. 28 is a diagram illustrating wavelength dependency of the circuit excess loss in Example 2.

FIG. 28 illustrates evaluation results with respect to the wavelength dependency of the circuit excess loss in the fabricated directional couplers. The circuit excess loss in the directional coupler was calculated using a sum of the transmittance of the bar path (input 1→output 1, input 2→output 2) and the transmittance of the cross path (input 1→output 2, input 2→output 1). In the drawing, the solid line indicates characteristics of the clothoid tapered S-bent type directional coupler 800 having the configuration of Example 2. In the drawing, the short dashes line indicates characteristics of the directional coupler having the conventional configuration. The circuit excess loss in the clothoid tapered S-bent type directional coupler 800 was 0.007 dB/element as an average among evaluation wavelengths 1500 to 1600 nm. On the other hand, the circuit excess loss in the conventional configuration was 0.032 dB/element. Even in this clothoid tapered S-bent type directional coupler 800, the circuit excess loss greatly reduces, in particular, the circuit excess loss decreases in a long wavelength region, and a flat loss characteristic with respect to the wavelength was obtained. From this, it is understood that even in this clothoid tapered S-bent type directional coupler 800 the bend radiation loss in the waveguide bend can be effectively reduced.

As mentioned above, in the DC-oriented clothoid tapered S-bend waveguides 830 to 860, the usage of the clothoid tapered waveguide bend in which $R_i$ is designed in conjunction with $W_i$ while keeping the allowable curvature radius $R_{lim}(W_i)$ has reduced the waveguide connection loss to the utmost limit without causing an increase in circuit size. Further, the setting of $W_0$ and $W_0'$ as waveguide widths at which the higher-order mode is hardly present (difficult to be excited) and also the setting of $W_{C2}$ as a waveguide width whose value is larger than $W_0$ and $W_0'$ so that the bend radiation loss of the basic mode can be suppressed has realized an S directional coupler with low loss and less influenced by the higher-order mode.

The invention claimed is:

1. An optical waveguide comprising:
   a first waveguide;
   a second waveguide; and
   a clothoid tapered waveguide bend inserted between the first waveguide and the second waveguide, wherein
   a waveguide width of the clothoid tapered waveguide bend continuously changes from a first waveguide width at a connection point of the first waveguide to a second waveguide width at a connection point of the second waveguide, a curvature radius of the clothoid tapered waveguide bend continuously changes from a first curvature radius at the connection point of the first waveguide to a second curvature radius at the connection point of the second waveguide, the first waveguide width and the second waveguide width are different from each other, and the first curvature radius and the second curvature radius are different from each other, and wherein
   at least one of the waveguide width and a curvature of the clothoid tapered waveguide bend changes in such a manner that a square of an absolute value of an overlap integral between normalized electric field distributions of front and rear basic propagation modes at a connection point of a minute section configuring the clothoid tapered waveguide bend and having a constant waveguide length becomes constant.

2. The optical waveguide according to claim 1, wherein the first waveguide is a straight waveguide, and the second waveguide is a waveguide bend.

3. The optical waveguide according to claim 1, wherein the product of a derivative value of the absolute value of the curvature of the clothoid tapered waveguide bend with respect to a waveguide direction and a derivative value of the waveguide width of the clothoid tapered waveguide bend with respect to the waveguide direction is equal to or greater than zero.

4. The optical waveguide according to claim 1, wherein a waveguide width W of the clothoid tapered waveguide bend changes by $$W(z)=(W_0+b) \cdot e^{ae \cdot z}-b$$

with respect to a coordinate z along the waveguide direction of the clothoid tapered waveguide bend, when $W_0$ represents a waveguide width at z=0 and a and b are constants.

5. The optical waveguide according to claim 1, wherein the curvature of the clothoid tapered waveguide bend changes in such a manner that a derivative value of the curvature with respect to the waveguide direction becomes constant.

6. The optical waveguide according to claim 1, wherein a curvature k of the clothoid tapered waveguide bend satisfies $$k(z) = \Delta s(z)/\alpha(W(z)) \left| \int\int E^*(W(z), s=0) \cdot E\left(W(z), s = \frac{d\Delta s(z)}{dz}\delta L\right) dx dy \right|^2 = Const.$$

with respect to a coordinate z along the waveguide direction of the waveguide,
where, in a waveguide having the waveguide width W, when the square of the absolute value of the overlap integral between respective normalized electric field distributions of the basic propagation mode of the waveguide bend having the curvature radius R and the straight waveguide is maximized, α(W) is a value obtained by multiplying the curvature radius R of the waveguide bend with an offset value between a waveguide center of the waveguide bend and a waveguide center of the straight waveguide, $\Delta s(z)$ represents an estimated shift amount of the field distribution at z, an x-y-z rectangular coordinate system defines a space, E represents a normalized field distribution of the straight waveguide having the waveguide width W and a waveguide center shifted by s in the waveguide width direction, * represents a complex conjugate, W(z) represents a waveguide width at z, and $\delta L$ represents a waveguide length of the minute section.

7. The optical waveguide according to claim 6, wherein the curvature k(z) of the clothoid tapered waveguide bend is limited so that a bend radiation loss determined by the waveguide width W(z) does not exceed a predetermined value.

8. An optical waveguide comprising:
 a first waveguide bend having a waveguide width $W_1$ and a curvature $k_1$ at a connection point;
 a second waveguide bend that is opposite in bending direction to the first waveguide bend and has a waveguide width $W_2$ and a curvature $k_2$ ($k_1 \cdot k_2 < 0$) at a connection point; and
 a first clothoid tapered waveguide bend and a second clothoid tapered waveguide bend inserted between the first waveguide bend and the second waveguide bend, wherein
 the first clothoid tapered waveguide bend has a waveguide width $W_1$ and a curvature $k_1$ at a connection point to the first waveguide bend, and has a waveguide width $W_0$ and a curvature of zero at a connection point to the second clothoid tapered waveguide bend,
 the second clothoid tapered waveguide bend has the waveguide width $W_0$ and a curvature of zero at a connection point to the first clothoid tapered waveguide bend, and has a waveguide width $W_2$ and a curvature $k_2$ at a connection point to the second waveguide bend,
 the waveguide width $W_0$ is not larger than $W_1$ and not larger than $W_2$, and
 the waveguide width and the curvature of the clothoid tapered waveguide bend change in such a manner that a square of an absolute value of an overlap integral between normalized electric field distributions of front and rear basic propagation modes at a connection point of a minute section configuring the clothoid tapered waveguide bend and having a constant waveguide length becomes constant.

9. The optical waveguide according to claim 8, wherein
 the waveguide width $W_1$ at the connection point of the first waveguide bend is 0.8 to 0.9 when converted into the value of a normalized propagation constant b, as long as the curvature at the connection point is not zero, and
 the waveguide width $W_2$ at the connection point of the second waveguide bend is 0.8 to 0.9 when converted into the value of the normalized propagation constant b, as long as the curvature at the connection point is not zero.

* * * * *